US012633143B1

(12) United States Patent
Vogel et al.

(10) Patent No.:  US 12,633,143 B1
(45) Date of Patent:       May 19, 2026

(54) METHODS AND APPARATUS FOR MACHINE LEARNING SYSTEM FOR EDGE COMPUTER VISION AND ACTIVE REALITY

(71) Applicant: NOMAD Go, Inc., Kirkland, WA (US)

(72) Inventors: Jon Vogel, Kirkland, WA (US); David Greschler, Kirkland, WA (US); Jonah Friedl, Kirkland, WA (US)

(73) Assignee: NOMAD Go, Inc., Kirkland, WA (US)

( * ) Notice: Subject to any disclaimer, the term of this patent is extended or adjusted under 35 U.S.C. 154(b) by 0 days.

(21) Appl. No.: 19/098,411

(22) Filed: Apr. 2, 2025

(51) Int. Cl.
| | |
|---|---|
| *G06V 20/60* | (2022.01) |
| *G06T 7/00* | (2017.01) |
| *G06T 7/521* | (2017.01) |
| *G06T 7/62* | (2017.01) |
| *G06V 10/26* | (2022.01) |
| *G06V 10/75* | (2022.01) |
| *G06V 10/764* | (2022.01) |
| *G06V 30/19* | (2022.01) |

(52) U.S. Cl.
CPC ............ *G06V 20/60* (2022.01); *G06T 7/0002* (2013.01); *G06T 7/521* (2017.01); *G06T 7/62* (2017.01); *G06V 10/26* (2022.01); *G06V 10/751* (2022.01); *G06V 10/764* (2022.01); *G06V 30/19013* (2022.01); *G06V 30/19173* (2022.01); *G06T 2207/10028* (2013.01); *G06T 2207/20081* (2013.01); *G06T 2207/20092* (2013.01); *G06T 2207/30242* (2013.01)

(58) Field of Classification Search
USPC .......................................................... 382/203
See application file for complete search history.

(56) References Cited

U.S. PATENT DOCUMENTS

| | | | |
|---|---|---|---|
| 8,150,658 | B2 | 4/2012 | Beniyama |
| 10,282,639 | B2 | 5/2019 | Farooqi et al. |
| 10,565,548 | B2 | 2/2020 | Skaff et al. |
| 10,586,208 | B2 | 3/2020 | Buibas et al. |
| 10,628,660 | B2 | 4/2020 | Adato et al. |

(Continued)

FOREIGN PATENT DOCUMENTS

| | | |
|---|---|---|
| JP | 5259286 B2 | 8/2013 |
| WO | WO-2024073237 A1 | 4/2024 |

OTHER PUBLICATIONS

International Search Report and Written Opinion for PCT Application No. PCT/US2023/074056 dated Dec. 18, 2023, 7 pages.

(Continued)

*Primary Examiner* — Ian L Lemieux

(74) *Attorney, Agent, or Firm* — COOLEY LLP

(57) ABSTRACT

In some embodiments, a method includes: receiving, at a first time at a user device, a first set of image frames of an inventory. The method further includes identifying a first control point in the first set of image frames. The method further includes locating, using a light ranging sensor of the user device, a first set of storage units in an area associated with the first control point in the inventory. The method further includes storing a representation of the first set of storage units in the area in a memory of the user device. The method further includes receiving, at a second time after the first time, a second set of image frames of the inventory. The method further includes locating, based on the representation and without identifying the first control point, a second set of storage units in the area at the second time.

15 Claims, 23 Drawing Sheets

(56) References Cited

U.S. PATENT DOCUMENTS

| | | | |
|---|---|---|---|
| 10,769,582 | B2 | 9/2020 | Williams et al. |
| 10,783,379 | B2 | 9/2020 | Savvides et al. |
| 10,785,418 | B2 | 9/2020 | Kotfis et al. |
| 10,861,302 | B2 | 12/2020 | Savvides et al. |
| 10,909,694 | B2 | 2/2021 | Buibas et al. |
| 11,087,272 | B2 | 8/2021 | Skaff et al. |
| 11,106,941 | B2 | 8/2021 | Buibas et al. |
| 11,153,483 | B2 | 10/2021 | Fink et al. |
| 11,164,391 | B1 | 11/2021 | Sharma et al. |
| 11,416,814 | B1 | 8/2022 | Curlander et al. |
| 11,774,842 | B2 | 10/2023 | Skaff et al. |
| 11,935,104 | B2 | 3/2024 | Bronicki |
| 12,002,008 | B2 | 6/2024 | Vogel et al. |
| 2012/0243779 | A1* | 9/2012 | Nakai .................. G06F 18/214 |
| | | | 382/159 |
| 2013/0250041 | A1 | 9/2013 | Chou et al. |
| 2015/0052027 | A1 | 2/2015 | Pavani et al. |
| 2015/0052029 | A1 | 2/2015 | Wu et al. |
| 2016/0171707 | A1 | 6/2016 | Schwartz |
| 2016/0304281 | A1* | 10/2016 | Elazary .................... B25J 15/06 |
| 2017/0286901 | A1 | 10/2017 | Skaff et al. |
| 2018/0005035 | A1 | 1/2018 | Bogolea et al. |
| 2018/0005176 | A1 | 1/2018 | Williams et al. |
| 2018/0182088 | A1 | 6/2018 | Leordeanu et al. |
| 2018/0321660 | A1 | 11/2018 | Nemati et al. |
| 2019/0087772 | A1 | 3/2019 | Medina et al. |
| 2019/0096135 | A1 | 3/2019 | Dal Mutto et al. |
| 2019/0130214 | A1 | 5/2019 | N et al. |
| 2019/0149725 | A1 | 5/2019 | Adato et al. |
| 2019/0244008 | A1 | 8/2019 | Rivera et al. |
| 2020/0005225 | A1 | 1/2020 | Chaubard |
| 2020/0074402 | A1 | 3/2020 | Adato et al. |
| 2020/0118064 | A1 | 4/2020 | Perrella et al. |
| 2020/0118400 | A1 | 4/2020 | Zalewski et al. |
| 2020/0273013 | A1* | 8/2020 | Garner .................. G06Q 20/12 |
| 2020/0380317 | A1 | 12/2020 | Ghazel et al. |
| 2021/0304122 | A1 | 9/2021 | Dattamajumdar et al. |
| 2021/0383533 | A1 | 12/2021 | Zhao et al. |
| 2021/0400195 | A1 | 12/2021 | Adato et al. |
| 2022/0012677 | A1 | 1/2022 | Rongley |
| 2022/0067390 | A1 | 3/2022 | Khalili et al. |
| 2022/0083959 | A1 | 3/2022 | Skaff et al. |
| 2022/0108264 | A1 | 4/2022 | Skaff et al. |
| 2022/0138674 | A1 | 5/2022 | Skaff et al. |
| 2022/0138677 | A1 | 5/2022 | Foong |
| 2023/0274226 | A1 | 8/2023 | Patil et al. |
| 2023/0274227 | A1 | 8/2023 | Eggert |
| 2024/0112136 | A1 | 4/2024 | Vogel et al. |
| 2024/0135319 | A1 | 4/2024 | Vogel et al. |
| 2024/0212322 | A1* | 6/2024 | Bennet ................. G06V 10/764 |
| 2025/0078022 | A1 | 3/2025 | Vogel et al. |

OTHER PUBLICATIONS

Non-Final Office Action for U.S. Appl. No. 18/637,516, mailed Jul. 24, 2025, 12 pages.

* cited by examiner

100

500

600

START

RECEIVING IMAGE
FRAMES OF INVENTORY — 602

LOCATING STATIC
CONTROL POINTS — 604

DETECTING STORAGE
UNITS — 606

CALCUALTING STORAGE
UNIT COUNTS — 608

GENERATING DIGITAL
MODELS — 610

OVERLAP BETWEEN
DIGITAL MODELS? — 612

YES

NO

UPDATING STORAGE
UNIT COUNT — 614

END

700

705
RECEIVE DETECTION OF A FIRST CONTROL POINT TO DETERMINE A FIRST SPATIAL SEARCH OF A FIRST INVENTORY

710
DETECT, BY A MACHINE LEARNING MODEL AND BASED ON DEPTH ANALYSIS OF THE FIRST SPATIAL SEARCH, A FIRST PLURALITY OF STORAGE UNITS TO CALCULATE A STORAGE UNIT COUNT FROM A FIRST PLURALITY OF STORAGE UNIT COUNTS, EACH STORAGE UNIT COUNT FROM THE FIRST PLURALITY OF STORAGE UNIT COUNTS IS ASSOCIATED WITH A UNIT TYPE FROM A PLURALITY OF UNIT TYPES

715
GENERATE A DIGITAL MODEL FROM A FIRST PLURALITY OF DIGITAL MODELS AND THAT IS OVERLAYED AROUND EACH STORAGE UNIT FROM THE FIRST PLURALITY OF STORAGE UNITS

720
STORE FIRST INVENTORY DATA IN A DATABASE, SUCH THAT THE FIRST PLURALITY OF DIGITAL MODELS IS HIDDEN

725
RECEIVE DETECTION OF A SECOND CONTROL POINT TO DETERMINE A SECOND SPATIAL SEARCH OF A SECOND INVENTORY

730
DETECT, BY THE MACHINE LEARNING MODEL AND BASED ON DEPTH ANALYSIS OF THE SECOND SPATIAL SEARCH, A SECOND PLURALITY OF STORAGE UNITS TO CALCULATE A STORAGE UNIT COUNT FROM A SECOND PLURALITY OF STORAGE UNIT COUNTS, EACH STORAGE UNIT COUNT FROM THE SECOND PLURALITY OF STORAGE UNIT COUNTS IS ASSOCIATED WITH A UNIT TYPE FROM THE PLURALITY OF UNIT TYPES

735
GENERATE A DIGITAL MODEL FROM A SECOND PLURALITY OF DIGITAL MODELS AND THAT IS OVERLAYED AROUND EACH STORAGE UNIT FROM THE SECOND PLURALITY OF STORAGE UNITS

FIG. 7

1100
1109
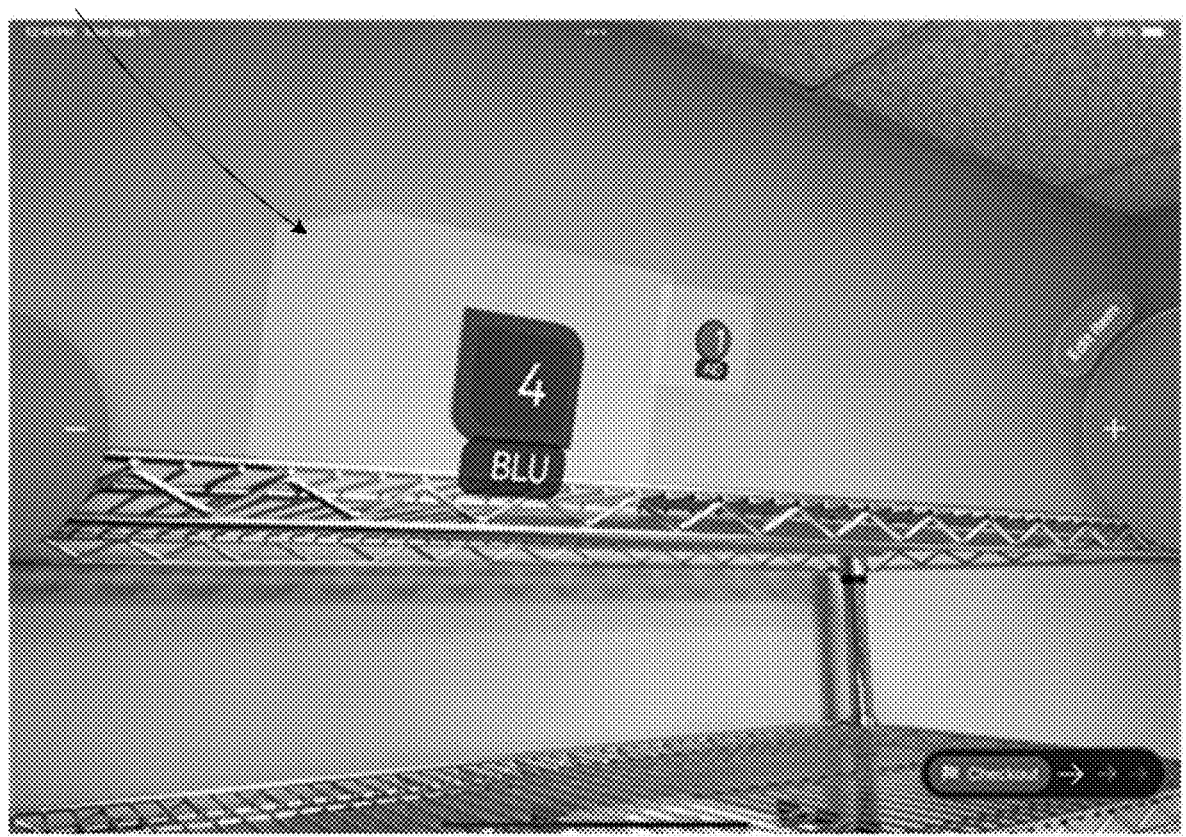
FIG. 11

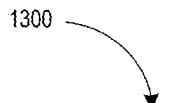
FIG. 13

1400

Storage Unit Counts C

Mesh Representation M

Set of Points P

Missing Storage Units MS

Storage Units S

Shelf SH

1800

1900

START

RECEIVING IMAGE FRAMES OF INVENTORY — 1910

IDENTIFYING A FRONT PLANE OF A SHELF WITH LIDAR — 1920

DETECTING STORAGE UNITS USING A MACHINE LEARNING MODEL — 1930

CALCULATING A DEPTH OF THE STORAGE UNITS — 1940

IS STORAGE UNIT AT A BACK OF THE SHELF? — 1950

YES

NO

CALCULATE STORAGE UNIT COUNTS USING THE DEPTH — 1960

CALCULATE STORAGE UNIT COUNTS USING MESH ANALYSIS — 1970

END

2000

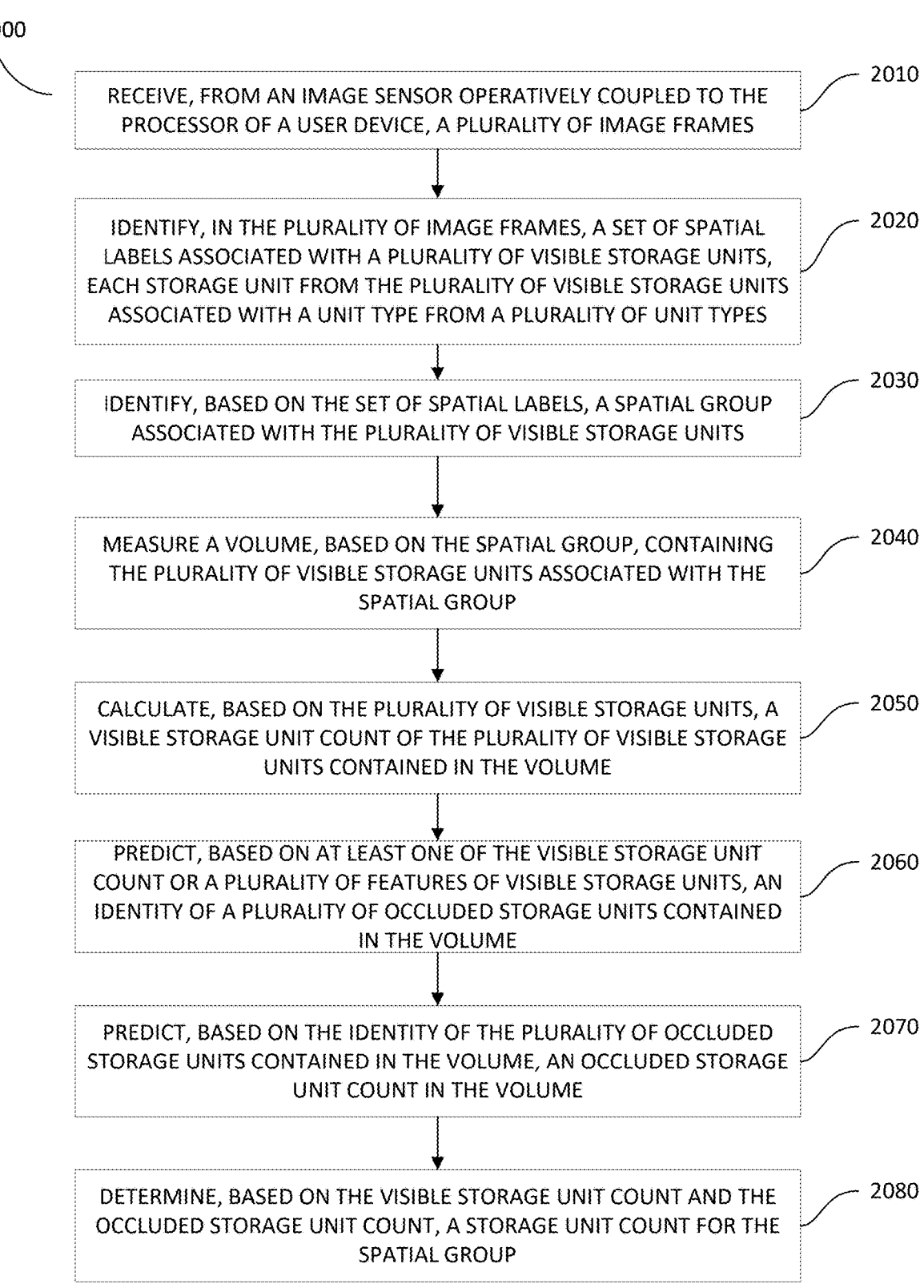

RECEIVE, FROM AN IMAGE SENSOR OPERATIVELY COUPLED TO THE PROCESSOR OF A USER DEVICE, A PLURALITY OF IMAGE FRAMES — 2010

IDENTIFY, IN THE PLURALITY OF IMAGE FRAMES, A SET OF SPATIAL LABELS ASSOCIATED WITH A PLURALITY OF VISIBLE STORAGE UNITS, EACH STORAGE UNIT FROM THE PLURALITY OF VISIBLE STORAGE UNITS ASSOCIATED WITH A UNIT TYPE FROM A PLURALITY OF UNIT TYPES — 2020

IDENTIFY, BASED ON THE SET OF SPATIAL LABELS, A SPATIAL GROUP ASSOCIATED WITH THE PLURALITY OF VISIBLE STORAGE UNITS — 2030

MEASURE A VOLUME, BASED ON THE SPATIAL GROUP, CONTAINING THE PLURALITY OF VISIBLE STORAGE UNITS ASSOCIATED WITH THE SPATIAL GROUP — 2040

CALCULATE, BASED ON THE PLURALITY OF VISIBLE STORAGE UNITS, A VISIBLE STORAGE UNIT COUNT OF THE PLURALITY OF VISIBLE STORAGE UNITS CONTAINED IN THE VOLUME — 2050

PREDICT, BASED ON AT LEAST ONE OF THE VISIBLE STORAGE UNIT COUNT OR A PLURALITY OF FEATURES OF VISIBLE STORAGE UNITS, AN IDENTITY OF A PLURALITY OF OCCLUDED STORAGE UNITS CONTAINED IN THE VOLUME — 2060

PREDICT, BASED ON THE IDENTITY OF THE PLURALITY OF OCCLUDED STORAGE UNITS CONTAINED IN THE VOLUME, AN OCCLUDED STORAGE UNIT COUNT IN THE VOLUME — 2070

DETERMINE, BASED ON THE VISIBLE STORAGE UNIT COUNT AND THE OCCLUDED STORAGE UNIT COUNT, A STORAGE UNIT COUNT FOR THE SPATIAL GROUP — 2080

FIG. 20

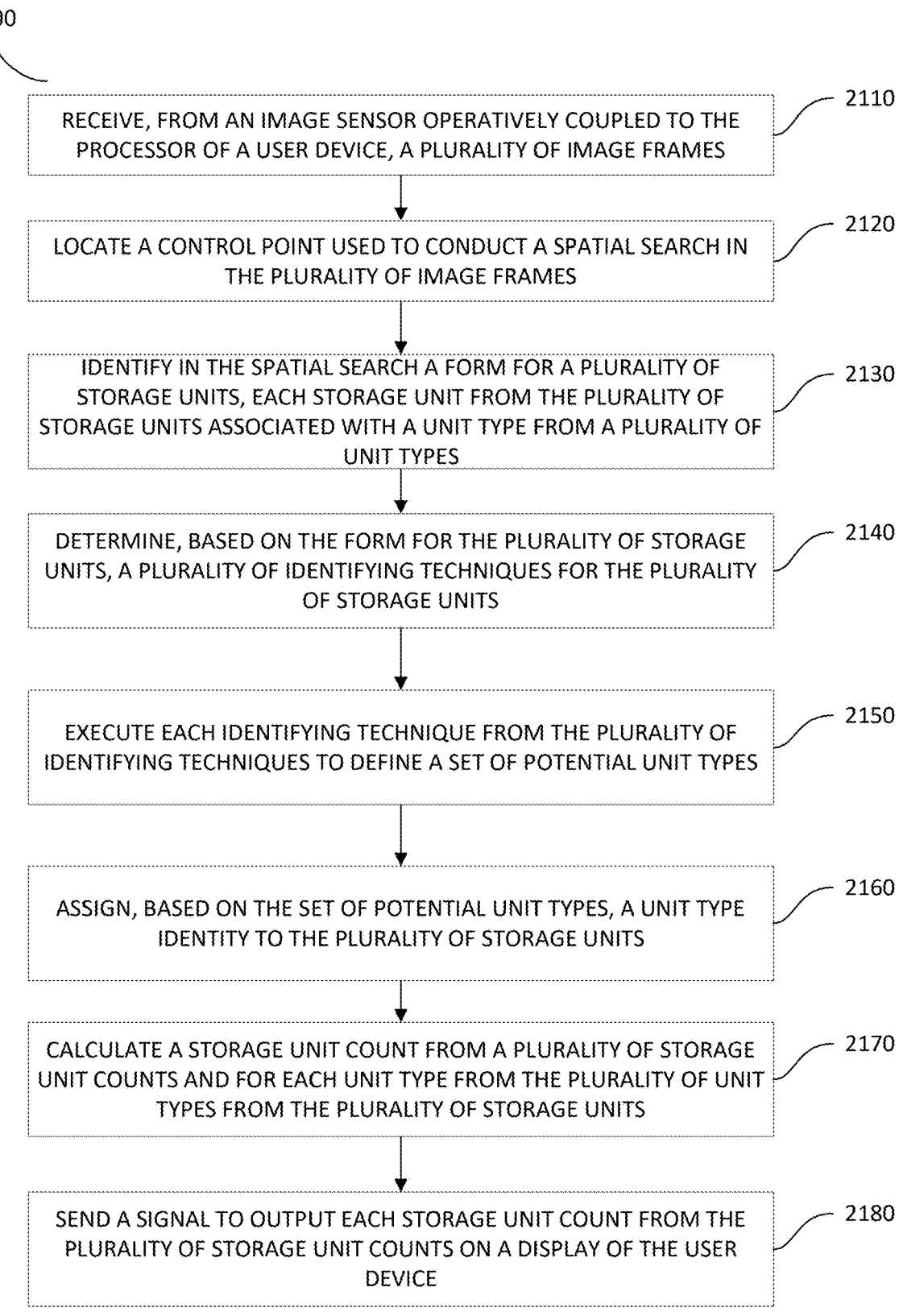

2100

RECEIVE, FROM AN IMAGE SENSOR OPERATIVELY COUPLED TO THE PROCESSOR OF A USER DEVICE, A PLURALITY OF IMAGE FRAMES ⌐ 2110

LOCATE A CONTROL POINT USED TO CONDUCT A SPATIAL SEARCH IN THE PLURALITY OF IMAGE FRAMES ⌐ 2120

IDENTIFY IN THE SPATIAL SEARCH A FORM FOR A PLURALITY OF STORAGE UNITS, EACH STORAGE UNIT FROM THE PLURALITY OF STORAGE UNITS ASSOCIATED WITH A UNIT TYPE FROM A PLURALITY OF UNIT TYPES ⌐ 2130

DETERMINE, BASED ON THE FORM FOR THE PLURALITY OF STORAGE UNITS, A PLURALITY OF IDENTIFYING TECHNIQUES FOR THE PLURALITY OF STORAGE UNITS ⌐ 2140

EXECUTE EACH IDENTIFYING TECHNIQUE FROM THE PLURALITY OF IDENTIFYING TECHNIQUES TO DEFINE A SET OF POTENTIAL UNIT TYPES ⌐ 2150

ASSIGN, BASED ON THE SET OF POTENTIAL UNIT TYPES, A UNIT TYPE IDENTITY TO THE PLURALITY OF STORAGE UNITS ⌐ 2160

CALCULATE A STORAGE UNIT COUNT FROM A PLURALITY OF STORAGE UNIT COUNTS AND FOR EACH UNIT TYPE FROM THE PLURALITY OF UNIT TYPES FROM THE PLURALITY OF STORAGE UNITS ⌐ 2170

SEND A SIGNAL TO OUTPUT EACH STORAGE UNIT COUNT FROM THE PLURALITY OF STORAGE UNIT COUNTS ON A DISPLAY OF THE USER DEVICE ⌐ 2180

FIG. 21

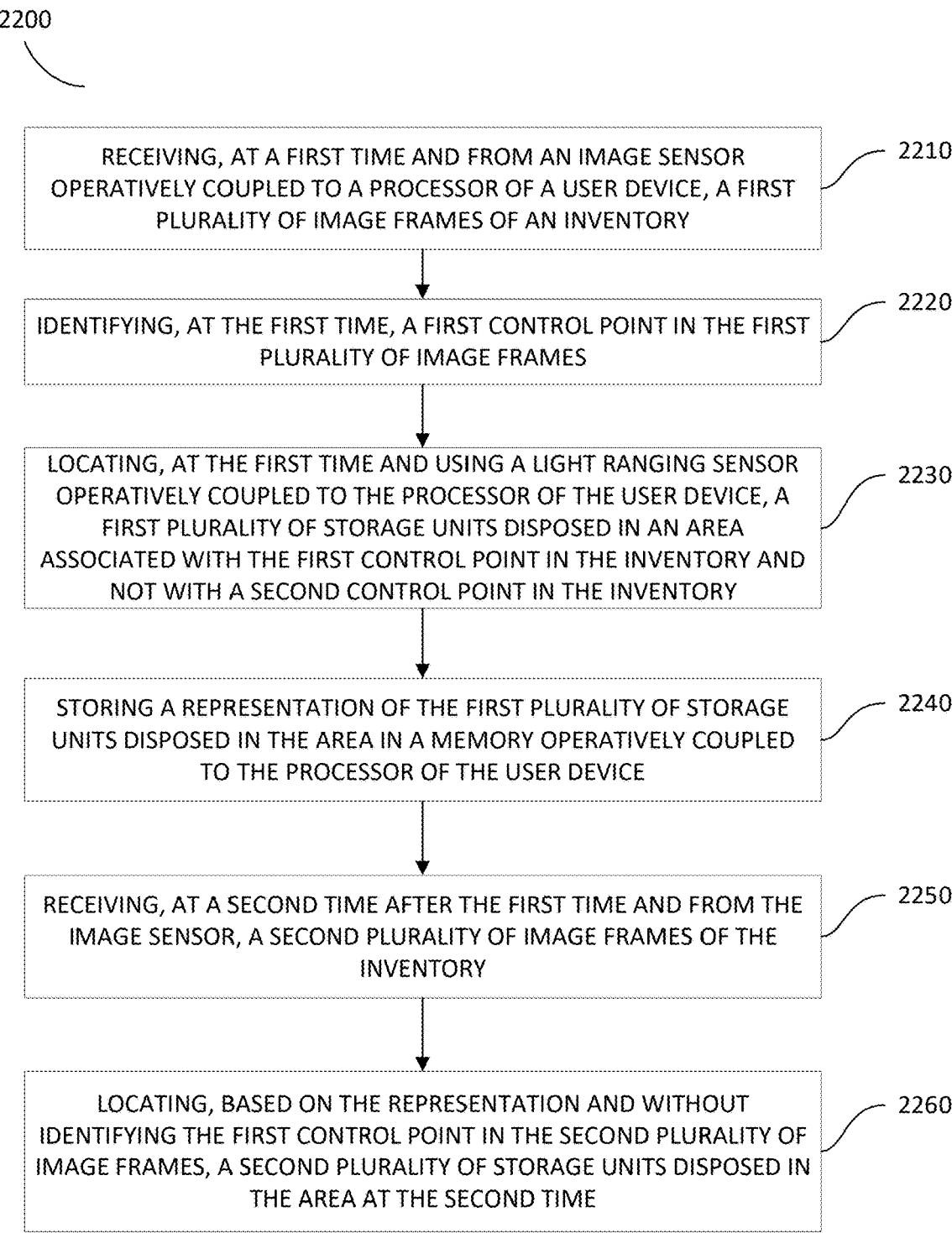

2200

RECEIVING, AT A FIRST TIME AND FROM AN IMAGE SENSOR OPERATIVELY COUPLED TO A PROCESSOR OF A USER DEVICE, A FIRST PLURALITY OF IMAGE FRAMES OF AN INVENTORY — 2210

IDENTIFYING, AT THE FIRST TIME, A FIRST CONTROL POINT IN THE FIRST PLURALITY OF IMAGE FRAMES — 2220

LOCATING, AT THE FIRST TIME AND USING A LIGHT RANGING SENSOR OPERATIVELY COUPLED TO THE PROCESSOR OF THE USER DEVICE, A FIRST PLURALITY OF STORAGE UNITS DISPOSED IN AN AREA ASSOCIATED WITH THE FIRST CONTROL POINT IN THE INVENTORY AND NOT WITH A SECOND CONTROL POINT IN THE INVENTORY — 2230

STORING A REPRESENTATION OF THE FIRST PLURALITY OF STORAGE UNITS DISPOSED IN THE AREA IN A MEMORY OPERATIVELY COUPLED TO THE PROCESSOR OF THE USER DEVICE — 2240

RECEIVING, AT A SECOND TIME AFTER THE FIRST TIME AND FROM THE IMAGE SENSOR, A SECOND PLURALITY OF IMAGE FRAMES OF THE INVENTORY — 2250

LOCATING, BASED ON THE REPRESENTATION AND WITHOUT IDENTIFYING THE FIRST CONTROL POINT IN THE SECOND PLURALITY OF IMAGE FRAMES, A SECOND PLURALITY OF STORAGE UNITS DISPOSED IN THE AREA AT THE SECOND TIME — 2260

METHODS AND APPARATUS FOR MACHINE LEARNING SYSTEM FOR EDGE COMPUTER VISION AND ACTIVE REALITY

FIELD

The present disclosure generally relates to the field of computer vision and machine learning. In particular, the present disclosure is directed to methods and apparatus for machine learning systems for edge computer vision and active reality.

BACKGROUND

The management of an inventory relies heavily on human-based calculations and actions. Some known systems allow humans to efficiently manage their inventory of items at massive scales using cameras placed in warehouses or retail spaces. Furthermore, some known systems require strict organization and single appearances per item without distinguishing the packaging of items sharing the same stock keeping unit (SKU) or the various ways items are stored. Moreover, some known systems use fixed cameras with computer vision and can require multiple cameras that are limited to specific areas and views with multiple blind spots. Additionally, such known technologies often rely on manual data input, which can be tedious, time consuming, and lead to inaccuracies.

Accordingly, a need exists for a computer vision and machine learning system for predictive and real-time inventory management.

SUMMARY

In some embodiments, a method includes: receiving, from an image sensor operatively coupled to a processor of a user device, a plurality of image frames. The method further includes identifying a front plane of a shelf in the plurality of image frames based on a light ranging sensor at the user device. The front plane of the shelf defines a control point used to conduct a spatial search. The method further includes inputting the plurality of image frames to a machine learning model to predict a plurality of storage units in the spatial search. Each storage unit from the plurality of storage units has a unit type from a plurality of unit types. The method further includes calculating, based on the light ranging sensor, a depth of the plurality of storage units in the spatial search. The method further includes, when a storage unit from the plurality of storage units is disposed at a back of the shelf, calculating, using the depth, a storage unit count from a plurality of storage unit counts and for each unit type from the plurality of unit types from the plurality of storage units identified. The method further includes when a storage unit from the plurality of storage units is not disposed at the back of the shelf, calculating, using a mesh analysis, a storage unit count from a plurality of storage unit counts and for each unit type from the plurality of unit types from the plurality of storage units identified.

In some embodiments, a non-transitory processor-readable medium stores instructions that when executed by a processor, cause the processor to: receive, from an image sensor operatively coupled to the processor of a user device, a plurality of image frames. The non-transitory processor-readable medium stores further instructions that cause the processor to identify, in the plurality of image frames, a set of spatial labels associated with a plurality of visible storage units. Each storage unit from the plurality of visible storage units has a unit type from a plurality of unit types. The non-transitory processor-readable medium stores further instructions that cause the processor to identify, based on the set of spatial labels, a spatial group associated with the plurality of visible storage units. The non-transitory processor-readable medium stores further instructions that cause the processor to measure a volume, based on the spatial group, containing the plurality of visible storage units associated with the spatial group. The non-transitory processor-readable medium stores further instructions that cause the processor to calculate, based on the plurality of visible storage units, a visible storage unit count of the plurality of visible storage units contained in the volume. The non-transitory processor-readable medium stores further instructions that cause the processor to predict, based on at least one of a plurality of features of visible storage units or the visible storage unit count, an identity of a plurality of occluded storage units contained in the volume. The non-transitory processor-readable medium stores further instructions that cause the processor to predict, based on the identity of the plurality of occluded storage units contained in the volume, an occluded storage unit count in the volume. The non-transitory processor-readable medium stores further instructions that cause the processor to determine, based on the visible storage unit count and the occluded storage unit count, a storage unit count for the spatial group.

In some embodiments, a non-transitory processor-readable medium stores instructions that when executed by a processor, cause the processor to: receive, from an image sensor operatively coupled to the processor of a user device, a plurality of image frames. The non-transitory processor-readable medium stores further instructions that cause the processor to locate a control point used to conduct a spatial search in the plurality of image frames. The non-transitory processor-readable medium stores further instructions that cause the processor to identify in the spatial search a form for a plurality of storage units. Each storage unit from the plurality of storage units has a unit type from a plurality of unit types. The non-transitory processor-readable medium stores further instructions that cause the processor to determine, based on the form for the plurality of storage units, a plurality of identifying techniques for the plurality of storage units. The non-transitory processor-readable medium stores further instructions that cause the processor to execute each identifying technique from the plurality of identifying techniques to define a set of potential unit types. The non-transitory processor-readable medium stores further instructions that cause the processor to assign, based on the set of potential unit types, a unit type identity to the plurality of storage units; calculate a storage unit count from a plurality of storage unit counts and for each unit type from the plurality of unit types from the plurality of storage units. The non-transitory processor-readable medium stores further instructions that cause the processor to send a signal to output each storage unit count from the plurality of storage unit counts on a display of the user device.

In some embodiments, a method, includes: receiving, at a first time and from an image sensor operatively coupled to a processor of a user device, a first plurality of image frames of an inventory. The method further includes identifying, at the first time, a first control point in the first plurality of image frames. The method further includes locating, at the first time and using a light ranging sensor operatively coupled to the processor of the user device, a first plurality of storage units disposed in an area associated with the first control point in the inventory and not with a second control point in the inventory. The method further includes storing a representation of the first plurality of storage units disposed in the area in a memory operatively coupled to the processor of the user device. The method further includes receiving, at a second time after the first time and from the image sensor, a second plurality of image frames of the inventory. The method further includes locating, based on the representation and without identifying the first control point in the second plurality of image frames, a second plurality of storage units disposed in the area at the second time.

BRIEF DESCRIPTION OF THE DRAWINGS

FIG. 7 is a flow diagram of a method for a machine learning system for edge computer vision and active reality, according to an embodiment.

FIG. 11 is an example screenshot of an inventory with active reality digital models overlayed in supposed locations of storage units, according to an embodiment.

FIG. 13 is an example screenshot example of an inventory with active reality digital models overlayed on storage units, according to an embodiment.

FIG. 20 is a flow diagram of a method for a machine learning system to predict an identity of occluded storage units in a volume, according to an embodiment.

FIG. 21 is a flow diagram of a method for inventory management via a user device using edge computer vision, active reality, and a predictive engine, according to an embodiment.

FIG. 22 is a flow diagram of a method for persisting storage units in active reality using control points, according to an embodiment.

DETAILED DESCRIPTION

Figure 1:
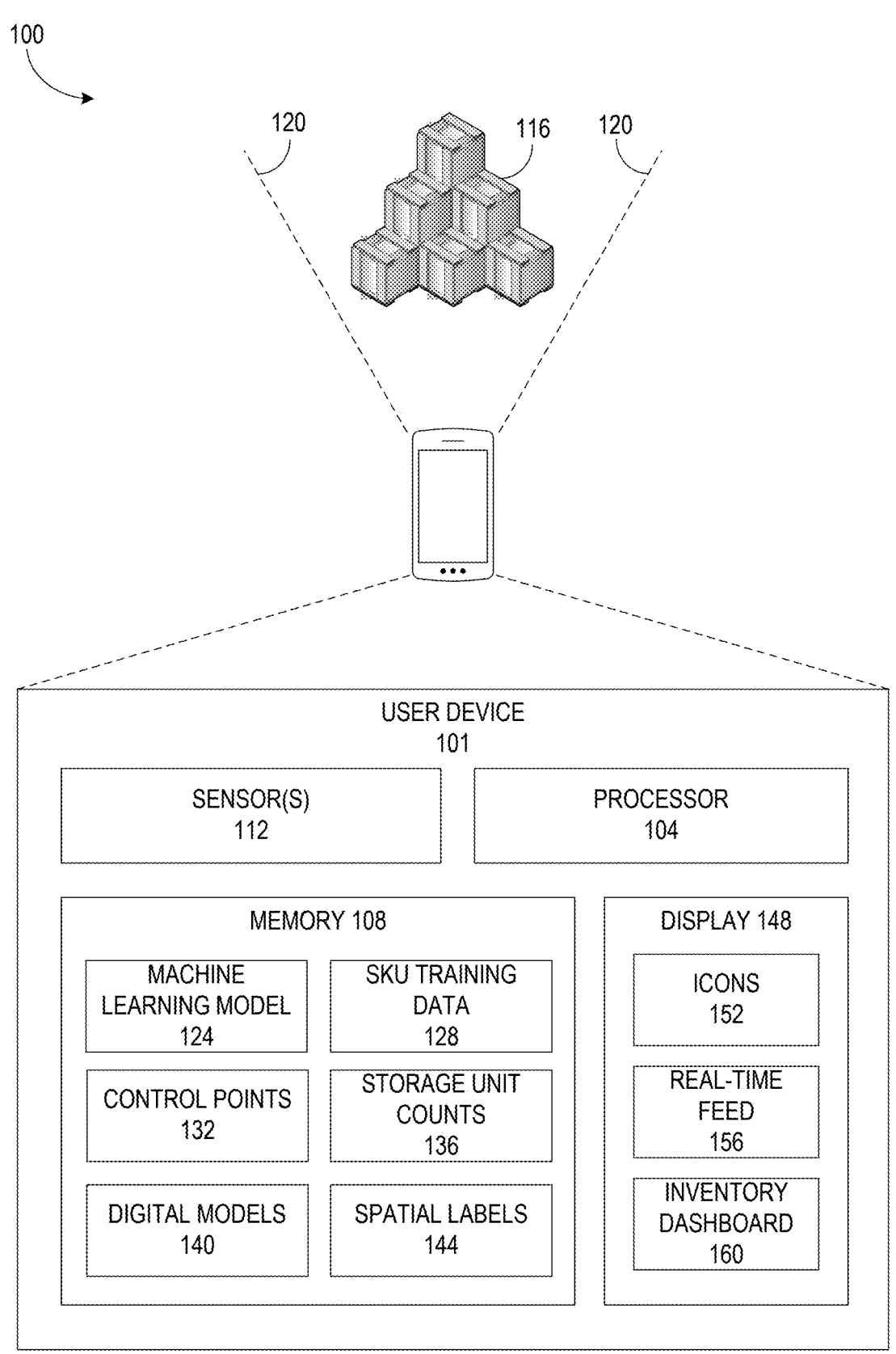
FIG. 1 is a block diagram of a user device for inventory management, according to an embodiment.

FIG. 1 is a block diagram of a system 100 for inventory management using edge computer vision and active reality, according to an embodiment. The system 100 includes a user device 101 and an inventory 116. The inventory 116 can include (or be) any physical storage of multiple storage units such as, for example, items, goods, merchandise, materials, products, and/or the like. The inventory 116 can also include a warehouse, closet, freezer, retail space, and/or any location for storing items. The inventory 116 can include multiple stock keeping units (SKUs). The SKU can also be referred to as a "storage unit." The SKU can be a unique code including letters and/or numbers that identify characteristics about each item and/or storage unit in the inventory 116, such as, for example, manufacturer, brand, style, color, size, type, product, and/or the like. In some instances, the inventory 116 can include storage unit identifiers for each storage unit such as, for example, labels, logos, barcodes, and/or the like. The inventory 116 can include multiple items of the same type (e.g., cans of coffee beans of the same type, bags of coffee powder, packed straws, cups of the same size, etc.). The inventory 116 can include storage units of different storage types, where the storage types are based on size, type of packaging, and/or the like. For example, storage types can include bottles, small items, large items, medium-sized boxes, large-sized boxes, large-sized bags, jars, and/or the like. The storage unit can include any goods and/or materials, such as, for example cartons of milk, bags of coffee powder, cups, boxes of chips and/or the like. The inventory 116 can also include multiple storage units and each storage unit can also be associated with a unit type. The unit type can include (or be) a name and/or product of the storage unit. In some implementations, multiple storage units can have the same unit type. For instance, the storage unit can be, for example, a "ketchup bottle" where the unit type for that storage unit is "ketchup" or "ketchup bottle." In some cases, the inventory 116 can store storage units that are of the same product or item (e.g., ketchup) and the common product, good, and/or material that those storage units share is the unit type. For example, the storage unit can have a storage type that is a bottle and a unit type that is ketchup. In some implementations, multiple storage units can include multiple subsets of storage units. In such implementations, each storage unit can be associated with each unit type from multiple unit types. For instance, one subset of storage units can be associated with ketchup and each storage unit of the subset associated with ketchup bottles is a ketchup bottle. In some instances, each storage unit in the subset of storage units is substantially identical and/or is the same good/material.

The user device 101 can be a compute device that includes a processor 104 and a memory 108 that communicate with each other, and with other components, via a bus (not shown). The bus can include any of several types of bus structures including, but not limited to, a memory bus, a memory controller, a peripheral bus, a local bus, and any combinations thereof, using any of a variety of bus architectures. The user device 101 can include, for example, a computer workstation, a terminal computer, a server computer, a laptop computer, a mobile/handheld device (e.g., a tablet computer, a smartphone, a smartwatch, smart glasses, headset etc.), any machine capable of executing a sequence of instructions that specify an action to be taken by that machine, and/or any combinations thereof. The user device 101 can also include multiple compute devices and/or other user devices that can be used to implement a specially configured set of instructions for causing one or more of the devices to perform any one or more of the aspects and/or methodologies disclosed herein. The user device 101 can include a computer vision device, an active reality device, an augmented reality device, and/or the like.

The user device 101 can include a network interface (not shown). A network interface device, such as the network interface, can be used for connecting the user device 101 to one or more of a variety of networks and one or more remote devices connected thereto. Examples of a network interface device include, but are not limited to, a network interface card (e.g., a mobile network interface card, a LAN card), a modem, and any combination thereof. Examples of a network can include a wide area network (e.g., the Internet, an enterprise network), a local area network (e.g., a network associated with an office, a building, a campus or other geographic space), a telephone network, a data network associated with a telephone/voice provider (e.g., a mobile communications provider data and/or voice network), a direct connection between two computing devices, and/or the like. The user device 101 can employ a wired and/or a wireless mode of communication.

The user device 101 includes one or more sensor(s) 112. The sensor(s) 112 can include, for example, digital image sensors such as, for example, a charge-coupled device (CCD), an active-pixel sensor (APS), and/or any digital image sensor a fabricated in metal-oxide-semiconductor (MOS), complementary metal-oxide-semiconductor (CMOS), N-type MOS (NMOS), Live MOS, or the like. In some implementations, the sensor(s) 112 can include a depth sensor such as, for example, a time-of-flight (TOF) sensor. The sensor(s) 112 can also include cameras such as, for example, an ultra-wide-angle camera, a wide-angle camera, a telephoto camera, monochrome camera, a macro camera, and/or the like. The sensor(s) 112 can also include a light detection and ranging (LiDAR) sensor and/or a time of flight (ToF) sensor. The sensor(s) 112 can be used to scan and/or capture multiple image frames of the inventory 116 and the inventory's 116 storage units. The sensor(s) 112 can capture and process the image frames in substantially real-time. A user can operate the user device 101 and control the location the sensor(s) 112 are capturing and/or for which the sensor(s) 112 are generating image frames. The sensor(s) 112 can also be used to capture the height of storage units that are stacked on top of each other such as, for example, cups, as described in further detail herein. In some cases, the sensor(s) can be configured to capture image frames in substantially real-time in a variety of locations and/or positions. For instance, in some implementations, the sensor(s) 112 can be positioned to point to the inventory 116 at multiple different angles (and multiple different spatial searches). In some cases, the user device 101 including the sensor(s) 112 can be mobile (and not at a fixed location) such that the sensor(s) 112 can be configured to identify objects from image frames captured at various positions and/or angles. While shown in FIG. 1 as being part of the user device 101, in some embodiments the sensor(s) 112 can be separate from, but communicatively coupled to, the user device 101.

The processor 104 can be or include, for example, a hardware based integrated circuit (IC), or any other suitable processing device configured to run and/or execute a set of instructions or code. For example, the processor 104 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 104 can be configured to run any of the methods and/or portions of methods discussed herein.

The memory 108 can store a machine learning model 124, SKU training data 128, control points 132, storage unit counts 136, digital models 140, and spatial labels 144. The memory 108 can be or include, for example, a random-access memory (RAM), a memory buffer, a hard drive, a read-only memory (ROM), an erasable programmable read-only memory (EPROM), and/or the like. In some instances, the memory can store, for example, one or more software programs and/or code that can include instructions to cause the processor 104 to perform one or more processes, functions, and/or the like. In some implementations, the memory 108 can include extendable storage units that can be added and used incrementally. In some implementations, the memory 108 can be a portable memory (e.g., a flash drive, a portable hard disk, and/or the like) that can be operatively coupled to the processor 104. The memory 108 can include various components (e.g., machine-readable media) including, but not limited to, a random-access memory component, a read only component, and any combinations thereof. In an example, a basic input/output system (BIOS), including basic routines that help to transfer information between elements within the user device 101, such as during start-up, can be stored in memory 108. The memory 108 can further include any number of program modules including, for example, an operating system, one or more application programs, other program modules, program data, and/or any combinations thereof.

The memory 108 can store instructions to cause the processor 104 to generate digital models 140 of the objects captured in the image frames via the sensor(s) 112 and store the digital models 140 in the memory 108. A digital model can include (or be) a real-time (or substantially real-time) virtual representation of a real-world physical object, such as, for example, the inventory 116, walls, floors, shelves, racks, storage units, and/or the like. The digital models 140 can be stored in the memory 108 and also presented on a display 148 in the form of active reality and/or augmented reality.

The memory 108 stores instructions to cause the processor 104 to capture, via the sensor(s) 112, multiple image frames and detect multiple storage units in the inventory 116. The image frames and a representation of detected storage units can be stored in the memory 108. The memory 108 stores instructions to further cause the processor 104 to detect, via the sensor(s) 112, a spatial search 120 including the inventory 116. The spatial search 120 can include (or be) a representation and/or a virtual representation of a zone, boundaries, borders, and/or an area within a space where the inventory 116 is located. Similarly stated, the spatial search 120 can define a layout of a space that holds and/or contains the inventory 116. The processor 104 can store coordinates of the spatial search 120 in the memory 108 to recognize and/or predict where the inventory 116 is supposed to be located and/or an area to be searched to identify the inventory 116. In some implementations, the spatial search 120 can be static and can act as points of an area of focus in the image frames for the sensor(s) 112 to capture information about the inventory 116. The coordinates and/or parameters of the spatial search 120 can be stored in the memory 108. This allows the processor 204 to filter, ignore and/or discard areas outside of the spatial search 120 to reduce computational overhead. Similarly stated, in some implementations the contents within the area of the spatial search 120 can be processed while the contents outside the area of the spatial search 120 can be discarded and/or ignored. In some implementations, the spatial search 120 can be manually modified by the user. In some implementations, the spatial search 120 can be automatically modified (e.g., if new inventory is recognized outside the area of the spatial search 120). In some implementations, the spatial search 120 can include a planogram for the inventory 116.

The control points 132 can include (or be) a representation and/or a placeholder for a barcode (e.g., quick-response (QR) code), a predetermined identifier, a predetermined indicator, a floor, a ceiling, walls, and/or the like, that define the location of storage units in the inventory 116. The control points 132 can be static control points in image frames that outline the location of the storage units. For instance, the static control points can remain in the same position in a virtual space and be used as reference points for the machine learning model 124 to generate a virtual representation of the inventory 116 and/or the area around the inventory 116 including virtual representations of the storage units. The control points 132 can also include (or be) representations of physical objects that store, hold, house, and/or maintain the storage units such as, for example, a rack, where the control points 132 include a representation of lower and upper shelves (e.g., a surface and/or plane of a shelf), dividers, columns, barriers, beams, frames, pallets, a makeline, where the control points 132 include a representation of corners, drawers, doors, shelves, and/or the like. Similarly stated, the control points 132 can act as a static representation of an inventory housing object (e.g., the rack, the shelve, etc.). In some implementations, the controls points 132 can be manually set by the user (e.g., a barcode). In some implementations, the control points 132 can also be temporary. In some implementations, the control points 132 can also be digital models 140, where the control points 132 are substantially real-time virtual representations of static objects such as, for example, walls, racks, shelves, floors, ceilings, barcodes, QR codes, predetermined identifiers, or the like. Multiple control points from multiple locations, inventories, and/or warehouses can be stored in the memory 108. Similarly, attributes of the control points 132 can be stored in the memory 108, including, for example, a location (e.g., GPS coordinates) of a control point in an inventory.

In some implementations, the control points 132 can be moved in a virtual space within the spatial search 120 via user inputs on a touchscreen, which can also act as a display 148, of the user device 101. For instance, the user can tap on the touchscreen where a control point of interest is located and drag across the touchscreen to a desired location of the virtual space within the spatial search 120 as shown on the display 148. In another example, the user can point and tap on the touchscreen where the location of the touchscreen that was tapped represents a virtual representation of the desired location for the control point to be set at. The user can also use the touchscreen to remove and/or place new control points throughout the virtual space within the spatial search 120 and/or the inventory 116.

The machine learning model 124 can include, for example, a supervised machine learning model and/or an unsupervised machine learning model. The machine learning model 124 and/or the user device 101 can include and/or enable computer vision. The machine learning model 124 can include a convolutional neural network (CNN), a recurrent neural network (RNN) and/or any neural network or other suitable machine learning model. The machine learning model 124 can include an end-to-end machine learning model. The end-to-end machine learning model can learn the steps between an initial input phase (e.g., image frames) and an output result (e.g., identification of digital models 140, identification of storage units, storage unit counts 136, etc.). The machine learning model 124 can be trained to identify storage units and/or calculate the storage unit counts 136. In some implementations, the machine learning model 124 can enable edge computer vision by processing image frames in close proximity to the inventory 116. In some implementations, the machine learning model 124 can be selected based on a location type of a storage unit. The location type can be representative of structured or unstructured placement of storage units. For example, a storage unit on a makeline may have a structured placement, whereas a storage unit in a box may have an unstructured placement. In response to detecting a makeline, the user device 101 can select (e.g., automatically, via input from a user, or otherwise) a machine learning model 124 tailored towards structured placement detection (e.g., a pose-aware object detector, etc.). In response to detecting a box, the user device 101 (e.g., automatically, via input from a user, or otherwise) can select a machine learning model 124 tailored towards unstructured placement detection (e.g., instance segmentation models, etc.).

In some implementations, the user device 101 can predefine a number of potential storage unit types that can be stored at a type of location. For example, the user device 101 can predefine that food products can be stored at a makeline, and/or that storage units other than food products (e.g., hiking gear, clothing articles, etc.) cannot be stored at a makeline. The user device 101 can predefine by, for example, updating tables of a database to associate the makeline location with food products. Pre-defining the number of potential storage unit types that can be stored at a location can reduce a computation time and/or complexity of the machine learning model 124 by reducing a number of possibilities of what the storage unit type can be. The user device 101 can update the number of potential storage unit types to reflect a change to an intended function of a location type.

In some implementations, the user device 101 can predefine a number of potential storage unit types that can be stored at a specific location, such as, for example, an aisle or a shelf of an aisle. For example, the user device 101 can designate the aisle as a cereal aisle and can predefine what types of cereal products can be stored in the cereal aisle. The user device 101 can predefine by, for example, updating tables of a database to associate the one or more type of cereal products with the cereal aisle. The user device 101 can update the number of potential storage unit types to reflect a change to an intended function of the location.

The machine learning model 124 can be configured to detect the multiple storage units and/or calculate a storage unit count from multiple storage unit counts 136 of each unit type from multiple unit types using the image frames as an input. In some cases, the storage unit count can include a total number for each storage unit associated with the same unit type from the multiple unit types. In some cases, the storage unit count can include a total number for each storage unit in a subset of storage units associated with a unit type. The machine learning model 124 can be trained using the SKU training data 128. In some implementations, the SKU training data 128 includes an augmented storage unit digital model correlated to a storage unit identity. The memory 108 can store instructions to cause the processor 104 to continuously, sporadically and/or periodically provide the machine learning model 124 with data (e.g., SKU training data) to generate a robust and/or trained machine learning model. In some implementations, the machine learning model 124 can be trained synthetically. For instance, the machine learning model 124 can be trained in a virtual and a live training environment using the storage units.

In some implementations, the sensor(s) 112 can identify and classify storage units having various shapes. For example, bags of rice can have a freeform shape based on how the bags were handled. In some implementations, the sensor(s) 112 can determine identities of storage units by scanning identifiers of the storage units (e.g., labels, logos, etc.). In some cases, the sensor(s) 112 can scan and determine dimensions of storage units (e.g., height, width, length, etc.) without using LIDAR. The machine learning model 124 can use data including dimensions of storage units, shapes of storage units, location of storage units, labels of storage units and/or the like to determine storage unit counts 136. The data including dimensions of storage units can be included in the SKU training data 128 for the training of the machine learning model 124. In some cases, the sensor(s) 112 can also scan storage units to determine level of fullness of containers (e.g., cans, jars, boxes, etc.), as described in further detail herein.

The augmented storage unit digital model can include a virtual and/or real-time representation, model, shape, and/or layout of the storage unit that the machine learning model 124 can be trained to recognize. The augmented storage unit digital model can also include scanned physical identifiers (e.g., the storage unit identifiers) such as, for example, labels, pictures, logos, or the like, physically located on the storage unit. The identification of a storage unit can be used to count the number of other similar storage units (e.g., other cartons of milk). In some implementations, the augmented storage unit digital model can be from digital models 140 stored in the memory 108 from previously processed image frames of previously identified storage units. In some implementations, the memory 108 can also store the storage unit identifiers to reduce computational overhead in identifying the digital models 140 of the storage units and calculating the total number of each storage unit of each unit type in the inventory 116. For instance, the machine learning model 124 can use optical character recognition (OCR) to read and/or recognize the storage unit identifiers on the storage units and/or text (e.g., barcode, keywords, product number, etc.) on the storage units and compare the text and/or storage unit identifiers to the text and/or storage unit identifiers stored in the memory 108 and/or a database. In some cases, the storage unit can include a box containing multiple storage units, for example, a box of milk cartons. For example, the machine learning model 124 can use OCR to read and/or identify text on the box. The text can indicate a number of milk cartons in the box and the machine learning model 124 can use that number to generate (or update) the storage unit count for milk cartons. In some cases, following OCR to read and/or identify text captured on storage units, shelves, walls, labels, etc., the processor 104 can identify patterns of images, letters, and/or the like that form words, phrases, brand logos, and/or the like to search the memory 108 and/or a database to determine the identities of storage units. For example, the machine learning model 124 can be further trained to match certain combinations of letters, words, and/or images to a specific unit type (e.g., milk cartons, bottles, cups, etc.,). In some implementations, the augmented storage unit digital model(s) can be displayed on, for example, the display 148.

In some implementations, the machine learning model 124 can alternatively and/or additionally identify the storage units based on a shape and/or form of the storage unit identifiers. For instance the sensor(s) 112 (e.g., LiDAR, image device, etc.) can detect that the storage unit can include a shape, size, form, label, logo, and/or image unique to a specific unit type and count how many storage units share the same shape, size, form, label, logo, and/or image. In some implementations, the machine learning model 124 can generate a planogram of the inventory 116. The planogram can be used as a map for a machine learning model 124 to use to identify storage units and/or generate digital models 140 for the storage units. This is so, at least in part, for the machine learning model 124 to better predict and/or identify storage units and/or digital models 140 of storage units in substantially real-time. The planogram can include data about the inventory, including what storage units and/or what storage unit types of the storage units are present. The planogram can further include properties for the storage units, such as a placement, an orientation with respect to a customer, a size, etc. In some instances, the planogram can, for example, include data indicating that a facing in the inventory was serviced.

In some implementations, color histograms can be used to identify a storage unit (alone or in conjunction with other identification methods described herein). In some implementations, the memory 108 stores instructions to cause the processor 104 to detect, via the machine learning model 124, storage units based on a shape and/or type of the storage units. The machine learning model 124 (or another model not shown in FIG. 1) can apply a color histogram to a portion of an image including the storage unit. The color histogram can be a graphical representation of colors of the portion of the image including the storage unit and can represent a frequency of pixels within specific color ranges. The processor 104 can compare the color histogram of the portion of the image including the storage unit to a predefined color histogram associated with a similar storage unit (e.g., a storage unit having the same type and/or shape as the storage unit in the image) stored in the memory 108 and/or a database. The processor 104 can predefine color histograms at a time before detecting storage units. In response to determining a substantial match (e.g., a less than perfect match in the range of greater than 80%, 90%, 92%, 95%, or 99%) between the color histogram of the portion of the image including the storage unit and the predefined color histogram, the processor 104 can identify the storage unit in the image. For example, the machine learning model 124 can detect a bag in an image. The processor 104 can apply a color histogram to the portion of image including the bag and match the color histogram with a predefined color histogram from multiple predefined color histograms stored in the memory 108. The processor 104 can identify the bag (e.g., a brand, manufacturer, product associated with the bag, etc.) based on the match.

In some implementations, the memory 108 stores instructions to cause the processor 104 to detect, via the machine learning model 124, the multiple storage units within an area outlined by the spatial search 120. In some cases, the storage unit can be placed sideways, placed down flat, upside down, or the like. In some cases, multiple storage units can be stacked on a shelve on top of each other, behind each other, next to each other, and/or the like. The machine learning model 124 can be configured to detect, via shape analysis, each storage unit area, where the area can include multiple spatial storage units). After the storage units and/or the area where the storage units are located are detected, the machine learning model 124 can also determine a depth of each storage unit to identify each storage unit to be counted for generating the storage unit counts 136. For instance, as the sensor(s) 112 capture image frames of the storage units from different angles, positions, and/or locations, the shape of the storage units in the image frames can be different. The machine learning model 124 can calculate different measurements of the same storage unit in a 3D space of the spatial search 120 and/or the inventory 116 and determine that that storage unit across multiple image frames from different angles is the same storage unit.

In some implementations, the multiple storage units do not have a predefined orientation. For instance, a storage unit including a box of cereal can be facing the sensor(s) 112. In such an instance, for example, the storage unit identifier, such as, for example, a logo, is captured by the sensor(s) 112. In some instances, the box of cereal can be flipped around showing its barcode to the sensor(s) 112. In such an instance, the sensor(s) 112 can scan the barcode. As such, in some implementations the sensor(s) 112 can identify multiple different identifiers (e.g., logo and barcode) of the storage unit identifier. In some instances, the box of cereal can be lying flat. The machine learning model 124 can detect and/or identify the storage unit in multiple orientations, forms, angles, and/or the like. The machine learning model 124 can also detect the storage unit without a predefined field of view of the sensor(s) 112. For instance, the sensor(s) 112 can be capturing image frames of the storage unit from one field of view and at a different field of view. The machine learning model 124 can correctly detect and/or identify the storage unit despite different field of views from the sensor(s) 112.

In some implementations, the machine learning model 124 can identify and/or confirm the identity of the storage unit based on the shape of the digital models 140 generated based on depth analysis via LiDAR. In some cases, cups can be stored as stacks and the user device 101 can capture and calculate a height of the stack of cups and the machine learning model 124 can determine, based on the height of the stack of cups and a height of a single cup, the storage unit count for the cups.

Alternatively or additionally, the user device 101 can include a second machine learning model (not shown in FIG. 1) different from the machine learning model 124. In such implementations, the first machine learning model (e.g., the machine learning model 124), can be used to identify and/or detect the storage units and the second model can be used to calculate the storage unit counts 136 using the identification of the storage units as inputs. In some instances, the first machine learning model can also generate the digital models 140 for the identified storage units using the image frames as inputs.

The storage unit counts 136 can include (or be) numerical values that represent a total number of each unit type in the inventory 116 (e.g., the number of cartons of milk, number of bags of coffee powder, number of straws, etc.). In some cases, the storage unit counts 136 can include duplicate storage units and/or incorrect counts of a different unit type (e.g., a carton of cream may be included in a count as a carton of milk). The memory 108 can store instructions to cause the processor 104 to detect duplicate counted storage units and/or duplicate counts and remove the duplicate counted storage units in the storage unit counts 136 for a unit type. In some implementations, for example, the memory 108 stores instructions to cause the processor 104 to calculate the storage unit counts 136 by detecting the height of a stack of storage units via the sensor(s) 112 and/or by detecting a depth of the storage units via sensor(s) 112, as described in further detail herein. In some implementations, a height and/or depth of the storage units can be identified by conducting a look-up of the height and/or depth of a storage unit, a shelf, a storage rack and/or the like in a database.

The spatial labels 144 can include digital representations and/or substantially real-time virtual representations of a unit type identifier for each unit type and/or each subset of storage units associated with each unit type and its designated location for storage using the control points 132 and/or in the spatial search 120. In some implementations, the spatial labels 144 can be static in an augmented/active reality space. Specifically, storage units detected inside a designated location outlined by the spatial labels 144 are counted in the storage unit count associated with the spatial labels. In some implementations, the memory 108 stores instructions to cause the processor 104 to identify the spatial label for each subset of storage units from multiple subsets of storage units from multiple storage units, and calculate, via the machine learning model 124, the storage unit count for each subset of storage units associated with each unit type. For instance, the sensor(s) 112 can be used to detect the storage units in the image frames, the digital models 140 of the storage units, and the spatial labels 144 of the storage units to count, via the machine learning model 124, the total number of storage units for each unit type to generate the storage unit counts 136. In some instances, the machine learning model 124 can count the total number of storage units associated with each unit type using the digital models 140 and the spatial labels 144 to generate the storage unit counts 136. In some implementations, the machine learning model 124 can also determine the identities of the storage units in the designated location of the spatial label from the multiple spatial labels 144 regardless of the angle of placement of the storage units (e.g., upside down, lying flat, sideways, etc.).

For instance, the processor 104 can determine that the top shelf of a rack is designated for milk cartons (e.g., based on a spatial label, a barcode, etc.). The memory 108 can store a representation of the milk cartons (e.g., the spatial labels 144), where the representation can also include a control point (e.g., the control points 132) at the top shelf. This allows, for example, the machine learning model 124 to count the storage units detected on the top shelf as cartons of milk without using additional sensors for scanning each storage unit's physical labels, each storage unit's shape, and/or the like, to reduce computational overhead. The spatial labels 144 can be configured, updated, modified, moved to a different location, and/or the like. In some implementations, the spatial labels 144 can also be a real-time virtual representation that appears at a location in the inventory 116 that is designated for each unit type and/or each subset of storage units associated with each unit type. In some implementations, the spatial labels 144 can be viewed on the display 148 in the form of active reality and/or augmented reality. In some implementations, the control points 132 can be set manually (e.g., virtually and/or physically using, for example, a barcode on a rack).

In some implementations, the user device 101 can optionally include an inventory management system (not shown in FIG. 1). The inventory management system can include a software program and/or code that can generate a digital dashboard to organize the storage unit counts 136. The inventory management system can also include an interactable feature that allows the user to analyze, manage, and/or view the storage units, the unit types, the storage unit counts 136, and/or the like. The inventory management system can be executed by the processor 104 and enable the user to manually make changes to, for example, storage unit counts 136, renaming of unit types, ordering storage units, and/or the like. In some implementations, the memory 108 can store instructions to cause the processor 104 to generate a storage unit report. In some implementations, the inventory management system can enable the user to make changes based on the storage unit report. In some implementations, the inventory management system can track information in the storage unit report (or other information captured by the user device 101). The storage unit report can include any information describing the storage units, storage unit counts 136, the inventory 116, the spatial search 120, coordinates of the spatial search 120, the control points 132, coordinates of the control points 132, the digital models 140, the spatial labels 144, storage unit identifiers, icons 152, and/or the like.

The inventory management system can produce data such as, for example, sales data and/or asset data, based on the tracking. The data can be included in the storage unit report or in other reports such as a sales report and/or an asset report. For example, the inventory management system can cause the processor to calculate the sales data based on a change to the storage unit counts 136 and include the sales data in the sales report. In another example, the inventory management system can document fixtures, labels, carts, baskets, signage, an/or the like to include in the asset report. For example, the user device can scan a shelf in the inventory at a first time (e.g., at 9 PM on any given day) and calculate storage unit counts and/or missing storage unit counts for storage units on the shelf using methods described herein. The user device can scan the shelf in the inventory at a second time after the first time (e.g., at 9 PM the next day) and calculate storage unit counts and/or missing storage unit counts for storage units on the shelf using methods described herein. The user device can compare the storage unit counts at the first time and at the second time to determine how many storage units were removed from the shelf and were presumably sold between the first time and the second time. The user device can update the sales report with sales data based on the amount of storage units removed from the shelf. The user device can update the sales report with sales data based on amounts of storage units removed from multiple shelves in the inventory. The user device can update the sales report at, for example, a designated time each day, multiple days, week, month, etc.

In some implementations, the memory 108 can also store a restock status. The restock status can include (or be) an alert, a signal, a sign, and/or the like, that indicates a low number of storage units associated with the unit type. In some implementations, the low number indicates that the subset of storage units associated with the unit type is running low, out of stock, and/or requires restocking. For instance, the restock status can include a warning that the stock of cartons of milk is low and/or empty. The restock status can include a sign that there is no imminent need to restock the cartons of milk. In some implementations, the restock status can generate an alert based on the storage unit counts 136 falling below a restock threshold. The restock threshold can include a minimum and/or maximum value for the storage unit counts 136, where the storage unit counts 136 falls below or exceeds the restock threshold, the alert can be generated indicating that a restock of the unit type is desired. In some cases, the restock threshold for each unit type can be different. In some implementations, the memory 108 stores instructions to cause the processor 104 to execute the restock based on the alert generated/triggered for one or more unit types. In some implementations, executing the restock can include automatically ordering multiple storage units for the one or more storage units indicated for restock. In some implementations, executing the restock can include a just-in-time (JIT) delivery of the storage unit requiring and/or triggered for the restock.

The user device 101 can include a display 148. The display 148 can include (or be) an electronic device with a screen used for display and/or presentation of information and pictures, such as, multiple icons 152, a substantially real-time feed 156, and/or an inventory dashboard 160. The display 148 can include a monitor such as, for example, an LED monitor, an OLED monitor, an AMOLED monitor, and/or the like. In some implementations, the display 148 can include (or be) a touchscreen to receive user inputs via touching the display 148.

The icons 152 for spatial search 120 can include three-dimensional (3D) objects such as, for example, spheres, cubes, prisms, or the like, that act as virtual representations for the objects identified in the image frames. In some implementations, the icons 152 can be based on the storage unit, the storage type of the storage unit, and/or the unit type from the multiple unit types. In some implementations, the icons 152 can also include various storage type colors that are based on the storage type of each storage unit. Certain icons 152 that can be presented on the display 148 are further described in detail with respect to FIGS. 8-14. In some implementations, the icons 152 can be visible representations of the digital models 140 for the objects identified in the image frames. In some implementations, the icons 152 can also include storage unit labels for each unit type and/or subset of storage unit associated with the unit type. In some implementations, the icons 152 for the storage unit labels can include natural language identifiers, letters, abbreviations, and/or the like. In some implementations, the icons 152 can also include a numerical label for the storage unit count of each unit type. For example, at a control point designated for cups, an icon for the control point can include a label of "CUP" that hovers above the designated space for storage units that are cups. Each cup can be associated with a green sphere, where the green color is designated for small size storage object units. In some implementations, any other colors or designations can be displayed. The memory 108 can store instructions to cause the processor 104 to generate icons 152 for the control points 132 and a spatial label for each unit type from the plurality of unit types.

The display 148 can present a substantially real-time feed 156. The substantially real-time feed 156 can include a real-time display of the environment that is being captured by the sensor(s) 112 that also include the icons 152 that are continuously generated and/or modified based on the movement of the sensor(s) 112 and/or the user device 101. For instance, the user operating the user device 101 can point the sensor(s) 112 at the inventory 116 including a box of coffee bags. The substantially real-time feed 156 can present the actual environment seen by the sensor(s) 112 as well as the icons 152 for the objects (e.g., the box of coffee bags) and the relevant information of the objects (e.g., storage unit labels, storage unit counts, etc.) in substantially real-time (e.g., with little or no perceivable delay) on the display 148.

The display 148 can also present an inventory dashboard 160. The inventory dashboard can include (or be) a list of unit types, storage unit counts 136, the restock status for each unit type, and/or the like. The inventory dashboard 160 is further described in detail with respect to FIG. 15. In some implementations, the inventory management system can also include the inventory dashboard 160. In such implementations, the inventory management system and the inventory dashboard 160 can include (or be) a user interface and/or user experience platform.

In some implementations, the user device 101 can also be used for gamification purposes based on the icons 152, digital models 140, inventory dashboard 160, and/or the like. The system 100 can also be integrated into existing camera systems. For instance, the processor 104 can generate icons 152 such as, for example, 3D coins and/or 3D toys scattered throughout a virtual space outlined by the spatial search 120 that the user can locate while moving around the inventory 116 and pointing the sensor(s) 112 at different locations in or around the inventory 116. The 3D coins/toys can also be hidden and behind physical objects (e.g., behind a first storage unit with other storage units stacked behind the first storage unit, on top of a top shelf, under a bottom shelf, behind a wall, etc.). In some cases, the processor 104 can generate temporary icons at a virtual location in the inventory 116 to indicate that a storage unit should be placed there and/or is missing from its group of storage units (e.g., area designated for specific unit types and/or spatial labels 144).

Figure 2:
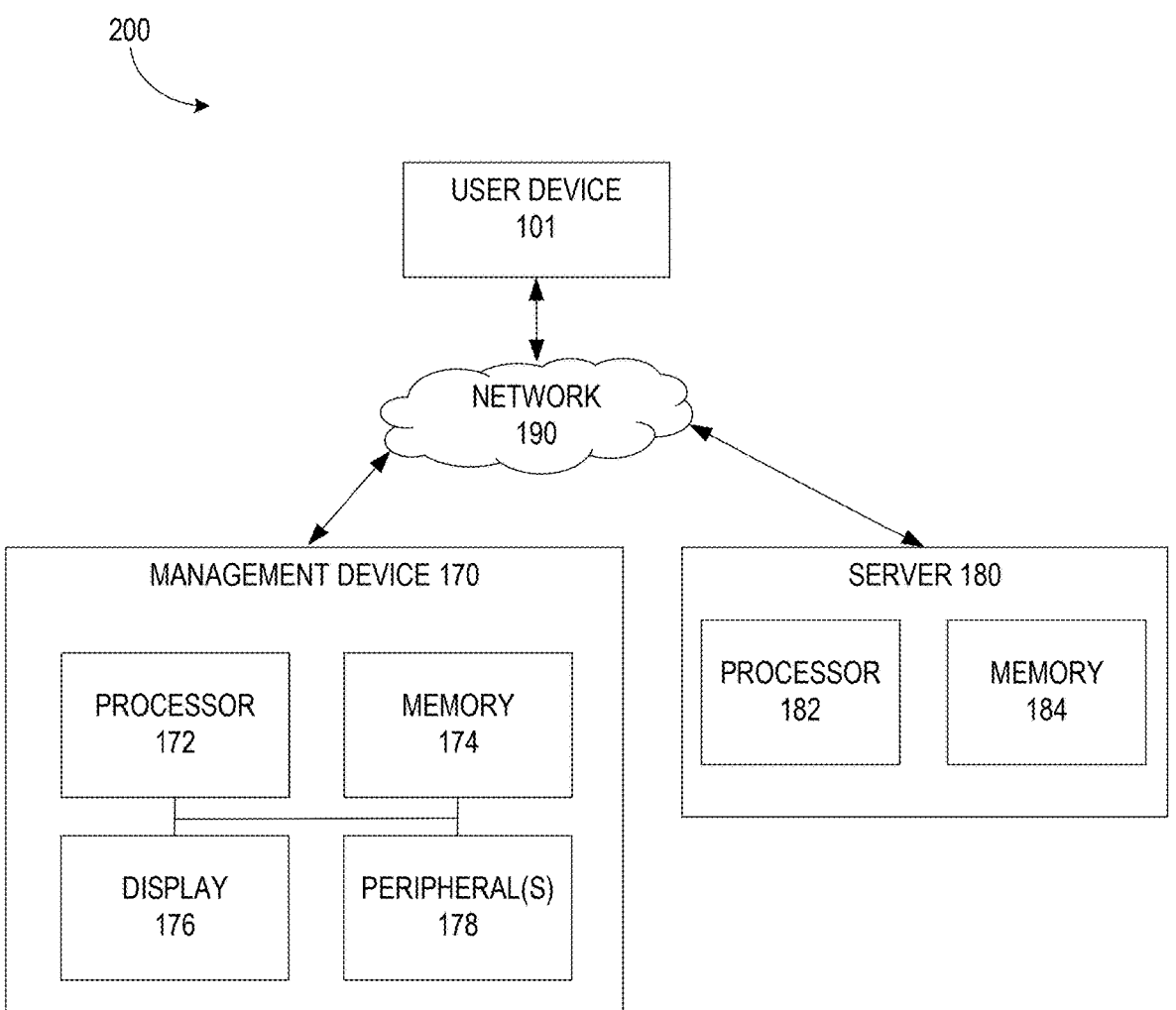
FIG. 2 is a block diagram of a system for inventory management using edge computer vision and active reality, according to an embodiment.

FIG. 2 is a block diagram of a system 200 for inventory management using edge computer vision and active reality, according to an embodiment. The system 200 includes the user device 101 of FIG. 1, a management device 170, a network 190, and a server 180. In some implementations, some of the functions and/or processes described as being executed at and/or performed by user device 101 with respect to FIG. 1, can be executed and/or performed by the server 180 and/or the management device 170.

The server 180 can include a processor 182 operatively coupled to a memory 184 storing instructions for execution by the processor 182. The processor 182 of the server 180 can be or include, for example, a hardware based integrated circuit (IC), or any other suitable processing device configured to run and/or execute a set of instructions or code. For example, the processor 182 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 104 can be configured to run any of the methods and/or portions of methods discussed herein.

The memory 184 of the server 180 can be or include, for example, a random-access memory (RAM), a memory buffer, a hard drive, a read-only memory (ROM), an erasable programmable read-only memory (EPROM), and/or the like. In some instances, the memory can store, for example, one or more software programs and/or code that can include instructions to cause the processor 182 to perform one or more processes, functions, and/or the like. In some implementations, the memory 184 can include extendable storage units that can be added and used incrementally. In some implementations, the memory 108 can be a portable memory (e.g., a flash drive, a portable hard disk, and/or the like) that can be operatively coupled to the processor 182. The memory 184 can include various components (e.g., machine-readable media) including, but not limited to, a random-access memory component, a read only component, and any combinations thereof. In one example, a basic input/output system (BIOS), including basic routines that help to transfer information between elements within server 180, such as during start-up, can be stored in memory 184. The memory 184 can further include any number of program modules including, for example, an operating system, one or more application programs, other program modules, program data, and/or any combinations thereof.

The server 180 can include (or be) a hardware device that provides functionality for devices over the network 190 and/or connected to the network 190, such as, for example, the user device 101 and the management device 170. In some implementations, the server 180 can include (or be) a remote device that can process multiple requests of the user device 101. For instance, the user device 101 can capture multiple image frames and send the image frames to the server 180 for identification and counting. The memory 184 of the server 180 can store instructions to cause the processor 182 of the server 180 to identify storage units and/or calculate storage unit counts from the received image frames (e.g., using one or more machine learning models, as described herein). The memory 184 can store instructions to cause the processor 182 to transmit the identification of the storage units and/or the storage unit counts to the user device 101 via the network 190.

In some implementations, the server 180 can process multiple requests from multiple user devices (similar to user device 101) connected to the network 190. In some implementations, the server 180 can perform any other process and/or function described herein as being performed by the user device 101. In some implementations, multiple user devices can capture image frames of the same inventory in the same warehouse. The server 180 can be configured to perform duplicate removals of duplicate counted storage units even if multiple user devices are used to detect and/or count storage units from the same inventory. In some implementations, the server 180 can process the image frames captured by each user device and determine, using spatial analysis and/or depth analysis, which storage unit was counted more than once and update the storage unit count associated with the duplicate storage unit accordingly.

The management device 170 can be connected to the network 190 to communicate with the user device 101 and/or the server 180. In some implementations, the management device 170 can include (or be) a smartphone, tablet, PC, laptop, or the like, used to manage the system 200 and its processes. In some implementations, multiple user devices can be connected to the management device 170. The management device 170 can include a processor 172, a memory 174, a display 176, and/or peripheral(s) 178 operatively coupled to each other. The memory 174 of the management device 170 stores instructions for execution by the processor 172. The processor 172 of the management device 170 can be or include, for example, a hardware based integrated circuit (IC), or any other suitable processing device configured to run and/or execute a set of instructions or code. For example, the processor 172 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 104 can be configured to run any of the methods and/or portions of methods discussed herein.

The memory 174 of the management device 170 can be or include, for example, a random-access memory (RAM), a memory buffer, a hard drive, a read-only memory (ROM), an erasable programmable read-only memory (EPROM), and/or the like. In some instances, the memory can store, for example, one or more software programs and/or code that can include instructions to cause the processor 172 to perform one or more processes, functions, and/or the like. In some implementations, the memory 184 can include extendable storage units that can be added and used incrementally. In some implementations, the memory 174 can be a portable memory (e.g., a flash drive, a portable hard disk, and/or the like) that can be operatively coupled to the processor 172. The memory 108 can include various components (e.g., machine-readable media) including, but not limited to, a random-access memory component, a read only component, and any combinations thereof. In one example, a basic input/output system (BIOS), including basic routines that help to transfer information between elements within management device 170, such as during start-up, can be stored in memory 174. The memory 174 can further include any number of program modules including, for example, an operating system, one or more application programs, other program modules, program data, and/or any combinations thereof.

The display 176 of the management device 170 can include any display device as described in the entirety of this disclosure. The display 148 can include (or be) an electronic device with a screen used for display of information and pictures, such as, multiple icons 152, a substantially real-time feed 156, and/or an inventory dashboard. The display 148 can include, for example, an LED monitor, an OLED monitor, an AMOLED monitor, and/or the like. In some implementations, the display 148 can include (or be) a touchscreen to receive user inputs via touching the display 148.

The peripheral(s) 178 can include, for example, a mouse, a keyboard, trackpad, speakers, and/or the like. The management device 170 can be used to manage an inventory. For instance, a user operating the management device 170 can manually set predefined thresholds (e.g., a restock threshold) for a restock status for each subset of storage units associated with unit type from multiple unit types in the inventory. The user operating the management device 170 can also manually update multiple storage unit counts for each unit type. In some implementations, the management device 170 can receive multiple storage unit counts of the inventory from the user device 101 and/or the server 180. The management device 170 can also compare the storage unit counts with the predefined thresholds and/or can automatically order units when the counts are below the predefined threshold (e.g., the restock threshold). The management device 170 can present the multiple storage counts and the plurality of unit types to the user operating the user device 101 by displaying the data on the inventory dashboard.

In some implementations, the system 200 can enable an integration of application programming interfaces (APIs) with multiple devices, such as, for example, the user device 101, the management device 170 and/or the server 180, to facilitate communication of information and/or data via the network 190.

Figure 3:
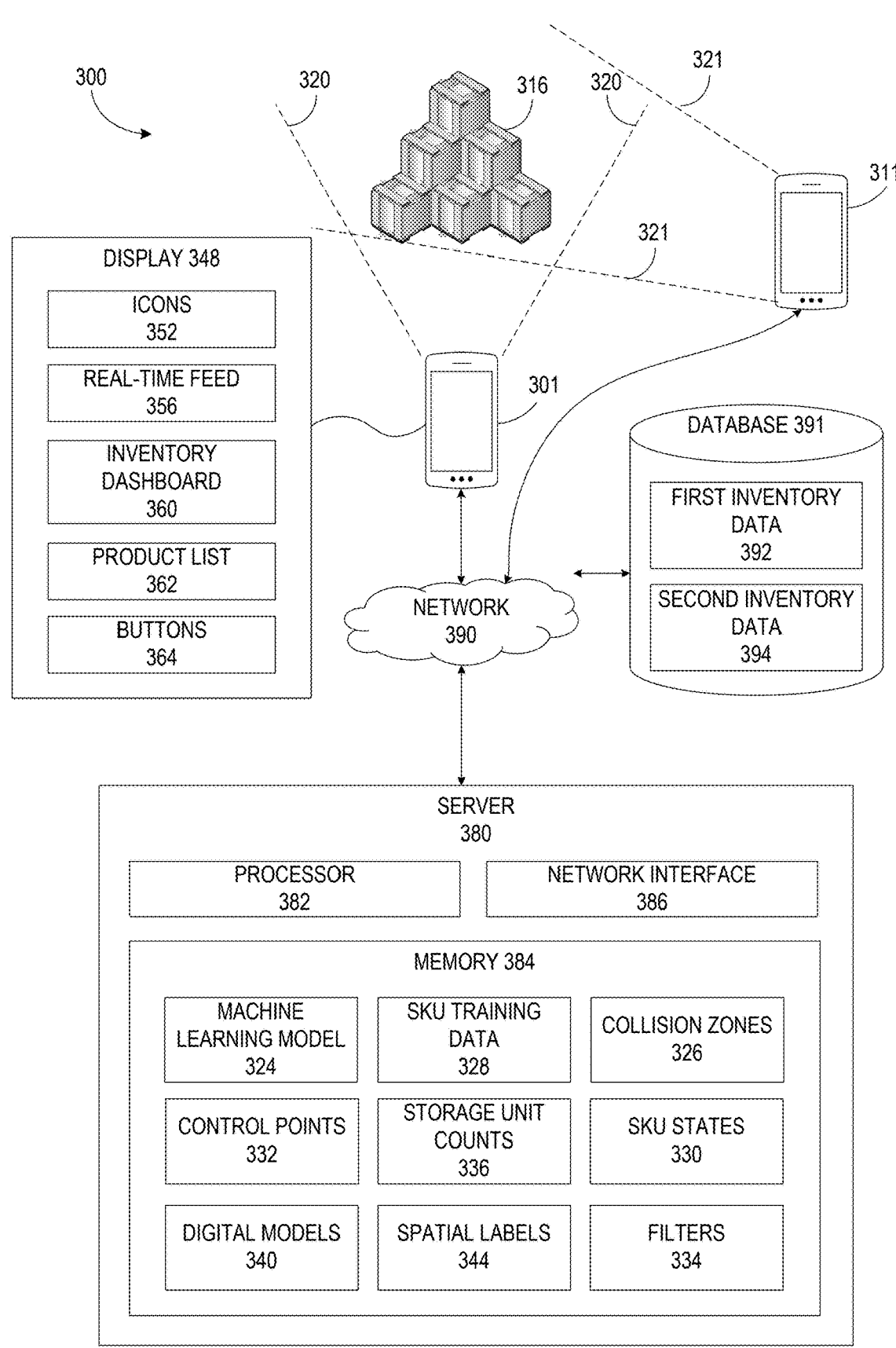
FIG. 3 is a block diagram of a machine learning system for edge computer vision and active reality, according to an embodiment.

FIG. 3 is a block diagram of a machine learning system 300 for edge computer vision and active reality, according to an embodiment. The system 300 can include a user device 301, other user devices 311, a database 391, a server 380, and a network 390 that enables communication between the user device 301, other user devices 311, the database 391, and/or the like. The user device 301 can include a sensor (not shown in FIG. 3) operatively coupled to the user device 301 and configured to scan and capture images or videos of an inventory 316. In some cases, a user operating the user device 301 can capture multiple inventories in a storage location (e.g., warehouse, storage closet, etc.) or multiple inventories from multiple storage locations.

The inventory 316 can be similar to the inventory 116 in FIG. 1. The sensor of the user device 301 can be configured to capture and analyze information found within a set of boundaries such as, for example, a spatial search 320. The spatial search 320 can include (or be) a representation and/or a virtual representation of a zone, boundaries, borders, and/or an area within a space where the inventory 316 is located. The spatial search 320 can define a layout of a space that holds and/or contains the inventory 316. The spatial search 320 can be similar to the spatial search 120 of FIG. 1. In some cases, the spatial search 320 can be set by sensing one or more barcodes (e.g., quick-response (QR) codes), predetermined identifiers predetermined indicators, corners, walls, and/or floors in which the inventory 316 is located. In some cases, the sensor can capture the spatial search 320 via depth calculation by the user touching the walls, floors, and/or ceilings around the inventory 316. In some cases, the sensor can capture the spatial search 320 by recognizing a specific inventory (e.g., specific shelf, specific row, etc.) by a control points (e.g., QR code, landmarks, etc.) and obtaining depth or dimensional information about the specific inventory from the database 391 using the control point (e.g., unique ID of the QR code). In some implementations, the sensor can capture storage units placed in various locations in the inventory 316 and/or a warehouse and at various orientations. For instance, if a box of straws falls from a shelf, the sensor can scan the box and determine that the box is the box of straws.

The user device 301 can be or include a compute device operated by the user. The user device 301 can be structurally and/or functionally similar to the user device 101 of FIG. 1. In some embodiments, the user device 301 can include a display 348 configured to present, to the user, substantially real-time feed 356 of images or videos captured by the sensor, icons 352 overlayed and/or positioned within an active/augmented reality of the inventory 316, an inventory dashboard 360, a product list 362, buttons 364, and/or the like.

The icons 352 can be or include active/augmented reality objects such as, for example, 3D digital representations that virtually and visually emphasize, identify and/or augment each storage unit from a set of storage units in the inventory 316. For example, a carton of milk can be overlayed with an icon of a rectangular prism that roughly covers a portion of the carton of milk. In some cases, the rectangular prism can be of various shades, opacity, translucency, and/or colors such that the user viewing the display 348 can easily identify the carton of milk. The icons 352 can appear and/or disappear accordingly based on the movement of the sensor as visualized via the substantially real-time feed 356. The inventory dashboard can include (or be) a list of unit types, storage unit counts 336, the restock status for each unit type, and/or the like. The inventory dashboard 360 is further described in detail with respect to FIG. 15. In some cases, the icons 352 can be visual representations of digital models 340.

The processor 382 can store coordinates with respect to a control point of the inventory 316 of the spatial search 320 in the memory 384 to recognize and/or predict where the inventory 316 is supposed to be located and/or an area to be searched to identify the inventory 316. In some implementations, the spatial search 320 can be static (e.g., configured to be predefined in a specific location and/or coordinates in a 3D world). In some cases, the spatial search 320 can also denote areas within the spatial search 320 via specific points and/or coordinates for the sensor(s) 312 to identify and focus information within the denoted areas. The coordinates and/or parameters of the spatial search 320 can be stored in the memory 308 and/or database 391. This allows the processor 304 to filter, ignore and/or discard areas outside of the spatial search 320 to reduce computational overhead. Similarly stated, in some implementations the contents of images captured of the area within the spatial search 320 can be processed while the contents of images captured of the area outside the spatial search 320 can be discarded and/or ignored. In some implementations, the spatial search 320 area can be manually modified by the user. In some implementations, the spatial search 320 area can be automatically modified (e.g., if new inventory is recognized outside the area of the spatial search 320) via user inputs (e.g., touching the display 348 or pressing the buttons 364).

The product list 362 can be a menu with which the user can interact to modify data of the icons 352. For instance, the icons 352 can also include descriptions of storage units, description of the inventory 316, and/or a count of storage units. The user can interact with the product list 362 to change descriptions, names, and/or modify counts. The product list 362 is further described in detail with respect to FIG. 12. The buttons 364 can be input/output interfaces to enable the user to modify the data of storage units and/or the icons 352.

The database 391 can be or include a local database, cloud database, standard query language (SQL) database, relational database, and/or the like. The database 391 can be configured to collect, store, and/or record data captured by the sensor and/or data processed by the server 380. The database 391 can store data such as, for example, first inventory data 392, second inventory data 394, and/or the like. For instance, the database 391 can be configured to store and distinguish storage units from different inventories (e.g., warehouses, stores, shelves, etc.). In some cases, different shelves or warehouses can store the same type of storage units. The database 391 can store data regarding which inventory (e.g., shelf or warehouse) stores how many of a certain type of storage unit. In an example, two shelves both store boxes of cups in which the database 391 can record how many boxes of cups each shelve stores. If a user removes a box of cups from one inventory, after a rescan, the database 391 can record data that that inventory has one less box of cups while the other inventory maintains the same number of boxes of cups. In some implementations, the database 391 can store specific details such as, for example, at which inventory a specific storage unit is stored, on which shelf in the inventory a specific storage unit is stored, a location of a specific storage unit if stacked on other storage units, an amount of each unit type, remaining inventory space, and/or the like.

In some cases, the user, using the sensor of the user device 301, can capture images of the inventory 316 and can select to record data (e.g., "check out") of the inventory 316, which can be stored as the first inventory data 392. The user can then point the sensor to a different inventory and press a button to record data of the other inventory, which can be stored as the second inventory data 394. In some cases, the first inventory data 392 and the second inventory data 394 can include the same or different storage units.

The server 380 can be or include a compute device configured to analyze and/or process the data captured by the sensor. In some cases, the server 380 can be located remotely from the database 391 and/or the user device 301. The server can include a processor 382, a network interface 386, and/or a memory 384 that stores instructions to be executed by the processor 382. The network interface 386 can connect the server 380 to the network 390 to communicate with the user device 301 and/or the database 391.

The processor 382 can be structurally and/or functionally similar to the processor 104 or processor 182 of FIG. 1 and FIG. 2, respectively. The memory 384 can be structurally and/or functionally similar to the memory 108 and memory 184 of FIG. 1 and FIG. 2, respectively. The memory 384 can store a machine learning model 324, SKU training data 328, control points 332, storage unit counts 336, digital models 340, spatial labels 344, collision zones 326, SKU states 330, filters 334, and/or the like. The memory 384 can be or include, for example, a random-access memory (RAM), a memory buffer, a hard drive, a read-only memory (ROM), an erasable programmable read-only memory (EPROM), and/or or the like. In some instances, the memory can store, for example, one or more software programs and/or code that can include instructions to cause the processor 382 to perform one or more processes, functions, and/or the like. In some implementations, the memory 384 can include extendable storage units that can be added and used incrementally. In some implementations, the memory 384 can be a portable memory (e.g., a flash drive, a portable hard disk, and/or the like) that can be operatively coupled to the processor 382. The memory 384 can include various components (e.g., machine-readable media) including, but not limited to, a random-access memory component, a read only component, and any combinations thereof. In one example, a basic input/output system (BIOS), including basic routines that help to transfer information between elements within the server 380, such as during start-up, can be stored in memory 384. The memory 384 can further include any number of program modules including, for example, an operating system, one or more application programs, other program modules, program data, and/or any combinations thereof.

The machine learning model 324 can be structurally and/or functionally similar to the machine learning model 124 of FIG. 1. The machine learning model 324 can be configured to detect the multiple storage units and/or calculate a storage unit count from multiple storage unit counts 336 of each unit type from multiple unit types using images captured by the sensor of the user device 301 as an input. The machine learning model 324 can be trained using the SKU training data 328. In some implementations, the SKU training data 328 includes labeled training data including a storage unit digital model correlated to and/or labeled with a storage unit identifier. The memory 308 can store instructions to cause the processor 304 to continuously, sporadically and/or periodically provide the machine learning model 324 with data (e.g., SKU training data) to generate a robust and/or trained machine learning model. In some implementations, the machine learning model 324 can be trained synthetically. For instance, the machine learning model 324 can be trained in a virtual and a live training environment using the storage units.

In some implementations, the machine learning model 324 can alternatively and/or additionally identify the storage units based on a shape and/or form of the storage unit identifiers. For instance, the sensor of the user device 301 can detect that the storage unit can include a shape, size, form, label, logo, barcode and/or image unique to a specific unit type and count how many storage units share the same shape, size, form, label, logo, barcode and/or image. In some implementations, the machine learning model 324 can generate the planogram of the inventory 316. The planogram can be used as a map for a machine learning model 324 to use to identify storage units and/or generate digital models 340 for the storage units. This is so, at least in part, for the machine learning model 324 to better predict and/or identify storage units and/or digital models 340 of storage units in substantially real-time.

In some implementations, the machine learning model 324 can be configured to determine a depth of storage units in the inventory 316. For instance, a carton of milk can be lined such that the sensor primarily captures the carton of milk at the front. The machine learning model 324 can determine how many cartons of milk there are in the line of cartons of milks using depth calculation, LiDAR data, data stored on a depth of the shelf and correlated based on a control point (e.g., barcode) and/or the like. In some cases, the machine learning model 324 can also determine the depth of the storage units based on the user interacting with storage units that may be located deeper and/or behind other storage units, identifying (e.g., touching) walls, identifying (e.g., touching) parts of the inventory 316 (e.g., shelves), and/or the like.

In some implementations, the memory 308 stores instructions to cause the processor 304 to detect, via the machine learning model 324, the multiple storage units within an area outlined by the spatial search 320. In some cases, the storage unit can be placed sideways, placed down flat, upside down, or the like. In some cases, multiple storage units can be stacked on a shelve on top of each other, behind each other, next to each other, and/or the like. The machine learning model 324 can be configured to detect, via shape analysis, each storage unit area, where the area can include multiple spatial storage units. The machine learning model 324 can calculate different measurements of the same storage unit in a 3D space of the spatial search 320 and/or the inventory 316 and determine that that storage unit across multiple image frames from different angles is the same storage unit.

In some implementations, the machine learning model 324 can identify and/or confirm the identity of the storage unit based on the shape of the digital models 340 generated based on depth analysis via LiDAR. In some cases, cups can be stored as stacks and the user device 301 can capture and calculate a height of the stack of cups and the machine learning model 324 can determine, based on the height of the stack of cups and a height of a single cup, the storage unit count for the cups.

In some implementations, the machine learning model 324 can be configured to determine different form factors of storage units. For example, a storage unit such as chicken, can be stored in various forms such as, for example, fried chicken, baked chicken, frozen chicken, raw chicken, and/or the like. The machine learning model 324 can identify the different forms and process the different forms accordingly (e.g., count, report weight, etc.). The machine learning model 324 can also determine an amount of storage unit based on reported weight of boxes, containers, and/or bags.

The storage unit counts 336 can include (or be) numerical values that represent a total number of each unit type in the inventory 316 (e.g., the number of cartons of milk, number of bags of coffee powder, number of straws, etc.). In some cases, the storage unit counts 336 can include duplicate storage units and/or incorrect counts of a different unit type (e.g., a carton of cream may be incorrectly included in a count as a carton of milk). The memory 308 can store instructions to cause the processor 304 to detect duplicate counted storage units and/or duplicate counts and remove the duplicate counted storage units in the storage unit counts 336 for a unit type. In some implementations, for example, the memory 308 stores instructions to cause the processor 304 to calculate the storage unit counts 336 by detecting the height of a stack of storage units via the sensor(s) 312 and/or by detecting a depth of the storage units via sensor(s) 312.

The spatial labels 344 can include digital representations and/or substantially real-time virtual representations of a unit type identifier for each unit type and/or each subset of storage units associated with each unit type and its designated location for storage using the control points 332 and/or in the spatial search 320. In some implementations, the spatial labels 344 can be static in an augmented/active reality space. Specifically, storage units detected inside a designated location outlined by the spatial labels 344 are counted in the storage unit count associated with the spatial labels. In some cases, the control points 332 can include quick-response (QR) codes that indicate a location in the inventory 316 to be designated for a specific unit type of storage units. The QR code for certain storage units can include and/or can reference in a database information of how many storage units can be stacked in a column in the inventory 316, which can be used to determine depth of the inventory 316 for counting the storage units. In some cases, the QR code can also provide a reference point for a location of the sensor of the user device 301 and, based on this reference, allow the sensor to identify and/or determine characteristics of the location (e.g., how big a shelf is) and where to search for inventory.

The digital models 340 can include substantially real-time virtual representations of a real-world physical object, such as, for example, the inventory 316, walls, floors, shelves, racks, storage units, and/or the like. The digital models 340 can be stored in the memory 308 and also presented on the display 348 in the form of active reality and/or augmented reality. In some cases, the digital models 340 can include spatial labels 344 and/or icons 352. In some implementations, the processor 382 can generate (via the machine learning model 324) a 3D world with the digital models 340.

The collision zones 326 can be or include data indicating an area around a digital model of a storage unit such that when another storage unit (or digital model of another storage unit) is detected in a collision zone, the server 380 can be alerted that a potential duplicate storage unit is present. For instance, if the collision zones of two digital models of two storage units overlap to a certain degree (or predetermined threshold), an error may have occurred. For example, a digital model for one of those two storage units may have been incorrectly generated, positioned, aligned, and/or the like. As real objects would not overlap, an overlap between digital models 340 of those objects may indicate an anomaly such as duplicative digital model. In some implementations, the collision zones 326 can be modified by the user.

In some instances, the collision zones of two or more storage units can be close enough to touch but not to overlap to a certain degree. In some instances, the two or more storage units can have the same unit type. The processor 382 can merge the collision zones of the two or more storage units with the same unit type to produce a single collision zone for the two or more storage units. The processor 382 can cause the display 348 to display a single storage unit count (e.g., a single icon with the storage unit count) for the two or more storage units with the same unit type, which have the single collision zone.

In some instances, the two or more storage units can have different unit types. In such instances, the processor 382 does not merger the collision zones of the two or more storage units with different unit types. As such, the processor 382 can cause the display 348 to display a storage unit count for each storage unit from the two or more storage units, which each have a separate collision zone.

The SKU states 330 can indicate multiple states of storage units. In some cases, the SKU states 330 can be represented as digital models 340, which is further described in detail with respect to FIG. 14. A SKU state can include a status of a storage unit. For instance, a container of sour cream can be 50% full which can be recorded as a SKU state. The SKU state can also include a state of a storage unit such as, for example, frozen, liquid, thawed, fried, baked, and/or the like.

The filters 334 can include a filter that the user can define for analyzing storage units of the inventory 316. For example, the user can set the filter to be 5 feet. In such an example, if the sensor is more than 5 feet away from the inventory 316, the processor 382 can remove the digital models 340 from being displayed. Setting the distance filter can enable the user to create a 3D world of digital models of each inventory while reducing computational overhead of the processor 382 when rendering/generating digital models 340 and/or storing data. In other words, by populating the 3D world with digital models 340 when the sensor is within a predefined distance from the inventory 316, the processor 382 can accurately and efficiently process data and present on the display 348 of the inventory 316 while ignoring other nearby inventories (that are greater than the predefined distance). In some cases, by limiting the generating of digital models 340 and/or analysis of data of the inventory 316 at a certain distance, the processor 382 can generate digital models 340 that are most relevant to the user. In some cases, by stepping further from the inventory 316 and past the filter, the digital models 340 of the inventory 316 can be hidden to avoid obstructing the real-time feed 356 and display 348 of the user device 301. By stepping closer to the inventory 316 and within the distance set by the filter, the digital models 340 can reappear. In some implementations, depending on the orientation of the sensor capturing images or videos of the inventory 316, the processor 382 can hide the 3D world at different positions, angles, and/or distances, to avoid visual confusion. For example, if a sensor is to the side or behind a control point of an inventory (e.g., is positioned at a predetermined angle to the front of the inventory), the processor 382 can hide the digital models 340 and/or counts. When the sensor is again positioned in front of a control point (within a predetermined viewing angle), the processor can present the digital models 340 and/or counts. Even if the digital models 340 of storage units are hidden, data for the digital models 340 can be stored in the database 391.

In some implementations, other user devices 311 (which are structurally and functionally similar to the user device 301) can scan the inventory 316 (or other inventories) and determine spatial searches 321 from the perspective of a sensor(s) of the other user devices 311 (e.g., operated by other users). In some cases, multiple user devices including the user device 301 and the other user device 311 can simultaneously or in series scan the inventory 316 and capture and record information (e.g., digital models 340, control points 332, storage unit counts 336, collision zones 326, spatial labels 344, SKU states 330, etc.) from different positions and angles. This is so, at least in part to efficiently scan the inventory from multiple sensors and at multiple angles to accurately identify storage units, determine collision zones 326, calculate storage unit counts 336, and/or the like. In other words, the user device 301 and the other user devices 311 can work synchronously to capture data of the inventory 316 such that digital models 340, storage unit counts 336, and/or the like, captured by the user device 301 within the spatial search 320 can also be synced and presented on displays of the other user devices 311 and vice versa. In some implementations, the processor 382 of the server 380 can receive data from both the user device 301 and the other user devices 311 and can process the data to remove duplicates, update inventory count and/or the like based on positioning of the user device 301 and the other user devices 311 (e.g., based on control points).

Figure 4:
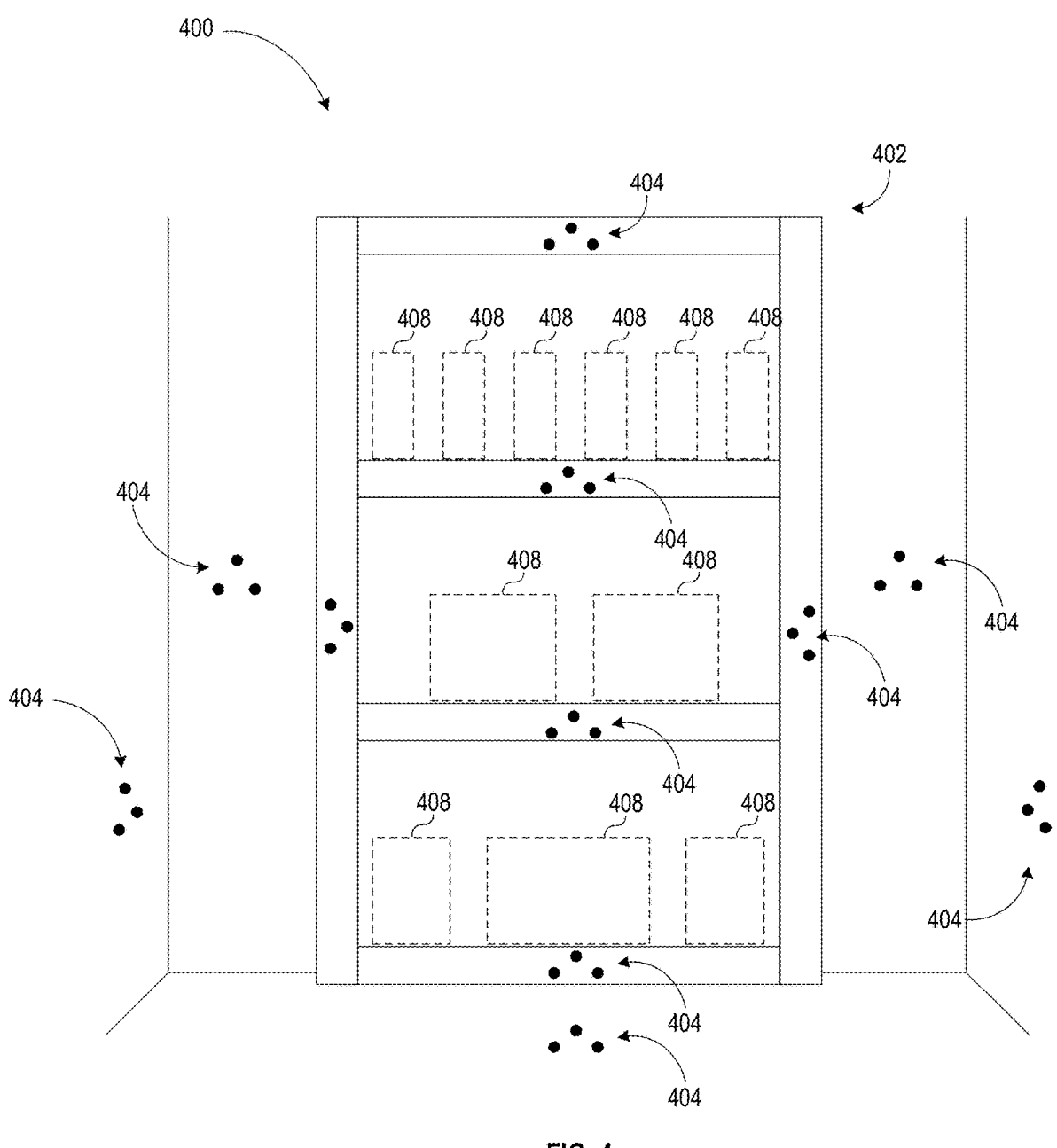
FIG. 4 is an illustration of a spatial search using active reality, according to an embodiment.

FIG. 4 is an illustration of a spatial search 400 captured by one or more sensors (not shown in FIG. 4) of a user device (e.g., user device 101 of FIGS. 1 and 2) using active reality, according to an embodiment. The spatial search 400 can be consistent with the spatial search 120 described with respect to FIG. 1. As shown in FIG. 4, the spatial search 400 can include a representation and/or coordinates of a location and/or an area for an inventory 402. The spatial search 400 can also include multiple control points 404 and spatial labels 408 represented as icons. In some implementations, the control points 404 and the spatial labels 408 can act as a point of calibration. In some implementations, the spatial labels 408 can also act as a historical location for an associated unit type. Specifically, for example, the control points 404 and the spatial labels 408 can remain in place in the spatial search 400 and/or maintain the same coordinates in the spatial search 400 even if the field of view of the one or more sensors change due to movement of the one or more sensors.

The inventory 402 can include (or be) any physical storage of multiple storage units such as, for example, items, goods, merchandise, materials, product, and/or the like. The inventory 402 can also include a warehouse, closet, freezer, retail space, and/or any location for storing items. The inventory 402 can include multiple storage units. In some implementations, the storage units can include a unique code including letters and/or numbers that identify characteristics about each item and/or storage unit in the inventory 402, such as, for example, manufacturer, brand, style, color, size, type, product, and/or the like (e.g., associated with the code in a database). In some instances, the inventory 02 can include storage unit identifiers for each storage unit such as, for example, labels, logos, barcodes, and/or the like. The inventory 402 can include multiple items of the same type (e.g., cans of coffee beans of the same type, bags of coffee powder, packed straws, cups of the same size, etc.). The inventory 402 can include storage units of different storage types. In some implementations, the storage types can be based on size, type of packaging, and/or the like. For example, storage types can include bottles, small items, large items, medium-sized boxes, large-sized boxes, large-sized bags, jars, and/or the like. The inventory 402 can also include multiple storage units. Each storage unit can be associated with a unit type from multiple unit types. A unit type can refer to a group of storage units of the same item, good, material, and/or product. The unit type can include (or be) a name and/or product of the storage unit. In some implementations, multiple storage units can have the same unit type. For instance, the storage unit can be, for example, a "ketchup bottle" and the unit type for that storage unit is "ketchup" or "ketchup bottle." In some cases, the inventory 402 can store storage units that are of the same product or item (e.g., ketchup). The common product, good, and/or material that those storage units share can be the unit type. For example, the storage unit can have a storage type that is a bottle and a unit type that is ketchup. In some implementations, the multiple storage units can include multiple subsets of storage units. Each storage unit can be associated with each unit type from the multiple unit types. For instance, one subset of storage units can be associated with ketchup and each storage unit of the subset associated with ketchup bottles is a ketchup bottle. In some instances, each storage unit in the subset of storage unit is identical and/or is the same good/material.

The spatial search 400 can include coordinates and/or a virtual representation of an area surrounding the inventory 402. In some implementations, the area can include walls, floors, ceilings, and/or the like. The area can also include real-world physical objects including the inventory 402 that houses storage units, such as, for example, shelves, racks, storage units, and/or the like. The spatial search 400 can include multiple control points 404. As shown in FIG. 4, the control points 404 can include coordinates and/or virtual representations of physical static objects such as, for example, walls, floor columns of a rack, upper deck of the rack, middle deck of the rack, lower deck of the rack, barcodes (e.g., QR codes), labels landmarks, identifiers and/or the like. In some implementations, a processor can generate a map of a layout of real-world physical objects found in the spatial search 400 using the control points 404. In some implementations, the control points 404 can be moved in a virtual space within the spatial search 400 via user inputs on a touchscreen, which can also act as a display, of a user device (not shown in FIG. 4). For instance, the user can tap on the touchscreen where a control point of interest is located and drag across the touchscreen to a desired location of the virtual space within the spatial search 400 as shown on the display. In another example, the user can point and tap on the touchscreen where the location of the touchscreen that was tapped represents a virtual representation of the desired location for the control point to be set at. The user can also use the touchscreen to remove and/or place new control points throughout the virtual space within the spatial search 400 and/or the inventory 402.

The spatial labels 408 can include coordinates and/or substantially real-time virtual representations of a unit type identifier for each unit type and its designated location for storage using the control points 404 and/or in the spatial search 400. For instance, a spatial label can be reserved for milk cartons. In some implementations, a detected storage unit that falls within an outline of the spatial label for milk cartons can be counted as a milk carton. In some implementations, the detection of the storage unit can be confirmed via shape analysis, text analysis, OCR, and/or the like. The control points 404 and the spatial labels 408 can be calibrated and/or adjusted by a user. In other words, the user can customize a virtual environment of associated with the screenshot of the inventory. For instance, the user can customize the shape, size, color, placement, transparency, and/or the like, of the icons. In some implementations, the icons can also be non-fungible tokens (NFTs).

Figure 5:
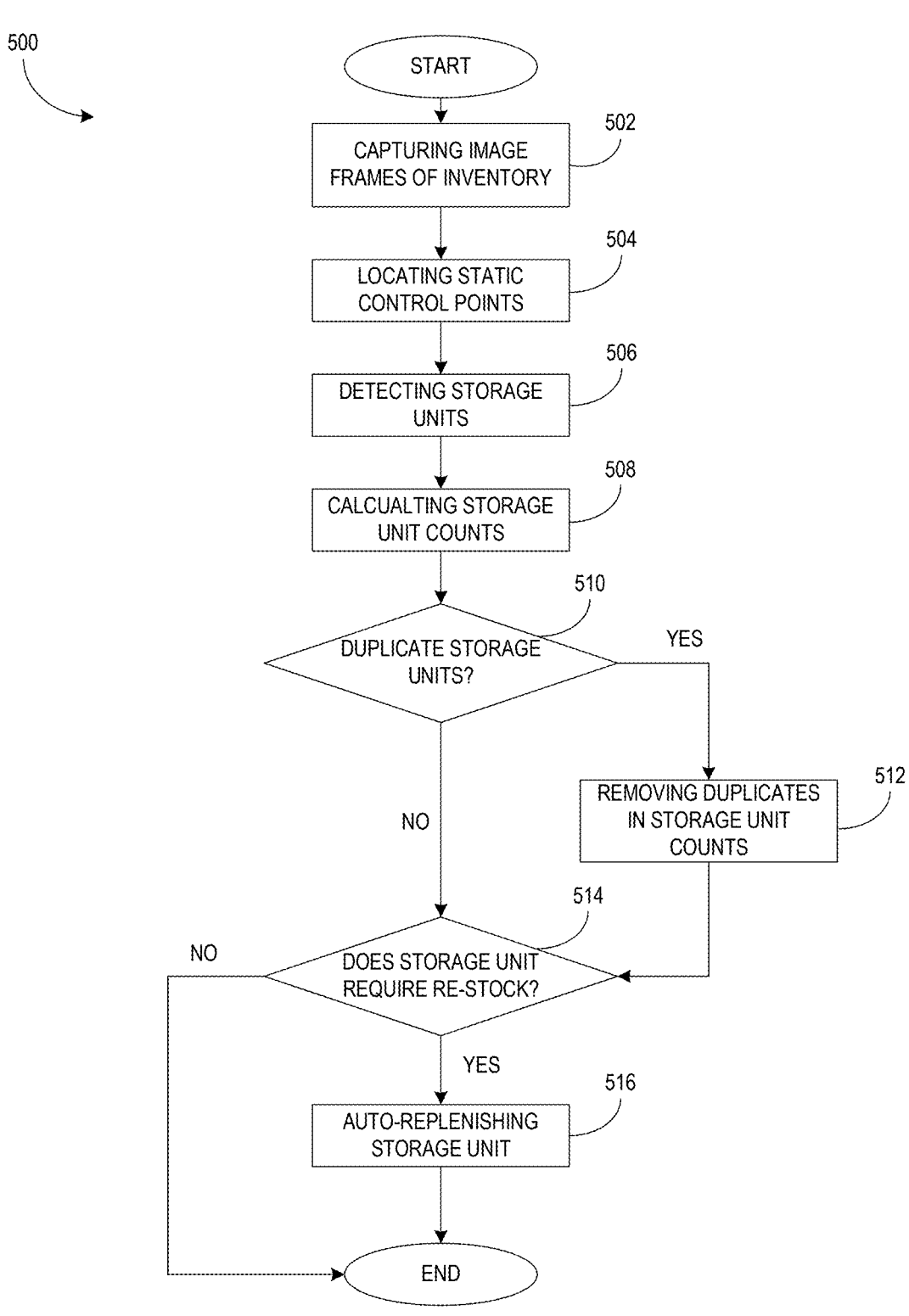
FIG. 5 is a flow diagram of a method for inventory management using edge computer vision and active reality, according to an embodiment.

FIG. 5 is a flow diagram of a method 500 for inventory management via a user device using edge computer vision and active reality, according to an embodiment. At 502, the method 500 includes capturing image frames of an inventory. In some implementations, capturing the image frames can include receiving, at a processor of a user device and from a sensor, multiple image frames of an inventory. The sensor can include multiple sensors such as, for example, charge-coupled device (CCD), an active-pixel sensor (APS), and/or any digital image sensor a fabricated in metal-oxide-semiconductor (MOS), complementary metal-oxide-semiconductor (CMOS), N-type MOS (NMOS), Live MOS, or the like. In some implementations, the sensor can include a depth sensor such as, for example, a time-of-flight (TOF) sensor. The sensor can also include a camera such as, for example, an ultra-wide-angle camera, a wide-angle camera, a telephoto camera, monochrome camera, a macro camera, and/or the like. The sensor can also include a light detection and ranging (LiDAR) sensor. In some implementations, the method 500 can include scanning and/or capturing multiple image frames of the inventory and the multiple storage units in substantially real-time. In some implementations, a user can operate the user device and control where the sensor is capturing images and/or generating image frames. The sensor can also be used to capture the height of storage units that are stacked on top of each other such as, for example, cups, as described in further detail herein.

At 504, the method 500 includes locating control points. In some implementations, locating the control points can include locating control points used to determine a spatial search in the image frames. In some implementations, the control points can include barcodes, icons, landmarks, identifiers, specific shelves, and/or other indicators that can be used to orient the sensor. In some implementations, locating control points can include generating icons indicating the control points and displaying the icons on a display on the device. In some implementations, the method 500 can also include generating icons for the control point from multiple control points to be displayed on a display of the user device. The spatial search can include coordinates and/or a virtual representation of an area surrounding the inventory. In some implementations, the area can include walls, floors, ceilings, and/or the like. The area can also include real-world physical objects including the inventory that houses storage units, such as, for example, shelves, racks, storage units, and/or the like. The spatial search can include multiple control points. In some implementations, fiducial markers in the inventory can be used to help locate control points. Fiducial markers can be physical markers in the inventory that can be detected by the sensor. The user device can define, for example, what storage units (or storage unit types) can be stored at a location of or near the fiducial marker. The user device can store a digital representation of the fiducial marker in a database and can associate the digital representation with references to the storage units/storage unit types that can, for example, be stored at the location of or near the fiducial marker. In response to detecting a fiducial marker at the sensor, the user device can determine a match to one of many digital representations of fiducial markers in the database and, based on the match, can identify what storage units can be stored at the location of or near the fiducial marker. For example, the fiducial marker can be on a surface of a shelf. The user device can scan the fiducial marker using the sensor and can identify what storage units can be stored on the shelf based on a match in the database.

At 506, the method 500 includes detecting storage units. In some implementations, detecting the storage units can include detecting, by a machine learning model, multiple storage units in the spatial search. In some implementations, each storage unit from the multiple storage units is associated with a unit type from multiple unit types. For instance, the inventory can include storage units of different storage types. In some implementations, the storage types can be based on size, type of packaging, and/or the like. For example, storage types can include bottles, small items, large items, medium-sized boxes, large-sized boxes, large-sized bags, jars, and/or the like. In some implementations, 506 can include identifying a spatial label for each unit type from multiple unit types from the storage units. In some implementations, identifying the multiple unit types can include generating icons for the storage units and/or the spatial label for each unit type from multiple unit types to be displayed on the user device. The unit type can include (or be) a name and/or product of the storage unit. In some implementations, multiple storage units can have the same unit type. For instance, the storage unit can be, for example, a "ketchup bottle" and the unit type for that storage unit is "ketchup" or "ketchup bottle." In some cases, the inventory can store storage units that are of the same product or item (e.g., ketchup). The common product, good, and/or material that those storage units share can be the unit type. For example, the storage unit can have a storage type that is a bottle and a unit type that is ketchup. In some implementations, the multiple storage units can include multiple subsets of storage units. Each storage unit can be associated with each unit type from the multiple unit types. For instance, one subset of storage units can be associated with ketchup and each storage unit of the subset associated with ketchup bottles is a ketchup bottle. In some instances, each storage unit in the subset of storage unit is identical and/or is the same good/material.

At 508, the method 500 includes calculating a storage unit counts. In some implementations, calculating storage unit counts can include calculating a storage unit count from multiple storage unit counts and for each unit type from the multiple unit types from the multiple storage units detected based on depth analysis. Each storage unit count can include a total number of storage units associated with each unit type. In some implementations, depth analysis can be performed via the sensors such as, for example LiDAR sensors. For instance, the sensors can focus on real-world physical objects within the spatial search and/or outlined by multiple control points and detect a storage unit such as, for example, a bottle of ketchup. The machine learning model can be trained to detect multiple bottles of ketchup stacked behind a first bottle located closest to the sensors to calculate the total number of bottles of ketchup (e.g., using a known depth of each bottle of ketchup and a total depth from a control point identified by a sensor to calculate the number of bottles of ketchup). In some implementations, a control point can indicate and/or identify a depth of a shelf, rack, container, etc. For example, the control point can be a barcode (e.g., QR code) encoding an identifier that can be associated with (e.g., in a database) a specific shelf and various characteristics (e.g., dimensions) of that shelf. Accordingly, after scanning the barcode, the characteristics of the shelf (including depth) can be identified and used to calculate a total number of storage units. In some implementations, the method 500 can include calculating the storage unit counts based on the spatial labels. In such implementations, the machine learning model detects and/or counts the storage units within and/or outlined by the spatial labels.

In some implementations, the method 500 can include detecting storage units in the spatial search based on the storage type, identifying, via the sensor, a storage unit identifier from a set of storage unit identifiers located on each storage unit from the set of storage units, and calculating, via the machine learning model, the storage unit count for each unit type based on the set of storage unit identifiers. The storage unit identifiers can include physical identifiers located on the storage units such as, for example, barcodes, identification numbers, labels, logos, and/or the like. In some cases, the method 500 can include performing optical character recognition (OCR), which includes converting the image frames of the storage unit identifiers into natural language, such as, for example, text in a machine-readable format. In some implementations, the method 500 can include calculating, via the machine learning model, the storage unit count for each unit type based on the set of storage unit identifiers.

In some implementations, the method 500 includes recording the set of storage unit identifiers associated with a first set of storage units and the control point in the memory and/or a database and identifying, via the machine learning model, a second set of storage units based on the set of storage unit identifiers stored in the memory based on the control point. For instance, the machine learning model can be trained to read the storage unit identifiers of the storage units to accurately predict an identification of the storage units and/or any other storage unit that the sensor scans.

In some implementations, the method 500 can include detecting each unit type and calculating the storage unit count for each unit type by filtering out the unit types that are not intended to be counted (e.g., are located on a different shelf, rack, etc.). For instance, the method 500 can include detecting a first group of storage units of a first unit type and filtering out a second group of storage units (and/or any other group of storage units) of a second unit type prior to calculating the storage unit count for the second storage unit and/or any other storage unit count for any other unit type.

At 510, the method 500 includes determining whether there are duplicate storage units. In some cases, determining whether there are duplicate storage units can include identifying a duplicate storage unit based on the multiple storage unit counts. For instance, the machine learning model can detect a storage unit, such as, for example, a bottle of ketchup, and count the storage unit as both a bottle of ketchup and a bottle of mustard. Alternatively or additionally, the machine learning model can generate a digital model for each detected storage unit, and as the machine learning model counts the total number of each unit type, the machine learning model can detect an incorrectly counted storage unit from the storage unit count for each unit type. In some implementations, the spatial search 400 can include identifying the duplicate storage unit to ensure that the duplicate storage unit is not counted more than once for more than one storage unit count from the multiple storage unit counts. In some cases, a storage unit can be counted more than once when a single user device or more than one user device captures multiple image frames of the storage unit from different angles, views, positions, and/or the like.

At 512, the method includes removing duplicates in storage unit count. Removing duplicates in storage unit counts can include excluding the duplicate storage unit from the storage unit count associated with the duplicate storage unit. For instance, in the event that the duplicate storage unit (e.g., the bottle of ketchup that was counted as a bottle of mustard) is identified, the machine learning model can detect that a bottle of ketchup was used as to increment the storage unit count for the unit type (e.g., the bottle of mustard) and remove the duplicate storage unit (e.g., the bottle of ketchup that was counted as a bottle of mustard) from the storage unit count for the bottle of mustard.

At 514, the method 500 includes determining whether a storage unit requires re-stock. In some cases, determining whether the storage unit requires re-stock includes determining a restock status of each unit type from the plurality of unit types based on the storage unit count for each unit type. The restock status can include (or be) an alert, a signal, a sign, and/or the like, that indicates a low number (e.g., a number below a predetermined threshold) of a unit type. The low number can indicate that the unit type is running low, out of stock, and/or requires restocking. For instance, the restock status can include a warning that the stock of cartons of milk is low and/or empty. The restock status can include a sign that there is no imminent need to restock the cartons of milk. In some implementations, the method 500 can include generating an alert based on the storage unit counts falling below a restock threshold. The restock threshold can include a minimum and/or maximum value for the storage unit counts. In some implementations, when the storage unit counts falls below or exceeds the restock threshold, the alert can be generated indicating that a restock of the unit type and its associated storage unit is desired. In some cases, the restock threshold for each unit type can be different. In some cases the restock threshold can be manually modified. In some implementations, the restock threshold can be automatically updated and/or modified based on sales data, inventory history and/or the like.

At 516, the method 500 includes auto-replenishing the storage unit. Auto-replenishing can include automatically generating a replenish request based on the restock status. The replenish request can include a request for a restock of a unit type identified as desiring restocking based on the restock threshold. In some implementations, the method 500 can include executing a restock based on the alert generated/triggered for one or more unit types. In some implementation, executing the restock can include automatically ordering multiple storage units for the one or more storage units requiring restock. In some implementations, the method 500 and its steps can be performed automatically.

In some implementations, the user device can download a software application to perform the functions and processes of the method 500 described herein. The software application can be downloaded on multiple user devices.

Figure 6:
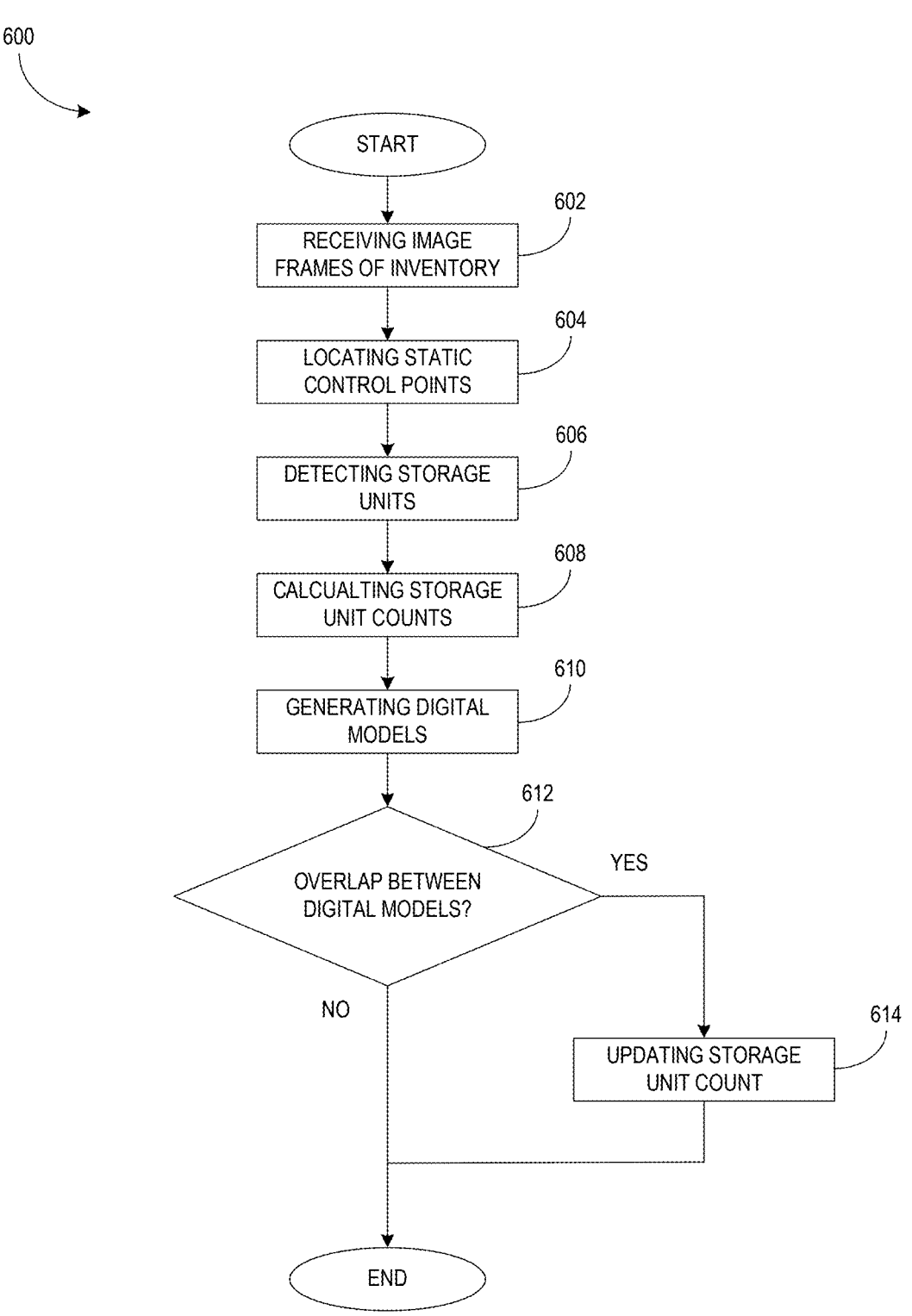
FIG. 6 is a flow diagram of a method for a machine learning system to determine duplicates, according to an embodiment.

FIG. 6 is a flow diagram of a method 600 for a machine learning system to determine duplicates, according to an embodiment. At 602, the method 600 includes receiving image frames of an inventory. In some cases, receiving the image frames can include receiving, from a sensor (e.g., a camera) operatively coupled to a processor of a user device, the image frames of the inventory.

At 604, the method 600 includes locating static control points. In some implementations, locating static control points can include locating a control point used to determine a spatial search in the image frames. In some implementations, for example, such static control points can include barcodes (e.g., QR codes), predefined landmarks, etc.

At 606, the method 600 includes detecting storage units. In some implementations, detecting storage units can include detecting, by a machine learning model, the storage units in the spatial search. Each storage unit can be associated with a unit type.

At 608, the method 600 includes calculating storage unit counts. In some implementations, calculating storage unit counts can include calculating a storage unit count from a set of storage unit counts and for each unit type based on depth calculation.

In some cases, the method 600 can include identifying a set of columns of storage units of a same unit type. For instance, the inventory can include a shelf of rows of storage units in which the storage units can be organized in a column within the rows. The method 600 can include calculating, via depth calculation and for each column, a number of storage units in that column. The method 600 can further include generating, for each column, an icon that represents a count of storage units for that column. The method 600 can include calculating the storage unit count for each unit type based on a sum of the count of storage units for each column for that unit type.

In some embodiments, the method 600 can include focusing, via the sensor, on the icon that represents the count of storage units for a column, and in response to focusing on the icon for a predetermined time period, enabling a user to manually update the count of storage units for the column.

At 610, the method 600 can include generating digital models. In some implementations, generating digital models can include generating a digital model from a set of digital models such that each digital model is overlayed around a different storage unit from the set of storage units. In some cases, the method 600 can further include generating, for each subset of digital models from the set of digital models and that is associated with a unit type, a digital label that is overlayed on that subset of digital models. The digital label can include a description of a subset of digital models. In some implementations, the method 600 can include focusing, via the sensor, on the digital label of a subset of digital models from the plurality of digital models and in response to focusing on the digital label for a predetermined time period, enabling a user to manually update the digital label.

At 612, the method 600 can include determining whether there is a spatial overlap between digital models. In some cases, this can include determining special overlap based on at least an overlap between an area surrounding one or more digital models. If an overlap is determined, a duplicate storage unit can be identified as being present.

At 614, the method includes updating the storage unit count. In some implementations, updating the storage unit count can include updating the storage unit count associated with the duplicate storage unit. For example, storage units identified as duplicates can be removed from the storage unit count.

While not shown in FIG. 6, in some cases, the method 600 can include determining (1) a restock status of each unit type based on the storage unit count for that unit type and (2) a planogram compliance, via the depth calculation, for each unit type. The method 600 can further include automatically generating a replenish request based on the restock status and the planogram compliance for each unit type from the plurality of unit types. In some cases, the depth calculation can be based on a stored depth value associated with each unit type and the control point. In some cases, the planogram compliance can be set by a supplier of a storage unit. For instance, a distributer can have shelves to which certain types of storage units and a desired amount of storage units are assigned. The method 600 can include determining the restock status based on the desired amount of storage units assigned via the planogram compliance. In some cases, rather than a user individually counting storage units, missing storage units can be automatically identified based on a scan of a location on a shelf that is intended to store a specific amount (or desired amount) of storage units and remaining space in the location.

In some implementations, the user device can download a software application to perform the functions and processes of the method 600 described herein. The software application can be downloaded on multiple user devices. Such user devices can be structurally and/or functionally similar to user device 101 of FIGS. 1 and 2 and can be operatively and/or communicatively coupled to other user devices, management device 170 and/or server 180 via a network 190 (see e.g., FIG. 2). Accordingly, multiple user devices can scan inventories and the server 180 can process scans from the multiple user devices. This allows the server 180 to remove duplicate scans, coordinate scans between the user devices, and/or the like.

FIG. 7 is a flow diagram of a method 700 for a machine learning system for edge computer vision and active reality, according to an embodiment. At 705, the method 700 includes receiving, from a sensor, detection of a first control point to determine a first spatial search of a first inventory. In some implementations, for example, such a first control point can include a barcode (e.g., a QR code), a predefined landmark, an identifier or other indicator denoting a first area for an inventory (e.g., a first shelf, a first rack, etc.).

At 710, the method 700 includes detecting, by a machine learning model and based on depth calculation of the first spatial search, a first plurality of storage units to calculate a storage unit count from a first plurality of storage unit counts. Each storage unit count from the first plurality of storage unit counts is associated with a unit type from a plurality of unit types.

At 715, the method 700 includes generating a digital model from a first plurality digital models and that is overlayed around each storage unit from the first plurality of storage units. Such digital models can be presented to a user in an augmented reality display. Moreover, such digital models can be used to identify duplicates.

At 720, the method 700 includes storing first inventory data in a database, such that the first plurality of digital models is hidden. Similarly stated, in some implementations, when a user stores and/or "checks-out" of a specific inventory, shelf, rack and/or area, the digital models are no longer displayed in the augmented reality display.

At 725, the method 700 includes receiving, from the sensor, detection of a second control point to determine a second spatial search of a second inventory. In some implementations, for example, such a second control point can include a barcode (e.g., a QR code), a predefined landmark, an identifier or other indicator denoting a second area for an inventory (e.g., a second shelf, a second rack, etc.).

At 730, the method 700 includes detecting, by machine learning model and based on depth calculation of the second spatial search, a second plurality of storage units to calculate a storage unit count from a second plurality of storage unit counts. Each storage unit count from the second plurality of storage unit counts is associated with a unit type from the plurality of unit types.

At 735, the method 700 includes generating a digital model from a second plurality digital models and that is overlayed around each storage unit from the second plurality of storage units. In some cases, the first inventory data includes metadata of the first plurality of storage units, the first plurality of storage unit counts, and the first plurality of digital models. In some cases, the method 700 can include storing second inventory data in the database which can include metadata of the second plurality of storage units, the second plurality of storage unit counts, and the second plurality of digital models. In some cases, the method 700 can further include distinguishing the first plurality of storage units and the second plurality of storage units having the same unit type.

In some implementations, the user device can download a software application to perform the functions and processes of the method 700 described herein. The software application can be downloaded on multiple user devices. Such user devices can be structurally and/or functionally similar to user device 101 of FIGS. 1 and 2 and can be operatively and/or communicatively coupled to other user devices, management device 170 and/or server 180 via a network 190 (see e.g., FIG. 2). Accordingly, multiple user devices can scan inventories and the server 180 can process scans from the multiple user devices. This allows the server 180 to remove duplicate scans, coordinate scans between user devices, and/or the like.

Figure 8:
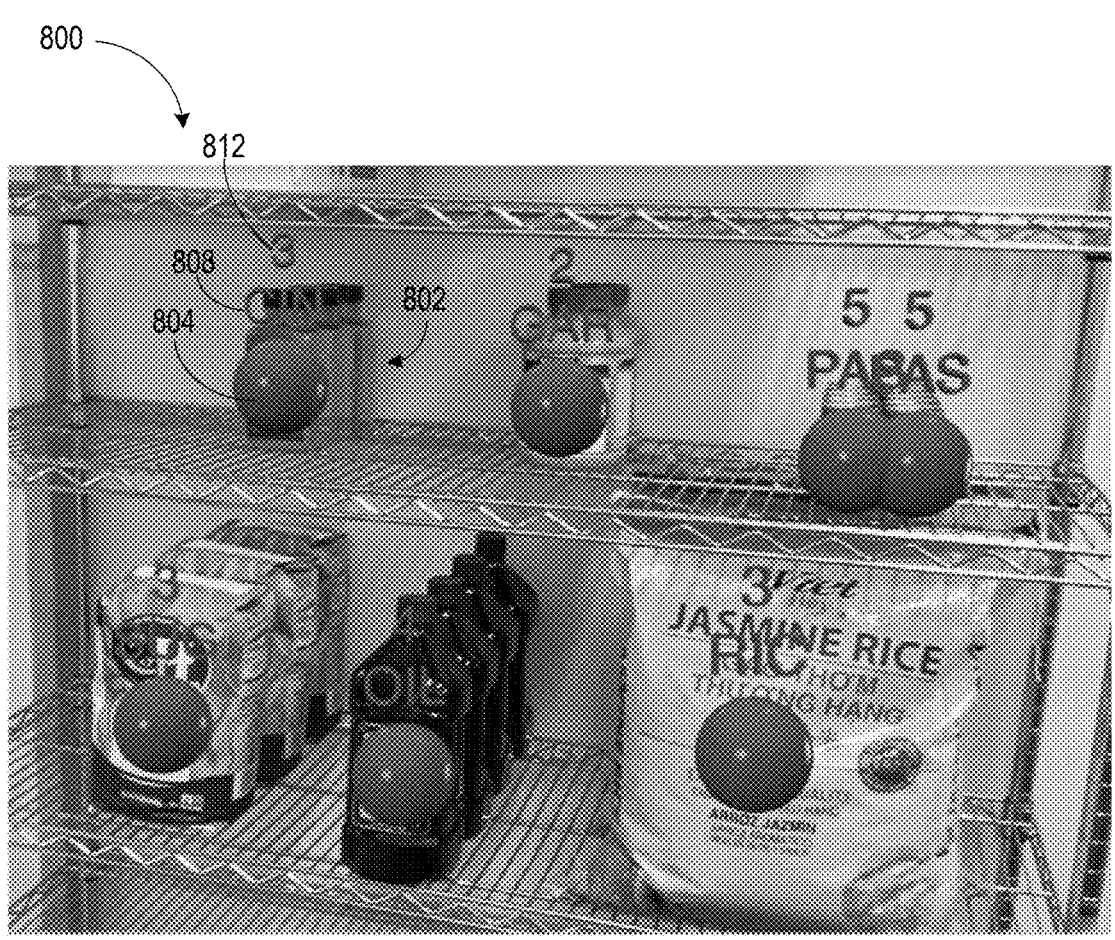
FIG. 8 is an example screenshot of an inventory with active reality icons, according to an embodiment.

FIG. 8 is an example screenshot 800 of an inventory captured by a sensor with active reality icons, according to an embodiment. The active (or augmented) reality icons can be consistent with other icons as described herein, and can include a digital model 804 (or be) a representation and/or a real-time virtual representation placed on a storage unit. The active reality icons can also include a storage unit label 808. In some implementations, the storage unit label 808 can be an identifier for multiple storage units within a spatial label 802 for an associated unit type (e.g., bottle of cinnamon powder). The active reality icons can also include a storage unit count 812 above the digital model 804 and/or the storage unit label 808. In some implementations, the storage unit count 812 indicates the total number of storage units in the spatial label 802 and/or the total number of storage units having a storage unit identifier associated with the storage unit label 808. In some implementations, the placement of the icons can be adjusted in substantially real-time based on an orientation of the sensor. For instance, the sensor can capture image frames of the inventory at multiple angles and the icons can be adjusted to remain near the spatial storage unit. In some implementations, based on the physical boundaries of the inventory, multiple spatial storage units can be spaced accordingly, forming multiple rows of spatial storage units as shown in the screenshot 800.

In some implementations, the storage units can be stacked in multiple ways and a machine learning model of a user device including a processor operatively coupled to the sensor can detect the storage units regardless of how the storage units are stacked and/or placed. For instance, as a user operating the user device moves around a space where the inventory is located, the icons can remain in place when the storage units are located in the image frames captured from different angles. The machine learning model can also detect and count the storage unit where the storage unit is faced in front of the sensor or a side face of the storage unit is facing the sensor. The machine learning model can generate different calculations of the storage unit detected via shape analysis based on whether the sensor capturing image frames of the inventory is facing in front of the inventory or facing a side of the inventory. As the sensor capturing the image frames moves around the inventory, the machine learning model can also show storage unit data (e.g., the icons), such as, for example, the storage unit count 812, the digital model 804, the storage unit label 808 for specific unit types while hiding storage unit data and/or icons of other storage units associated with different unit types. For instance, if the user wants to see the storage unit data of cinnamon powders, the machine learning model can display the digital model 804, the storage unit label 808, and/or the storage unit count 812 for the cinnamon powders and not other inventory items. Moreover, in some cases, if the sensor is capturing image frames from a right side of the inventory, resulting in a group of peanut butter jars in front of cinnamon powders and blocking the cinnamon powders, the machine learning model 124 of FIG. 1 or FIG. 2 can filter out and/or hide storage unit data and/or the icons for the cinnamon powders and display the storage unit data and/or the icons for the peanut butter jars in front of the cinnamon powers, indicating that that the cinnamon powders are behind the peanut butter jars. The machine learning model can recognize in a 3D space that the cinnamon powders are located in the spatial label 802 or in a spatial label left of a spatial label for the peanut butter jars from a front view of the inventory, thereby recognizing that the cinnamon powders are located behind the peanut butters from a right side view of the inventory. In another example, the machine learning model 124 can hide interfering objects, such as, for example, the peanut butter jars, when detecting for cinnamon powders by reducing a visibility of the storage unit data and/or icons of the peanut butter jars.

Figure 9:
FIG. 9 is an example screenshot of an inventory with active reality digital models overlayed on storage units, according to an embodiment.

FIG. 9 is an example screenshot 900 of an inventory with active reality digital models overlayed on storage units, according to an embodiment. The screenshot 900 can include a substantially real-time feed of an inventory that is captured by a sensor (e.g., camera) of a user device. As shown in FIG. 9, the screenshot 900 can include digital models (e.g., 909) overlayed on storage units. The digital models can include three-dimensional shapes similar to that of the storage units on which the digital models are overlayed. In some cases, the digital models can cover similar dimensions of the storage units on which the digital models are overlayed. As shown in FIG. 9, the screenshot 900 can include digital models such as spatial labels 904 that include a description of the storage units on which the spatial labels are overlayed. As shown in FIG. 9, the screenshot 900 can include digital models such as icons 903 representing storage unit counts of storage units associated with the same unit type as labeled by the spatial labels. As shown in FIG. 9, the screenshot 900 can include a digital model of a control point 901 that can serve as a point of reference for a 3D world defined by a machine learning model. The digital models including the control point 901, the spatial labels 904, and the icons 903 can be active reality and/or augmented reality objects.

As shown in FIG. 9, the screenshot 900 includes buttons such as an edit item button 910, an add button 912, and a subtract button 913. As shown in FIG. 9, the screenshot 900 also includes a reticle 909 that the user can point via the sensor of the user device. For instance, the user can point the sensor such that the reticle 909 focuses on a spatial label 904. After the reticle 909 focuses on the spatial label 904 for a predetermined time period, the user can enabled to select the edit item button 910 button via touch to change a description of the spatial label 904. In some cases, the spatial label 904 can be incorrectly labeled such that the user can correct the error. In some cases, the user can focus, via the sensor, the reticle 909 on an icon 903 representing a storage unit count associated with the spatial label 904. After focusing on the icon for the storage unit count icon 903 for a predetermined time period, the user can be enabled to update the storage unit count icons 903 that is stored in a database using the add button 912 or the subtract button 913. In the case that the database has recorded an incorrect count of storage units, the user can correct the error. The user can use the reticle 909 to focus on components of the inventory such that a processor can populate a display (e.g., user interface) on the user device with the digital models, the control point 901, the icons representing storage unit counts, and spatial labels as shown in FIG. 9.

Once the user has scanned relevant objects in the inventory, the user can press a checkout button 914 to capture and record data and/or any changes made by the user into the database. In some cases, once the user has pressed the checkout button 914, the digital models including the control point, spatial labels, and icons representing storage unit counts can disappear and/or become hidden. In some cases, by pressing the checkout button 914, the user can then proceed to scan a different inventory. Prior to pressing the checkout button 914 (e.g., while still scanning), the digital models of the control point 901, the icons representing storage unit counts, and the spatial labels can be presented in a brighter and/or vibrant color configuration to indicate a pending and/or active status. In some implementations, the user can change statistical information on the user device if a storage unit count is incorrect. In some cases, the user can rescan the inventory to correctly scan storage units. In some implementations, the user can tap (or tap multiple times) the display of the user device to send a signal to a processor of the user device or the server to indicate an error has occurred. The processor can further collect training data regarding false positives (e.g., duplicate storage units) from scanning the inventory or manual changes to train the machine learning model. For instance, the user can tap on the display of the user device multiple times for a time period (indicating that the user is correcting multiple errors) in which the processor can transmit a signal indicating an error. The processor can collect training data regarding the false positives based on the pattern of taps on the display to train the machine learning model to improve accuracy of the machine learning model. In some implementations, the errors identified by the user can be confirmed and/or verified by the user. This can provide verified training data.

In some implementations, the user can install an application to enable the sensor of the user device to scan storage units in the inventory and record information about the storage units in the inventory. In some cases, while the user is using the user device and the sensor to capture data of storage units, the user can exit the application on the user device (e.g., voluntary or involuntary). In some implementations, because the data (e.g., storage counts, digital models 902, control points 901, coordinates of digital models 902 and control points 901, etc.) can be continuously stored (e.g., in a local memory, at a server, at a network connected database, etc.) as it is captured, when the user reopens the application, the data that was stored can reappear and/or be repopulated on the display of the user device, enabling the user to continue scanning the inventory. In some implementations, for example, a SQLite database can be implemented on the user device to maintain persistence.

Figure 10:
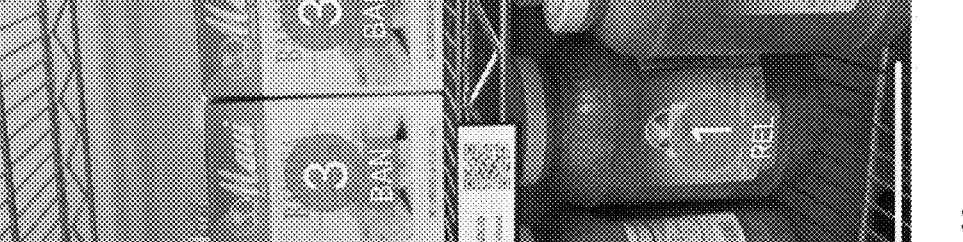
FIG. 10 is an example screenshot example of an inventory with active reality digital models overlayed on storage units, according to an embodiment.

FIG. 10 is another example screenshot 1000 of an example inventory with active reality digital models overlayed on storage units, according to an embodiment. The screenshot 1000 includes digital models including spatial labels, control points, icons representing storage unit counts, and/or the like. As shown in FIG. 10, some of the icons 1022 representing storage unit counts and control points (e.g., QR code 1012), and/or the like, are displayed in a different manner (e.g., monotone colors, different translucency, etc.), indicating an inactive status. For instance, the icons 1022 representing a storage unit count as shown in FIG. 10 has a different shade and/or color compared the icons 903 of FIG. 9 such that the different shade and/or color of the icons 1022 in FIG. 10 indicates that the storage units (and associated data) are "checked out" while the icon 903 of FIG. 9 indicates a pending state of "checking out."

Once a user has "checked out" of scanning an inventory, the digital models can turn from being colorful (e.g., FIG. 9) to being grayed out (e.g., FIG. 10) to indicate that the storage units have already been scanned. In some cases, the user can modify inventory data of a checked-out inventory to further scan storage units that may have been left out. In some implementations, following manual changes and/or corrections by the user, the machine learning model can automatically be further trained with the changes and/or corrections to produce better and more accurate results.

As shown in FIG. 10, the inventory can include a QR code 1012 that the user can scan using the sensor to determine inventory data associated with the QR code 1012. For example, the QR code can include and/or point to (e.g., include a reference in a database) information about the inventory (e.g., depth, location, capacity, SKUs, etc.). In some cases, different locations within an inventory (e.g., shelf) can be associated with a QR code that can indicate an assigned a unit type. In some cases, the QR code 1012 can be associated with information about the inventory associated with the inventory data (e.g., type of storage units, storage unit counts, storage unit states, etc.). In some cases, the QR code 1012 can be associated with information describing dimensions of the inventory to enable a machine learning model to determine depth of shelves in the inventory and count storage units stacked in rows and columns. The depth can also enable the machine learning model to determine maximum and/or desired capacity of the inventory. In some implementations, the QR code 1012 can be associated with information about locations of each spatial label in relation to the QR code 1012. For instance, a different inventory with a different QR code can store the same storage units but be located at a different location or shelf. As the QR code 1012 can be unique to an inventory, a processor of the user device (or a server) can easily track, determine, and/or identify storage units without rediscovering storage units for different inventories. In some implementations, the QR code 1012 can be scannable when the user is within a predetermined distance (e.g., set via a parameter). In some cases, the parameter can also be set such that the user can scan the QR code 1012 when positioned in front of the QR code 1012 instead of angled sideways.

In some implementations, the processor can perform Periodic Automatic Replacement (PAR) to automatically submit and/or prepare replenish requests for storage units low or empty on stock. For instance, the QR code 1012 can include information about planogram compliance of various storage units from various suppliers indicating desired and/or predetermined capacities and/or stocks of certain storage units. Based on the desired and/or predetermined capacities as defined by the planogram compliance(s), the system can determine whether a unit type is low on inventory and should be restocked. For example, the user can, using the user device including the sensor, scan the inventory to identify any missing storage units from the inventory. In some cases, the user can initially scan the inventory to record a baseline of a full inventory including storage units. The user can rescan the inventory such that the processor can identify differences between the initial scan and future scans to determine anomalies (e.g., missing or new storage units, misplaced storage units, etc.). The processor can dynamically perform PAR via the sensor (e.g., depth of shelves, size of storage units, empty spaces, etc.), to determine amount of missing storage units for each unit type and/or generate replenish requests to restock according to various planogram compliances.

FIG. 11 is an example screenshot 1100 of an inventory with active reality digital models overlayed in supposed locations of storage units, according to an embodiment. In some cases, storage units may be removed from an inventory while inventory data has not been updated to indicate the change in storage unit count based on the storage unit being removed. As shown in FIG. 11, a digital model 1109 of a storage unit of a box can be visible at a location in the inventory, indicating that that location is designated for storage units of the same type as the box. In some cases, the digital model 1109 of an absent storage unit can also indicate a missing storage unit. In some implementations, this can indicate that a processor may have not had the opportunity to rescan and determine that the storage unit is no longer there.

Figure 12:
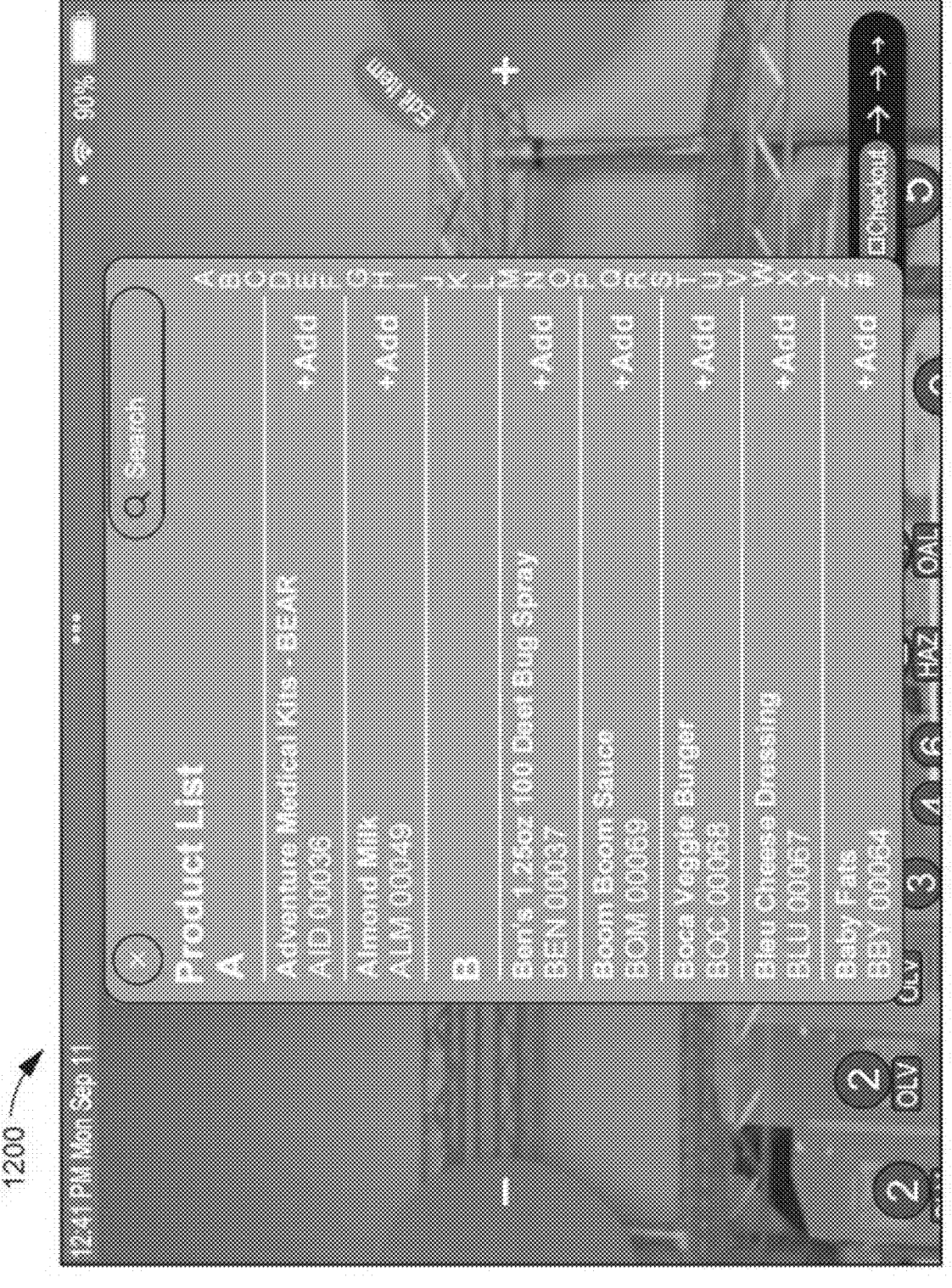
FIG. 12 is an example screenshot of a menu list, according to an embodiment.

FIG. 12 is an example screenshot 1200 from a menu list, according to an embodiment. The screenshot can include a menu that includes a list of storage units for a given store and/or inventory. The menu can enable the user to modify counts of each type of storage unit. This can allow a user to manually update storage unit counts via a user device.

FIG. 13 another example screenshot 1300 of an inventory with active reality digital models overlayed on storage units according, to an embodiment. As shown in FIG. 13, the screenshot 1300 can include tracked storage units of cups that are stacked in layers, which can be recorded and stored in a database to determine a state of the storage units (e.g., full, low on stock, etc.). As shown in FIG. 13, counted and/or identified stacks of cups for different SKUs can be denoted with different icons.

Figure 14:
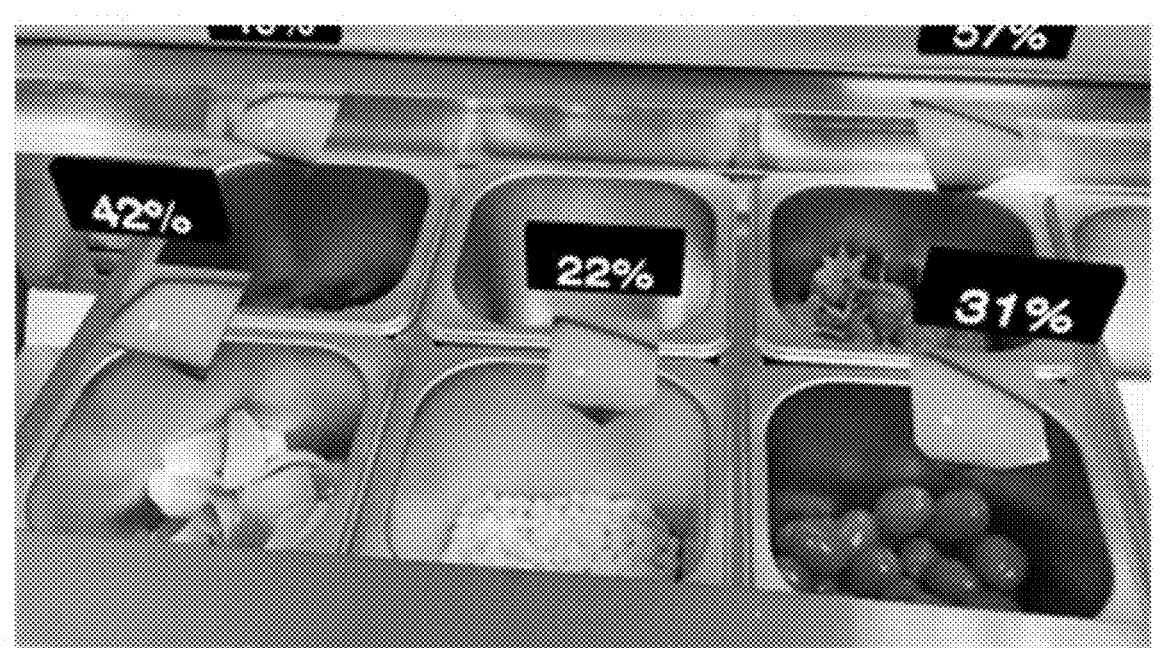
FIG. 14 is an example screenshot of an inventory with active reality digital models indicating capacity, according to an embodiment.

FIG. 14 another example screenshot 1400 of an inventory with active reality digital models indicating capacity, according to an embodiment. As shown in FIG. 14, a sensor of a user device can scan an inventory such as, for example, bins (e.g., in a buffet and/or a salad bar). Each storage unit can be represented as a digital model in the shape of a pyramid and placed at a position elevated from that storage unit. In the case that an inventory is difficult to view, the digital model in the shape of a pyramid can point to a storage unit. In some cases, a processor can generate a digital model representing a capacity and/or state of a storage unit. As shown in FIG. 14, a storage unit that is less than half full (e.g., 42%) can be indicated as such. For example, a capacity and/or depth of each bin can be identified (e.g., based on information associated with a relevant control point and/or based on depth calculations). The amount of inventory in each bin can be calculated based on depth analysis and a percent calculated and displayed. This allows inventory management to be used with open bins.

Figure 15:
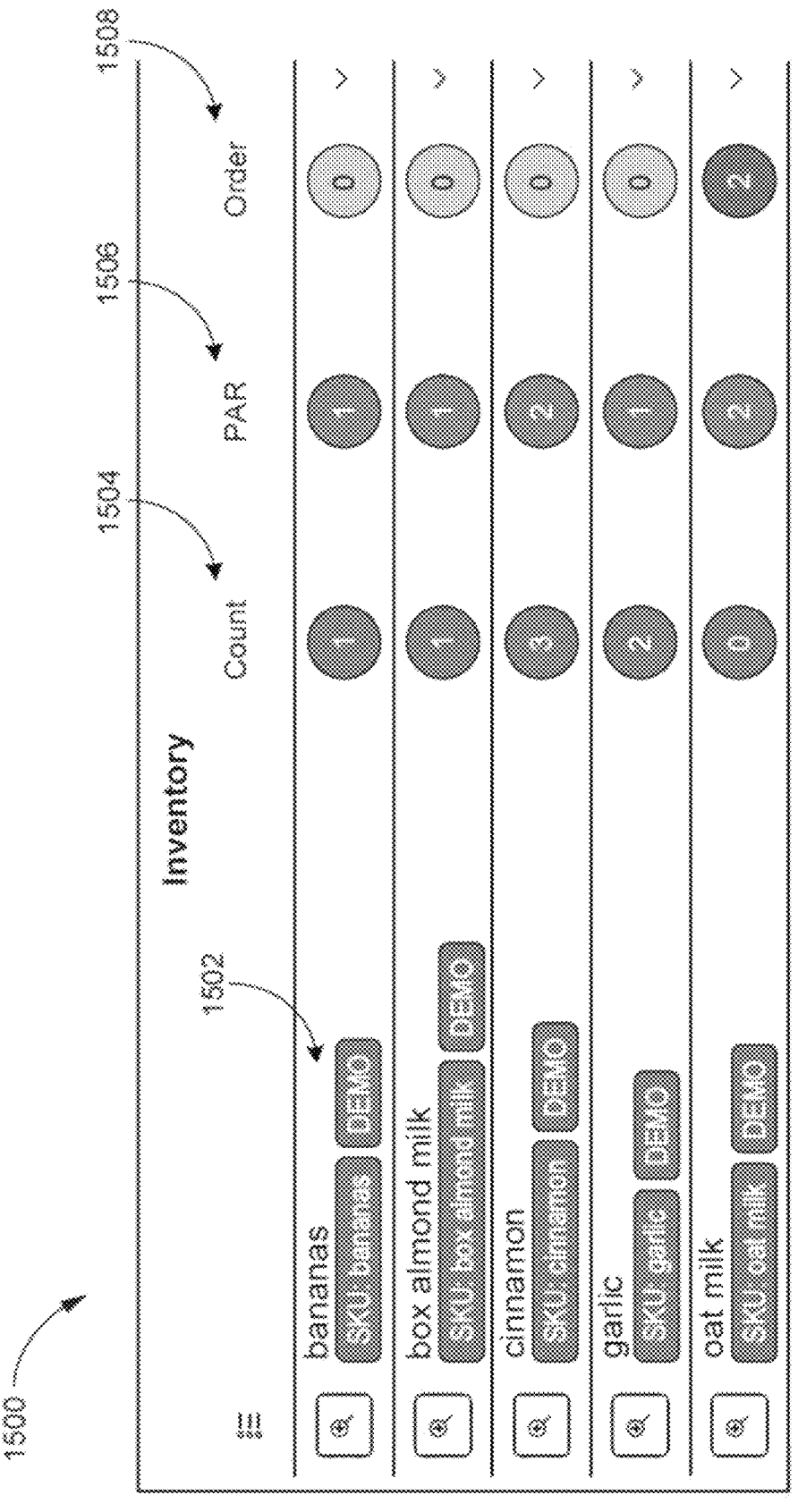
FIG. 15 is a screenshot of an inventory management dashboard, according to an embodiment.

FIG. 15 is a screenshot 1500 of an inventory management dashboard, according to an embodiment. The inventory management dashboard can include a list of unit types 1502, a column of storage unit counts 1504 (also referred to as "count") for each unit type, a column of maximum and/or desired storage unit counts 1506 (also referred as "PAR") for each unit type, and/or column of order statuses 1508 (also referred as "order") for each unit type. In some cases, the maximum storage unit counts 1506 can be calculated automatically and/or dynamically based on depth calculation of an inventory, size of storage unit, dimension data from a QR code, and/or the like. The column of the storage unit counts 1504 can include current amounts of storage units of an associated unit type. The column of the PAR storage unit counts 1506 can include the capacity for each unit type and/or a preferred capacity for each unit type. The column of order statuses 1508 can include a number of replenish requests and/or a number of storage units that are ordered to refill an inventory. In some implementations, the unit types 1502 that include pending orders to restock can be associated with a first indicator (e.g., a red color). The unit types 1502 that do not have any pending orders to restock can be associated with a second indicator (e.g., a yellow color).

In some implementations, a user of the user device (e.g., the user device 101) can modify the inventory management dashboard. The inventory management system can cause a processor (e.g., the processor 104 of FIG. 1) to prompt the user via the inventory management dashboard to update the list of unit types 1502 to include a new storage unit (e.g., a new product) to place in the inventory, and/or to update the storage unit counts 1504 for each unit type.

Figure 16A:
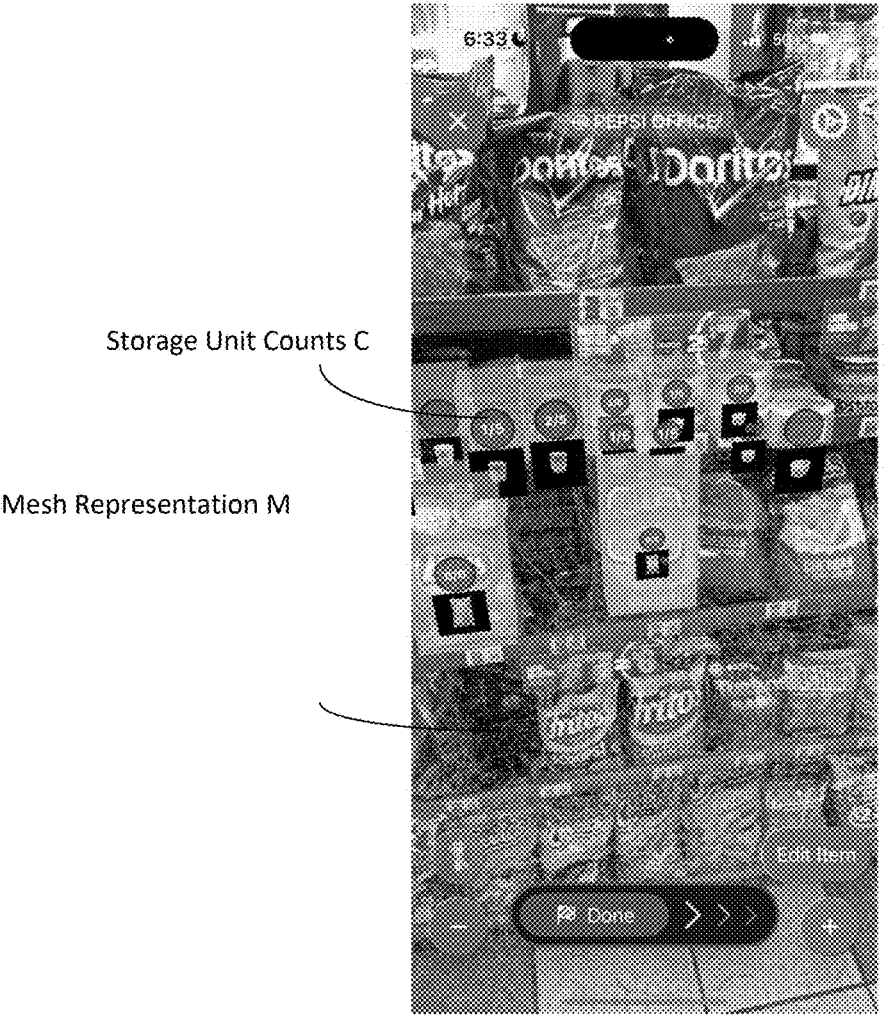
FIG. 16A is an example screenshot of an inventory with a mesh representation, according to an embodiment.

FIG. 16A is an example screenshot of an inventory with a mesh representation M, according to an embodiment. The mesh representation M can be a set of points defined around the contours of the storage units on the shelf. As shown in FIG. 16A, the set of points of the mesh representation M can appear as a network of shapes (e.g., triangles, etc.). A user device (e.g., the user device 101 of FIG. 1) can use mesh analysis of the mesh representation M to calculate storage unit counts C, as described herein with respect to FIG. 19.

Figure 16B:
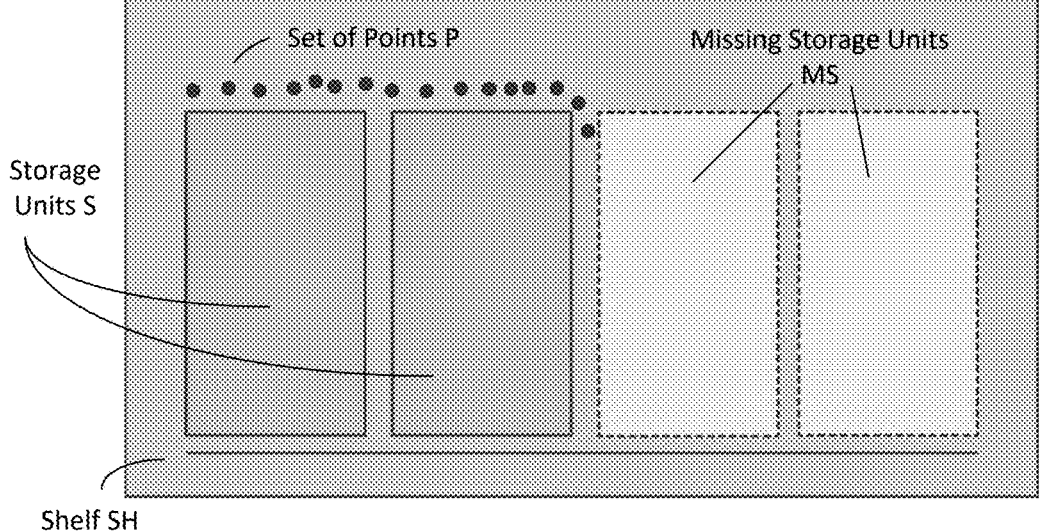
FIG. 16B is an illustration of a mesh representation for storage units pulled to the front of a shelf, according to an embodiment.

FIG. 16B is an illustration of a mesh representation for storage units on a shelf, according to an embodiment. The illustration is a side view of a shelf SH and includes a set of points P of a mesh representation (e.g., the mesh representation M of FIG. 16A), storage units S, and missing storage units MS on the shelf SH. In parts of the shelf SH where there are storage units S, the set of points P can be defined by the contours of the storage units S. In parts of the shelf SH where there are missing storage units MS, the set of points P can be defined by the contours of the shelf SH. Therefore, the set of points P can descend towards the shelf SH where there are gaps and/or at parts of the shelf where there are otherwise no storage units. Such a mesh representation can be used to determine that the storage units S are in a pull to front configuration. Specifically, using the set of points P of the mesh representation, a compute device (e.g., the user device 101 of FIG. 1) can determine that the set of points P descend toward the shelf SH where there is space and/or missing storage units MS. In this manner, the compute device can determine that storage units S are not pushed to the back of the shelf and are in a pull to front configuration. Once determined to be a pull to front configuration, the mesh analysis can be used to count the number of storage units S and not a depth analysis, as described herein (e.g., with respect to FIG. 19).

Figure 17:
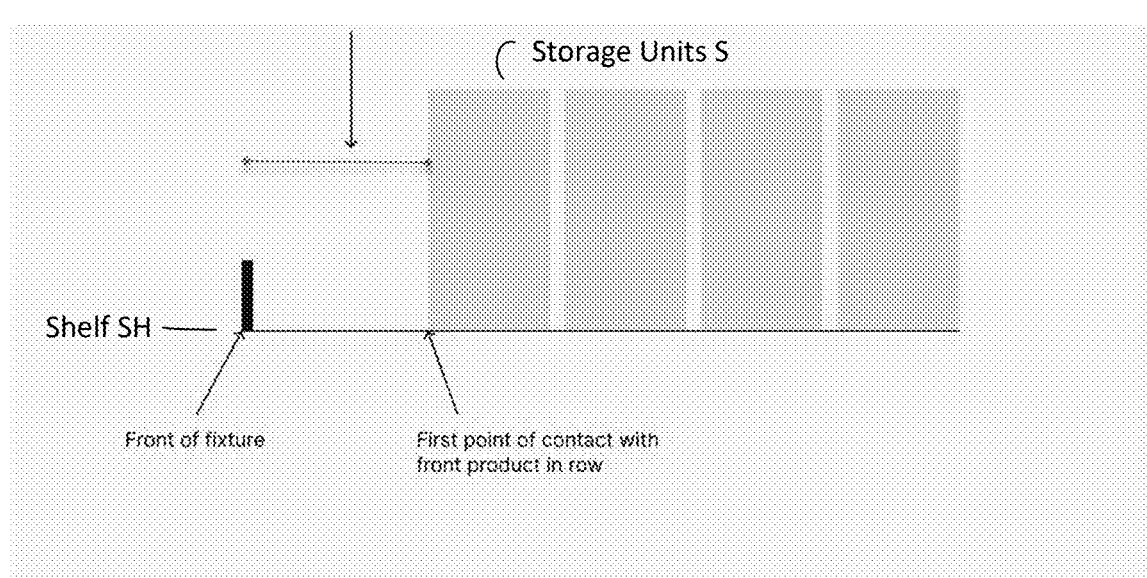
FIG. 17 is an illustration of detecting a void distance on a shelf, according to an embodiment.

FIG. 17 is an illustration of detecting a void distance V on a shelf, according to an embodiment. The void distance V can be a distance value between the front plane of the shelf SH and the storage units S. A user device (e.g., the user device 101 of FIG. 1) can calculate the void distance using a sensor (e.g., the sensor(s) 112 of FIG. 1), such as the LiDAR sensor. The void distance can represent a depth of missing storage units on the shelf SH relative to the front plane of the shelf SH. The user device can use the void distance V to calculate missing storage unit counts and/or storage unit S counts, as described in further detail herein with respect to FIGS. 19 and 23.

Figure 18:
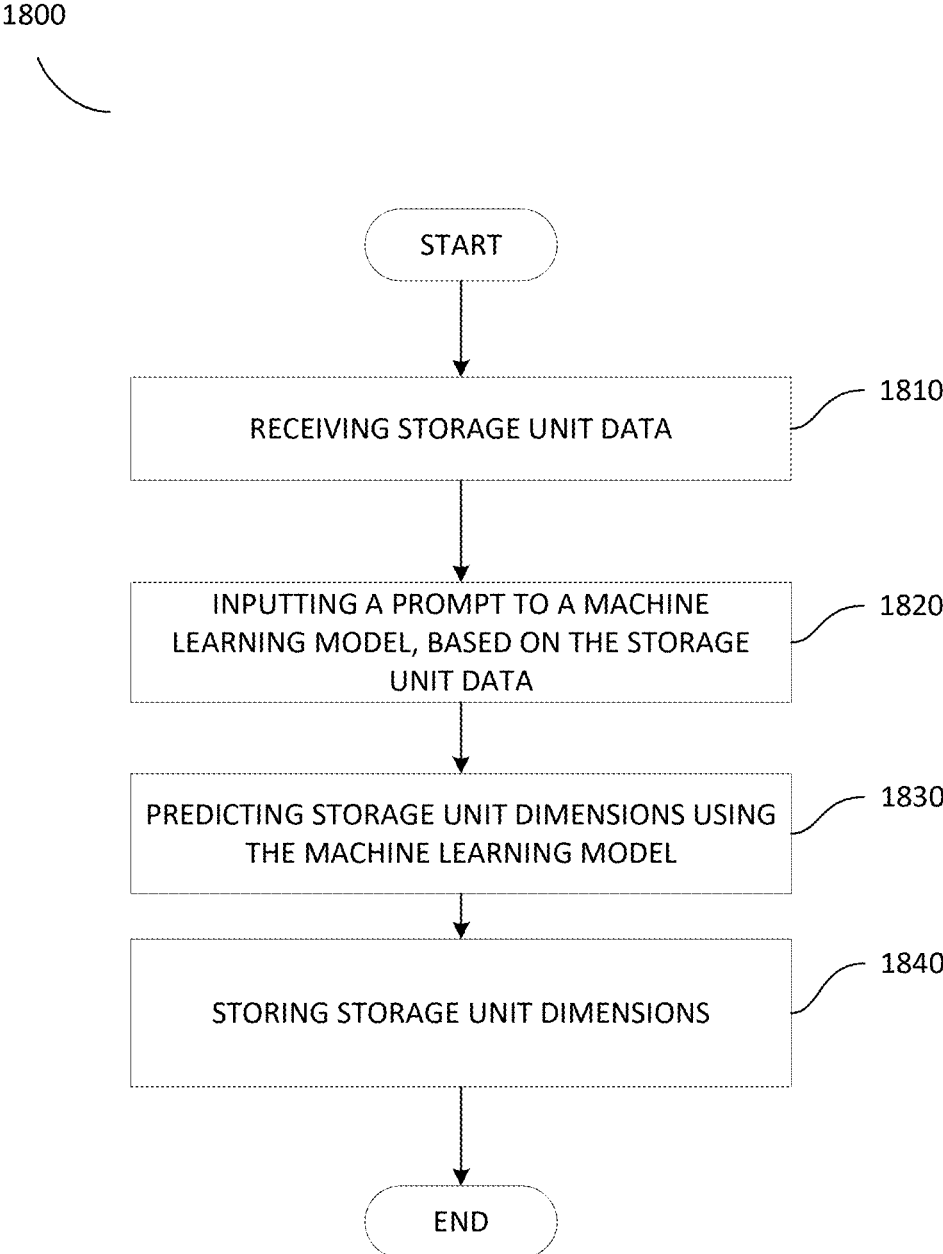
FIG. 18 is a flow diagram of a method for predicting storage unit dimensions, according to an embodiment.

FIG. 18 is a flow diagram of a method for predicting and/or inferring storage unit dimensions, according to an embodiment. The method 1800 can be stored as instructions of one or more software modules and/or as code in a memory (e.g., the memory 108 of FIG. 1) and implemented and/or executed by a processor (e.g., the processor 104 of FIG. 1).

At 1810, the method 1800 includes receiving storage unit data. The storage unit data can be and/or include text, images, and/or other data that represents storage unit information. The storage unit data may not include size information for the storage units, such as dimensions (e.g., length, depth, height, etc.), surface area, volume, and/or the like. The processor can receive storage unit data at the memory from databases having storage unit data. The databases can be coupled to the processor via a network (e.g., the network 190 of FIG. 1), or through a wired/wireless connection. For example, the databases can be barcode databases, product databases, and/or storage unit databases such as, for example, GoUPC, BarcodeLookup, UPCItemDB, OpenFoodFacts, etc.

At 1820, the method 1800 includes inputting a prompt to a machine learning model based on the storage unit data. The machine learning model can be stored in the memory. In some implementations, the machine learning model can be stored in a memory of another compute device coupled to the processor via a network or via a wired and/or wireless connection. The machine learning model can be a natural language processing (NLP) model such as a large language model (LLM). The machine learning model can be pre-trained relative to receiving the storage unit data. For example, the machine learning model can be a pre-trained LLM and can be accessed by the processor through a cloud interface, such as an application programming interface (API). The prompt can be and/or include instructions to predict storage unit dimensions using the storage unit data.

At 1830, the method 1800 includes predicting storage unit dimensions using the machine learning model in response to inputting the prompt. The dimensions can be a length, depth, height, etc.

At 1840, the method 1800 includes storing storage unit dimensions. The processor can store the storage unit dimensions associated with an identifier of the storage unit at a database (e.g., the database 391 of FIG. 3). The storage unit dimensions can be accessed from the database by the processor in response to detecting storage units in, for example, image frames from a sensor operably coupled to the processor (e.g., the sensor(s) 112 of FIG. 1).

In some implementations, the method 1800 can include receiving image frames of an inventory, as described herein. In some implementations, the method 1800 can include locating control points, as described herein. The control point can be, for example, a barcode representing storage unit information in the inventory. In some implementations, the method 1800 can include identifying the storage unit dimensions in the database, based on the control point. In some implementations, the method 1800 can include detecting storage units, as described herein. In some implementations, the method 1800 can include calculating storage unit counts for the storage units, based on the storage unit dimensions identified in the database.

Figure 19:
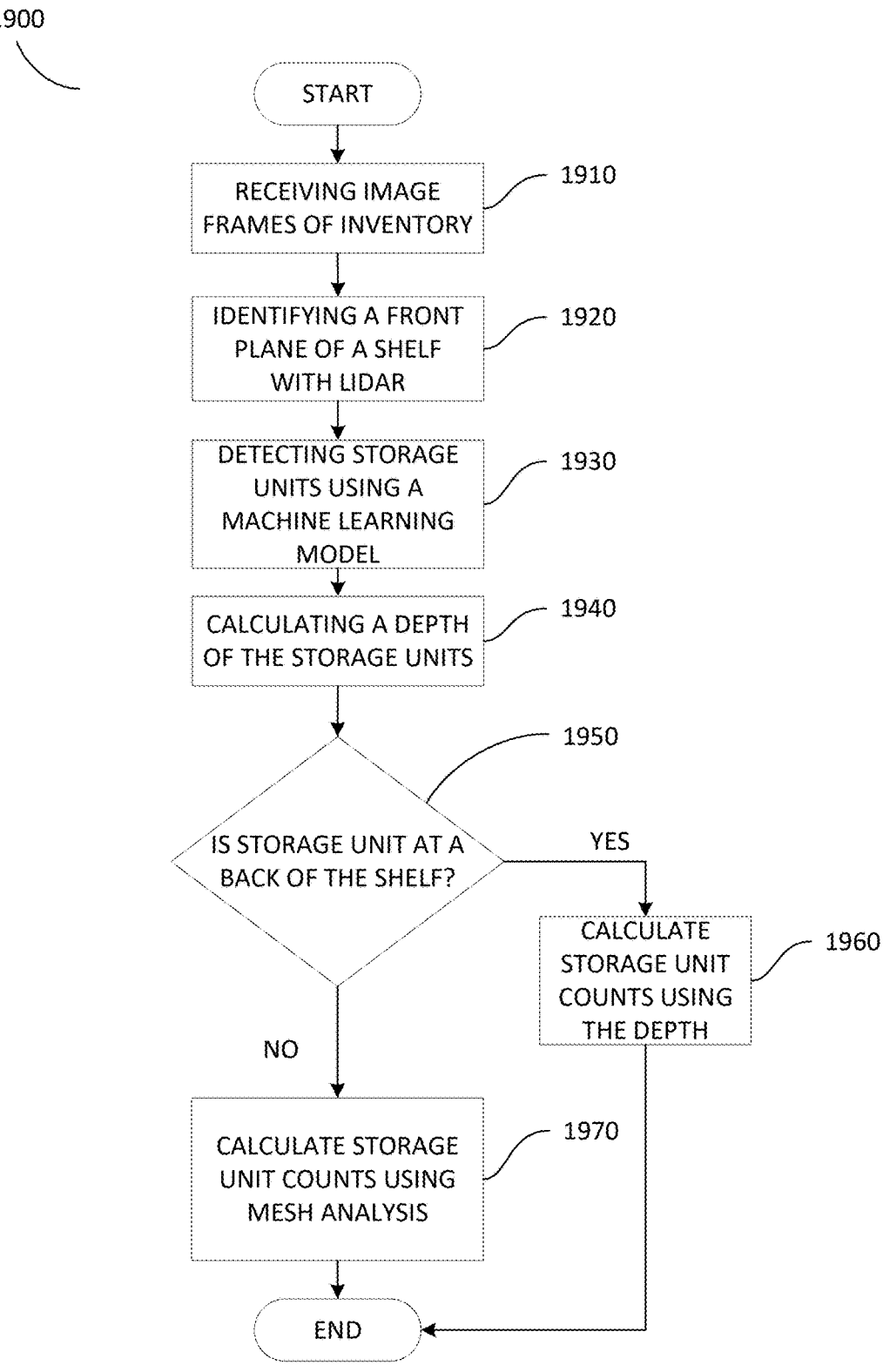
FIG. 19 is a flow diagram of a method for counting storage units in an inventory, according to an embodiment.

FIG. 19 is a flow diagram of a method 1900 for counting storage units in an inventory, according to an embodiment. The method 1900 can be stored as instructions of one or more software modules and/or as code in a memory (e.g., the memory 108 of FIG. 1) and implemented and/or executed by a processor (e.g., the processor 104 of FIG. 1). At 1910, the method 1900 includes capturing image frames of an inventory. In some implementations, capturing the image frames can include receiving, at a processor of a user device and from a sensor, multiple image frames of an inventory. In some implementations, the sensor can include a depth sensor such as, for example, a time-of-flight (TOF) sensor; a camera such as, for example, an ultra-wide-angle camera, a wide-angle camera, a telephoto camera, monochrome camera, a macro camera, and/or the like; a light detection and ranging (LiDAR) sensor; and/or the like. In some implementations, the method 1900 can include scanning and/or capturing multiple image frames of the inventory and the multiple storage units in substantially real-time. In some implementations, a user can operate the user device and control where the sensor is capturing images and/or generating image frames.

At 1920, the method 1900 includes identifying a front plane of a shelf using a LiDAR sensor at the user device to define a control point. The shelf can be or include, for example, steel shelving, rivet shelving, cantilever racks, drive-in racking, adjustable shelving, wire shelving, pallet racking, boltless shelving, floating shelving, gondola shelving, gravity fed shelving, and/or the like. The front plane can be a surface of the shelf and can include predetermined identifiers, QR codes, barcodes, and/or the like, associated with storage units disposed on the shelf. The processor can use the control point to conduct a spatial search in the inventory. The spatial search can include coordinates and/or a virtual representation of an area surrounding the inventory. In some implementations, the area can include walls, floors, ceilings, and/or the like. The area can also include real-world physical objects including the inventory that houses storage units, such as, for example, shelves, racks, storage units, and/or the like. The spatial search can include multiple control points.

At 1930, the method 1900 includes detecting storage units. Detecting storage units can include identifying dimensions (e.g., length, width, height, etc.) for the storage units, as described herein (e.g., with respect to FIG. 18). In some implementations, detecting the storage units can include detecting, by a machine learning model (e.g., the machine learning model 124 of FIG. 1), multiple storage units in the spatial search. In some implementations, each storage unit from the multiple storage units is associated with a unit type from multiple unit types. In some implementations, identifying the multiple unit types can include generating icons for the storage units and/or the spatial label for each unit type from multiple unit types to be displayed on the user device. In some implementations, the multiple storage units can include multiple subsets of storage units. Each storage unit can be associated with each unit type from the multiple unit types.

At 1940, the method 1900 includes calculating a depth of the storage units using the LiDAR sensor at the user device, as described herein. To measure the depth of the storage units, the LiDAR sensor can be level with storage units on the shelf. In some implementations, the user device can also calculate a depth of the shelf by pointing the LiDAR sensor towards a back plane of the shelf.

At 1950, the method 1900 includes determining whether storage units are disposed at the back of the shelf. Storage units can be disposed at the back of the shelf when they are pushed to the back of the shelf. Such a push to back configuration can, for example, facilitate efficient storage of storage units in an inventory. Storage units can be disposed at the front of the shelf (e.g., not at the back of the shelf) when they are pulled to the front of the shelf. Such a pull to front configuration can, for example, facilitate access to and/or re-stocking of storage units in the inventory. In some implementations, gaps can exist among storage units on the shelf. For example, storage units that were initially pushed to the back to the shelf can lose their original configuration when a person pulls at least one of the storage units towards the front of the shelf. The processor can use a void distance value, the depth of the storage units, the depth of the shelf, and/or a mesh analysis to determine whether the storage units are at the back of the shelf, at the front of the shelf, and/or have gaps among them (e.g., as described with respect to FIGS. 16B and 17). A void distance can be a distance value between the front plane of the shelf and the storage units. The processor can calculate the void distance using a sensor, such as the LiDAR sensor (e.g., as described with respect to FIG. 17). The void distance can indicate a depth of missing storage units relative to the front plane of the shelf. The processor can produce a mesh representation of the storage units by positioning the sensor above the storage units and towards a plane between the surface of the shelf and the back of the shelf. The mesh representation can be a set of points defined around the contours of the storage units on the shelf. In parts of the shelf where there are no storage units, the mesh representation can be a set of points defined by the contours of the shelf Therefore, the mesh representation can descend towards the shelf where there are gaps and/or at parts of the shelf where there are otherwise no storage units (e.g., as described with respect to FIG. 16B).

In an example, storage units can be pulled to the front of the shelf. There can be a gap between the storage units and the back of the shelf. The processor can calculate a void distance to determine that the storage units are pulled to the front of the shelf, but the void distance may not indicate whether there are storage units at the back of the shelf or whether there are gaps among the storage units. In such an example, the processor can use a mesh analysis to produce a mesh representation of the storage units (e.g., as described with respect to FIGS. 16A and 16B). By positioning the sensor such that the back of the shelf is visible in the image frames, the processor can produce a mesh representation of the storage units and the shelf using computer vision. The processor can determine that the mesh representation of the storage units does not extend to the back of the shelf and therefore determine that the storage units do not extend to the back of the shelf. Similarly, the mesh analysis can identify situations where the storage units extend to the back of the shelf. Specifically, in such a situation, the mesh representation does not descend towards the shelf but extends substantially linearly (e.g., on the top of the storage units) to the back of the shelf.

At 1960, the method 1900 includes, when storage units are at the back of the shelf, calculating storage unit counts for storage units disposed at the back of the shelf, using the depth of the storage units. The processor can subtract the void distance from the depth of the shelf to determine an amount of the shelf occupied by storage units. The amount of the shelf can be a dimension such as, for example, a width, that can extend from a first storage unit of the storage units and to a last storage unit of the storage units disposed at the back of the shelf. The processor can divide the amount of the shelf occupied by storage units by the depth of the storage units (e.g., a depth value of one of the storage units) to calculate a storage unit count. In some implementations, calculating storage unit counts can include calculating a storage unit count from multiple storage unit counts and for each unit type from the multiple unit types from the multiple storage units detected. Each storage unit count can include a total number of storage units associated with each unit type.

At 1970, the method 1900 includes, when storage units are not at the back of the shelf, calculating storage unit counts for storage units not disposed at the back of the shelf, using mesh analysis. The mesh representation including the storage units can have a size (e.g., depth, area, volume, etc.). For example, the size of the mesh representation can be a distance from a front of the first storage unit to where the mesh representation begins a descent towards the shelf. The processor can divide the depth of the mesh representation defined by contours of the storage units by the depth of the storage units (e.g., a depth value of one of the storage units) to calculate a storage unit count.

While shown in FIG. 19 as calculating the storage unit counts using one of the depth analysis or the mesh analysis, in some implementations, the method 1900 can include both calculating storage unit counts for storage units using the depth and calculating storage unit counts for stage units using the mesh analysis, and choosing which storage unit count to store. For example, the user device can prompt the user to select which storage unit count to store and/or can automatically determine which storage unit count is more likely and store that count. In such implementations, the method 1900 can include calculating storage unit counts for storage units using both the depth and the mesh analysis.

In some implementations, the method 1900 can include sending a signal to output each storage unit count from the plurality of storage unit counts on a display of the user device. In some other implementations, the display can be a display of another compute device (e.g., the display 176 of FIG. 2).

FIG. 20 is a flow diagram of a method 2000 for a machine learning system to predict an identity of occluded storage units in a volume, according to an embodiment. The method 2000 can be stored as instructions of one or more software modules and/or as code in a memory (e.g., the memory 108 of FIG. 1) and implemented and/or executed by a processor (e.g., the processor 104 of FIG. 1). At 2010, the method 2000 includes receiving image frames of an inventory. In some cases, receiving the image frames can include receiving, from a sensor (e.g., a camera) operatively coupled to a processor of a user device, the image frames of the inventory.

At 2020, the method 2000 includes identifying, in the plurality of image frames, a set of spatial labels associated with visible storage units, as described herein.

At 2030, the method 2000 includes identifying a spatial group associated with visible storage units, based on the set of spatial labels. The spatial group can be any container in the inventory used to hold, support, and/or organize storage units. The spatial group can be, for example, a palette, a box, a food pan, a shelf, a rack, a bin, a tank, and/or any suitable container for holding storage units. In some implementations, identifying the spatial group can include identifying a control point associated with the identity of the spatial group, such as a barcode, identifier, or other indicator. In some implementations, the machine learning model (e.g., the machine learning model 124 of FIG. 1) can identify the spatial group and determine the dimensions of the spatial group. The machine learning model can also detect the visible storage units of the spatial group.

At 2040, the method 2000 includes measuring a volume containing the plurality of visible storage units associated with the spatial group. The volume can also contain storage units occluded by the visible storage units (also referred to herein as occluded storage units). In some instances, the spatial group can contain storage units within an interior of the spatial group (e.g., a box, a food pan, a bin, a tank, etc.). In such an example, the processor can determine using a sensor (e.g., a LiDAR sensor) a depth of the storage units in the spatial group to measure a volume of the storage units in the spatial group. The processor can use the volume of the storage units in the spatial group to measure a fullness of the spatial group. The fullness can describe the amount of space occupied by storage units in the spatial group with respect to a total amount of space of the spatial group. A fullness measurement can be expressed as, for example, a ratio of the volume of the storage units in the spatial group to a volume of the spatial group. The fullness measurement can be stored in a memory (e.g., the memory 108 of FIG. 1). In some instances, the spatial group can hold storage units on a surface of the spatial group (e.g., a palette, a shelf, a rack, etc.). In such an example, the processor can determine, using the machine learning model, dimensions of the storage units on the spatial group and can extrapolate the dimensions to measure a total volume of the storage units on the spatial group.

At 2050, the method 2000 includes calculating a visible storage unit count of the visible storage units contained in the volume. The processor can, for example, sum the dimensions of each visible storage unit to determine an amount of the volume occupied by visible storage units. The processor can subtract the amount of the volume occupied by visible storage units from the volume of the spatial group to determine an amount of the volume occupied by occluded storage units. The processor can calculate the visible storage unit count by dividing the amount of the volume occupied by the visible storage units by the dimensions of a storage unit from the visible storage units. Calculating the visible storage unit count can include calculating a visible storage unit count for each storage unit type. For example, the processor can calculate a visible storage unit count for each of the visible storage units in a spatial group including storage units of storage unit type A, storage units of storage unit type B, and storage units of storage unit type C. The visible storage units can be organized by storage unit types on the spatial group.

At 2060, the method 2000 includes predicting an identity of the occluded storage units contained in the volume using at least one of the visible storage unit count or a plurality of features of the visible storage units. In some instances, the visible storage units can have the same unit type. In some such instances, the processor can assign the unit type of the occluded storage units to be the unit type of the visible storage units. In some instances, the visible storage units can have different unit types. In some such instances, the processor can predict the identity of the occluded storage units based on the plurality of features of the visible storage units.

The plurality of features used to predict the occluded storage units can include, for example, an identifier, a QR code, and/or a barcode disposed on the visible storage units and/or on the spatial group. The plurality of features can be representative of an identity of storage units disposed on the spatial group, including the visible storage units and the occluded storage units. In some implementations, the plurality of features can also be representative of an order history associated with the spatial group. For example, the user device can scan a spatial group to cause the user device to process and/or display an order history associated with the spatial group stored in a database. The processor can analyze the order history to determine whether the storage units disposed on the spatial group are consistent (e.g., periodic or similar each time) or inconsistent (e.g., sporadic or random each time) among orders. The processor can predict the identity of the occluded storage units based on the order history. Predicting the identity of the occluded storage units can include predicting dimensions associated with the occluded storage units.

At 2070, the method 2000 includes predicting an occluded storage unit count in the volume using the identity of the occluded storage units contained in the volume. The processor can, for example, sum the dimensions of each occluded storage unit to determine an amount of the volume occupied by occluded storage units.

At 2080, the method 2000 includes determining a storage unit count for the spatial group, by summing the visible storage unit count and the occluded storage unit count.

In some implementations, the method 2000 can include performing a volumetric footprint analysis for the spatial group. The footprint analysis can be and/or include generating statistics for the spatial group based on the amount of the volume occupied by storage units. For example, the processor can calculate, for each spatial group type, an average, mean, mode, variance, standard deviation, etc. of the volume occupied by storage units, and/or of the volume unoccupied by storage units. The processor can send a signal to a display (e.g., the display 148 of FIG. 1) to display the results of the footprint analysis. In some implementations, the inventory management system can cause the processor to include the footprint analysis in the storage unit report, or in another report.

In some implementations, for example, the spatial group may be a palette holding storage units having different unit types. In such an example, the storage units may be stacked on the palette in rows and columns but can be stacked in any configuration. Storage units at a periphery of the palette may be visible to a user of a user device and may occlude storage units towards a center of the palette. A user can scan the palette using a camera of a user device to add a digital model of the palette to a spatial search of the inventory. The digital model may be generated using properties of the palette, including dimensions of the palette (e.g., height, length, depth, etc.). In some implementations, a control point is not identified. A machine learning model of the user device can detect (visible) storage units at the periphery of the palette and can determine dimensions (e.g., height, length, depth, etc.) of the visible storage units by, for example, searching a database (e.g., the database 391 of FIG. 3) and/or by using a machine learning model (with respect to FIG. 18). The user device can thereby add digital models of the visible storage units on the palette to the spatial search. The user device can determine a volume for each visible storage unit using the dimensions. The user device can sum the volume(s) of each visible storage units to calculate a volume of the visible storage units on the palette. The volume of the visible storage units on the palette can have dimensions (e.g., height, length, depth, etc.). The user device can count each visible storage unit detected by the machine learning model to calculate a visible storage unit count, as described herein. Instead, or in addition, the user device can divide the volume of the visible storage units by the volume of each visible storage unit to calculate the visible storage unit count. The user device can calculate a volume of the palette based on detected dimensions of the palette (e.g., height, length, depth). The user device can then calculate a volume occupied by the occluded storage units on the palette by subtracting the volume of the visible storage units from the volume of the palette.

The user device can predict the unit type of each occluded storage unit based on the unit type(s) of the visible storage units. For example, a database can contain an order history for palettes that have storage units with unit types such as the unit type(s) of the visible storage units. For example, the visible storage units can be ketchup bottles, and the order history of palettes that include ketchup bottles sporadically, periodically, or always include mustard bottles. The user device can predict that the occluded storage units are, for example, mustard bottles, based on the order history. Given the unit type prediction, the user device can determine a volume of the occluded storage units associated with the unit type based on size data from the database. The user device can divide the volume of the occluded storage units by the volume of each occluded storage unit to calculate an occluded storage unit count. A similar process can be used to measure a fullness of, for example, storage units in a box.

FIG. 21 is a flow diagram of a method 2100 for inventory management via a user device using edge computer vision, active reality, and a predictive engine, according to an embodiment. The method 2100 can be stored as instructions of one or more software modules and/or as code in a memory (e.g., the memory 108 of FIG. 1) and implemented and/or executed by a processor (e.g., the processor 104 of FIG. 1). At 2110, the method 2100 includes receiving image frames of an inventory. In some cases, receiving the image frames can include receiving, from a sensor (e.g., a camera) operatively coupled to a processor of a user device, the image frames of the inventory.

At 2120, the method 2100 includes locating control points to determine a spatial search in the image frames. In some implementations, the control points can include barcodes, icons, landmarks, identifiers, specific shelves, and/or other indicators that can be used to orient the sensor. In some implementations, locating control points can include generating icons indicating the control points and displaying the icons on a display on the device. In some implementations, the method 2100 can also include generating icons for the control point from multiple control points to be displayed on a display of the user device. The spatial search can include coordinates and/or a virtual representation of an area surrounding the inventory. In some implementations, the area can include walls, floors, ceilings, and/or the like. The area can also include real-world physical objects including the inventory that houses storage units, such as, for example, shelves, racks, storage units, and/or the like. The spatial search can include multiple control points.

At 2130, the method 2100 includes identifying in the spatial search a form for a plurality of storage units, each storage unit from the plurality of storage units being associated with a storage unit type from a plurality of storage unit types. In some implementations, a machine learning model (e.g., the machine learning model 124 of FIG. 1) can identify the form. The form of a storage unit can be and/or include a shape, size, or configuration of the storage unit and can be associated with a storage unit type. For example, the form can include shapes of the storage units such as a cube, a cuboid, a cylinder, a bottle, a carton, a jug, and/or the like as described in detail herein with respect to FIG. 1. In some implementations, the shape can be indicative of the storage unit type (e.g., a milk jug). The storage units can have a structured configuration such as, for example, an array, a grid, a stack, a queue, etc. The storage units can also have an unstructured configuration such as a random cluster. The configuration of storage units can be based on, for example, the unit type (e.g., egg cartons can be stacked), a demand and/or supply for the storage units, and/or a spatial group in the inventory (e.g., a palette, a box, a food pan, a shelf, a rack, a bin, a tank, and/or any suitable container for holding storage units.). For example, in some implementations, storage units can be pulled to the front of a shelf so that a potential space can exist between the storage units and a back of the shelf. In some such implementations, the storage units can be pulled to the front of an angled shelf by gravity, which is also referred to herein as gravity fed shelving. The type of spatial group such as gravity fed shelving can be predefined by a user of the user device and stored in the memory of the user device. In some implementations, the storage units can be pushed to the back of shelf.

At 2140, the method 2100 includes determining, based on the form for the plurality of storage units, a plurality of identifying techniques for the plurality of storage units. The identifying techniques can be ways to determine or predict a unit type for each storage unit from the plurality of storage units. The identifying techniques can include, for example, a direct match, an optical character recognition (OCR) match, a label match, scanning a barcode, a size classifier, a location classifier, a shape classifier, and/or other identifying techniques described herein. Using multiple identifying techniques can increase an accuracy of the inventory management system. For example, in some instances storage units may be misplaced on a shelf such that a barcode scan may not accurately represent what storage units are on the shelf. In such instances, using computer vision to predict the identity may be more accurate than using the barcode. The direct match can include using a computer vision model (e.g., the machine learning model 124 of FIG. 1) to predict a unit type identity. The OCR match can include reading characters of text on storage units and matching them to known text associated with a unit type identity (e.g., text stored in a database). The label match can include matching labels on the storage units to the control point (e.g., when the control point is an identifier, a barcode, or a QR code). Determining the plurality of identifying techniques can include selecting one, or multiple techniques, based on, for example, the storage unit shape (e.g., a unique or common shape), a storage unit size or amount (e.g., three inches in length, one foot in length, etc.), or a storage unit configuration (e.g., pull to front, push to back, an array, a grid, etc.). For example, in response to an absence of text and/or labels to match to, the processor can use the direct match.

At 2150, the method 2100 includes executing each identifying technique from the plurality of identifying techniques to define a set of potential unit types. The set of potential unit types can be the determinations or predictions returned by each identifying technique. The set of potential unit types can include a confidence value associated with the unit type identity. For example, the processor can use the direct match, OCR match, label match, and/or other identifying techniques as described herein to define a set of potential unit types of, for example, different sized bags on a shelf. For example, a LiDAR sensor at the user device can detect the bags including size information. Instead, or in addition, a camera at the user device can detect the bags and a computer vision model can generate a mesh representation of the bags including size information. The processor can execute each identifying technique to identify the different sized bags including the sizes of each bag.

At 2160, the method 2100 includes assigning, based on the set of potential unit types, a unit type identity to the plurality of storage units. The user device can assign the unit type identity based on the identifying technique that produced the unit type identity with the highest confidence value. In some implementations, confidence values can be weighted according to a predefined weight of the identifying techniques. For example, a weight of an OCR match may be greater than a weight of a label match. The user device can accordingly weight each confidence value and assign the unit type identity based on the identifying technique that produced the unit type identity with the highest weighted confidence value. In some implementations, the confidence values for the various techniques can be combined and the unit type with the highest combined confidence value can be used. In some implementations, a user can update the unit type identity using, for example, the inventory management dashboard.

At 2170, the method 2100 includes calculating a storage unit count from a plurality of storage unit counts and for each unit type from the plurality of unit types from the plurality of storage units, as described herein.

At 2180, the method 2100 includes sending a signal to output each storage unit count from the plurality of storage unit counts on a display of the user device.

In some implementations, the method 2100 can include assigning the unit type identity to the plurality of storage units in response to a selection from a user of the user device 101. The user device (e.g., the user device 101 of FIG. 1) can send a signal to a display (e.g., the display 148 of FIG. 1) to display the set of potential unit types to a user, prompting the user to select any one from the set of potential unit types. In some implementations, the user device can send the signal in response to an absence of a confident decision by the user device. The user device can send the signal if, for example, the confidence values for each unit type identity from the set of potential unit type are less than a predetermined threshold (e.g., 60%, 70%, 80%, 90%, etc.).

In some implementations, the count can be and/or include an individual count, a push to back count, a pull to front count, a gravity fed count, an optical character recognition (OCR) count, a measured fullness count. Calculating the individual count can include calculating running counts for each storage unit of each unit type identified for a shelf in the inventory. The push to back count can be a count for storage units having a push to back configuration. The pull to front count can be a count for storage units having a pull to front configuration. The gravity fed count can be a count for storage units having a pull to front configuration specifically on gravity fed shelving. For example, the storage units can be bottles, cans, cartons, etc. and the count can be based on a distinguishing feature(s) of the storage units, such as a bottle cap, a top of the can, a component of a milk carton, etc. The OCR count can be a count for storage units identified using OCR. The measured fullness count is described in further detail herein with respect to FIG. 20.

In some implementations, the method 2100 can include determining and executing a single identifying technique best suited for the plurality of storage units, based on a form, location, or other property of the plurality of storage units. For example, the user device can contain instructions to identify the storage units using OCR when the sensor captures text. In another example, the user device can contain instructions to identify the storage units from a barcode scan when the storage units are out of a line of sight of the sensor (e.g., on a tall shelf, a high rack, etc.).

FIG. 22 is a flow diagram of a method 2200 for persisting storage units in active reality using barcodes, according to an embodiment. The method 2200 can be stored as instructions of one or more software modules and/or as code in a memory (e.g., the memory 108 of FIG. 1) and implemented and/or executed by a processor (e.g., the processor 104 of FIG. 1). At 2210, the method 2200 includes receiving image frames of an inventory at a first time. In some cases, receiving the image frames can include receiving, from a sensor (e.g., a camera) operatively coupled to a processor of a user device, the image frames of the inventory.

At 2220, the method 2200 includes identifying a first control point in the image frames. In some implementations, the control points can include barcodes, QR codes, icons, landmarks, identifiers, specific shelves, and/or other indicators that can be representative of an identity of one or more storage units. Identifying the first control point can include locating the control point and storing the location in a memory at the user device. In some implementations, the location can be represented as, for example, global positioning system (GPS) coordinates, as relative coordinates with respect to GPS coordinates of a location (e.g., a predefined landmark) in the inventory, as relative coordinates with respect to the sensor's position (e.g., in the spatial search or another point cloud), as a label (e.g., shelf five on floor three) and/or the like. The location of the first control point can be a boundary of an inclusion zone (also referred to herein as an area) extending to a location of another control point. The inclusion zone can be a volume including a length, height and a depth that contains storage units associated with the first control point. For example, a shelf can have two barcodes that are disposed at different locations on a surface of the shelf. The location of the first barcode can be a boundary of an inclusion zone associated with the first barcode, the inclusion zone extending in length from the location of the first barcode and to the location of a second barcode. The depth of the inclusion zone can be a depth of the shelf, and the height of the inclusion zone can be a height between the first barcode and a third barcode. The third barcode can be positioned at a location on the shelf that is higher (e.g., directly above) than the location of the first barcode. Similarly, the location of the second barcode can be a boundary of an inclusion zone associated with the second barcode and not the inclusion zone of the first barcode, the inclusion zone extending from the location of the second barcode and to the location of another barcode.

At 2230, the method 2200 includes locating, at the first time and using a light ranging sensor operatively coupled to the processor of the user device, a first plurality of storage units disposed in an inclusion zone associated with the first control point in the inventory and not with a second control point in the inventory. The light ranging sensor can be laser distance sensors, LiDAR, thru-beam photoelectric sensors, light grids, fiber optic sensors, contrast sensors, and/or discrete distance sensors. The location of each storage unit in the first plurality of storage units can be represented as, for example, GPS coordinates in, for example, a spatial search or other point cloud defined by the light ranging sensor. In some instances, the user device can identify storage units using the first control point. For example, the first control point can be a barcode representative of milk. In some instances, the user device can identify storage units using another identifying technique, such as an OCR match, a label match, a decision engine, a location, a shape, a form, as described herein.

At 2240, the method 2200 includes storing a representation of the first plurality of storage units disposed in the area in a memory operatively coupled to the processor of the user device. The representation can include a location of the control point and/or locations for each storage unit from the plurality of storage units within the area. The representation can also include a digital object associated with the area, including dimensions of the digital object and a location of the digital object. The locations of the control point, storage units, and representation can be represented as, for example, GPS coordinates, as relative coordinates with respect to GPS coordinates of a location (e.g., a predefined landmark) in the inventory, as relative coordinates with respect to the sensor's position (e.g., in the spatial search or another point cloud), as a label (e.g., shelf five on floor three), and/or the like. The representation, including the location of the control point and/or locations for each storage unit within the inclusion zone, can persist in the memory and can be recalled from the memory at a time after the first time by the user device. For example, the control point can be a first barcode. The user device can scan the first barcode to identify storage units near the control point as 12 oz cups. The user device can store the first barcode's location as relative coordinates in the spatial search. The user device can generate and continually render a digital model for the inclusion zone of the first barcode. The user device can detect storage units in the inclusion zone using a sensor (e.g., LiDAR, image sensor, GPS sensor, etc.) and identify the storage units as 12 oz cups based on the first barcode. The user device can store the 12 oz cups as spatial labels including relative coordinates to the first barcode in the spatial search. The user device can identify more storage units in the inclusion zone as 12 oz cups until the user device detects a second barcode. The user device can scan the second barcode to identify storage units near the second barcode as 16 oz cups. The user device can then generate and continually render a digital model for the inclusion zone of the second barcode, and proceed as described herein.

At 2250, the method 2200 includes receiving, at a second time after the first time and from the image sensor, a second plurality of image frames of the inventory.

At 2260, the method 2200 includes locating, based on the representation and without identifying the first control point in the second plurality of image frames, a second plurality of storage units disposed in the area at the second time. The user device can recall the representation, including the location of the first control point and/or the locations of each storage unit within the inclusion zone, from the memory when, for example, a location of the user device is within a predetermined proximity of the first control point location within the area. A user of the user device can specify the proximity at, for example, the first time or a time earlier than the first time. The proximity can be, for example, the in the range of less than three feet, less than five feet, less than ten feet, or any suitable distance such that the user device can recall the representation of the control point that is closest to the location of the user device. The user device can also recall the representation from the memory based on, for example, input from a user.

In some implementations, a machine learning model (e.g., the machine learning model 124 of FIG. 1) can identify a storage unit type for each storage unit from the first plurality of storage units. For example, the machine learning model can be trained to read the storage unit identifiers of the first plurality of storage units and/or any other storage unit that the sensor scans to accurately predict an identification of the storage unit type for each storage unit from the first plurality of storage units.

In some implementations, the method 2200 can include calculating a storage unit count from the first plurality of storage units based on the light ranging sensor at the user device. For example, the processor can analyze a shape, size, or location of each storage unit from the plurality of storage units in the spatial search to identify a single storage unit and sum each storage unit to determine the storage unit count. In some implementations, the method 2200 can include calculating a storage unit count from the second plurality of storage units (or another plurality of storage units) based on the light ranging sensor at the user device.

Figure 23:
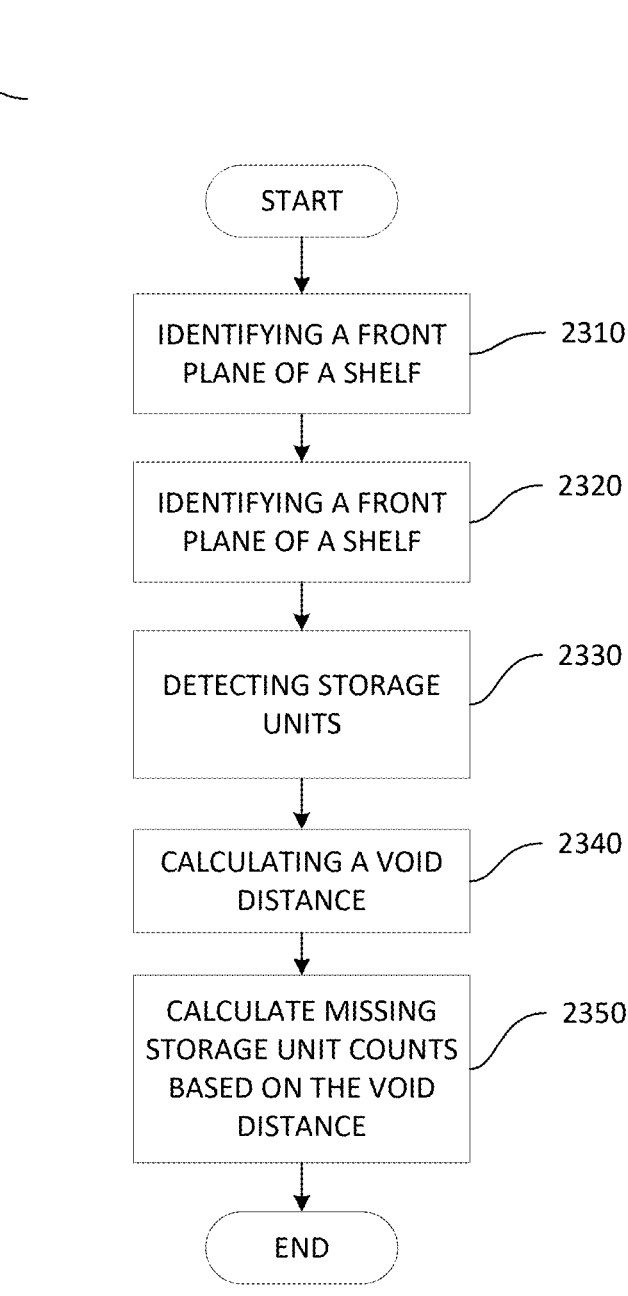
FIG. 23 is a flow diagram of a method 2300 for counting missing storage units in an inventory, according to an embodiment.

FIG. 23 is a flow diagram of a method 2300 for counting missing storage units in an inventory, according to an embodiment (similar to the method described with respect to FIG. 17). The method 2300 does not include calculating a depth of the shelf to calculate missing storage unit counts on the shelf. The method 2300 can be stored as instructions of one or more software modules and/or as code in a memory (e.g., the memory 108 of FIG. 1) and implemented and/or executed by a processor (e.g., the processor 104 of FIG. 1).

At 2310, the method 2300 includes capturing image frames of an inventory. In some implementations, capturing the image frames can include receiving, at a processor of a user device and from a sensor, multiple image frames of an inventory. In some implementations, the sensor can include a depth sensor such as, for example, a time-of-flight (TOF) sensor; a camera such as, for example, an ultra-wide-angle camera, a wide-angle camera, a telephoto camera, mono-chrome camera, a macro camera, and/or the like; a light detection and ranging (LiDAR) sensor; and/or the like. In some implementations, the method 2300 can include scanning and/or capturing multiple image frames of the inventory and the multiple storage units in substantially real-time. In some implementations, a user can operate the user device and control where the sensor is capturing images and/or generating image frames.

At 2320, the method 2300 includes identifying a front plane of a shelf at the user device to define a control point. Identifying the front plane of the shelf can include identifying the front plane of the shelf using a light ranging sensor, such as LiDAR. The shelf can be or include, for example, steel shelving, rivet shelving, cantilever racks, drive-in racking, adjustable shelving, wire shelving, pallet racking, boltless shelving, floating shelving, gondola shelving, gravity fed shelving, and/or the like. The front plane can be a surface of the shelf. The processor can use the control point to conduct a spatial search in the inventory. The spatial search can include coordinates and/or a virtual representation of an area surrounding the inventory. In some implementations, the area can include walls, floors, ceilings, and/or the like. The area can also include real-world physical objects including the inventory that houses storage units, such as, for example, shelves, racks, storage units, and/or the like. The spatial search can include multiple control points.

At 2330, the method 2300 includes detecting storage units using a sensor, such as a light ranging sensor (e.g., LiDAR, etc.). Detecting storage units can include detecting a storage unit closest to the front plane of the shelf. Detecting storage units can include detecting a depth of the storage units using the sensor. In some implementations, a machine learning model (e.g., the machine learning model of FIG. 18) can infer size information of the storage units, such as dimension(s) (e.g., length, height, depth, etc.) of the storage units.

At 2340, the method 2300 includes calculating a void distance from the front plane of the shelf and to the storage units. The void of the shelf can be a part of the shelf that has missing storage units (e.g., where there are no storage units and where storage units can be placed). The void distance can be a distance value (e.g., a depth) from the front plane of the shelf and to the storage units. The void distance can represent a depth of missing storage units. Calculating the void distance can include calculating using a light ranging sensor (LiDAR), or another sensor suitable for measuring distances.

At 2350, the method 2300 includes calculating missing storage unit counts, using the void distance. The processor can divide the void distance by a depth of the storage units to calculate a missing storage unit count.

In some implementations, the method 2300 can include sending a signal representative of the missing storage unit count(s) to, for example, a display of a user device (e.g., the display 148 of the user device 101 of FIG. 1), or another display. In some implementations, the method 2300 can include storing the missing storage unit count(s) at, for example, a memory of the user device and/or a database (e.g., the database 391 of FIG. 3).

In some implementations, the inventory management system can generate reports catered to different customers. For instance, one customer may prefer receiving reports of inventory in measurements in pounds, kilograms, ounces, and/or the like. In some cases, another customer may prefer a report to include a state of storage units (e.g., frozen chicken, thawed chicken, fried chicken, etc.). The reports can be customizable. In some implementations, the reports can be generated based on information collected by a sensor using object character recognition (OCR). For instance, the sensor can scan and read labels, nutritional information, and/or images on storage units. Information captured by the sensor using OCR can be stored in the database such that the information is searchable to be used for generating the reports.

In some implementations, restocking the unit type and/or predicting the generating of a replenish request for the unit type can be based on external factors, such as, for example, weather, season, day of week, outside events, and/or the like. For instance, the replenish request can be fulfilled but the fulfilling of the replenish request can be affected by future weather, planned events, supply chain issues, and/or the like. In some instances, the unit type requiring restock can trigger the replenish request where a machine learning model can predict when to automatically order a restock of the unit type requiring restock based on the external factors. For example, the machine learning model can predict that a shipment time for the unit type is longer during the winter season so the replenish request is generated sooner and/or before the unit type is out of stock.

In some embodiments, a method comprises: receiving, from an image sensor operatively coupled to a processor of a user device, a plurality of image frames; identifying a front plane of a shelf in the plurality of image frames based on a light ranging sensor at the user device, to define a control point used to conduct a spatial search; inputting the plurality of image frames to a machine learning model to predict a plurality of storage units in the spatial search, each storage unit from the plurality of storage units associated with a unit type from a plurality of unit types; calculating, based on the light ranging sensor, a depth of the plurality of storage units in the spatial search; when a storage unit from the plurality of storage units is disposed at a back of the shelf, calculating, using the depth, a storage unit count from a plurality of storage unit counts and for each unit type from the plurality of unit types from the plurality of storage units identified; and when a storage unit from the plurality of storage units is not disposed at the back of the shelf, calculating, using a mesh analysis, a storage unit count from a plurality of storage unit counts and for each unit type from the plurality of unit types from the plurality of storage units identified.

In some such implementations, the method further comprises: sending a signal to output each storage unit count from the plurality of storage unit counts on a display of the user device.

In some such implementations, the image sensor is not fixed and is configured to capture the plurality of image frames in substantially real-time.

In some such implementations, the shelf is a gondola shelf.

In some such implementations, the method further comprises: identifying whether the storage unit from the plurality of storage units is disposed at the back of the shelf using the light ranging sensor.

In some such implementations, the calculating, when a storage unit from the plurality of storage units is disposed at the back of the shelf is based on the depth of the shelf and a depth of each unit type from the plurality of unit types from the plurality of storage units identified.

In some such implementations, the light ranging sensor is at least one of a time of flight (ToF) sensor or a light detection and ranging (LiDAR) sensor.

In some embodiments, a non-transitory processor-readable medium stores instructions that when executed by a processor, cause the processor to: receive, from an image sensor operatively coupled to the processor of a user device, a plurality of image frames; identify, in the plurality of image frames, a set of spatial labels associated with a plurality of visible storage units, each storage unit from the plurality of visible storage units associated with a unit type from a plurality of unit types; identify, based on the set of spatial labels, a spatial group associated with the plurality of visible storage units; measure a volume, based on the spatial group, containing the plurality of visible storage units associated with the spatial group; calculate, based on the plurality of visible storage units, a visible storage unit count of the plurality of visible storage units contained in the volume; predict, based on at least one of a plurality of features of visible storage units or the visible storage unit count, an identity of a plurality of occluded storage units contained in the volume; predict, based on the identity of the plurality of occluded storage units contained in the volume, an occluded storage unit count in the volume; and determine, based on the visible storage unit count and the occluded storage unit count, a storage unit count for the spatial group.

In some such implementations, the spatial group is a palette.

In some such implementations, the spatial group is a food pan.

In some such implementations, the plurality of features of visible storage units includes an identifier for optical character recognition (OCR) analysis.

In some such implementations, the plurality of features of visible storage units includes an order history associated with the spatial group.

In some such implementations, the non-transitory processor-readable medium further comprises instructions that when executed by the processor cause the processor to: perform one of a volumetric footprint analysis for the spatial group.

In some such implementations, the spatial group is a box.

In some embodiments, a non-transitory processor-readable medium stores instructions that when executed by a processor, cause the processor to: receive, from an image sensor operatively coupled to the processor of a user device, a plurality of image frames; locate a control point used to conduct a spatial search in the plurality of image frames; identify in the spatial search a form for a plurality of storage units, each storage unit from the plurality of storage units associated with a unit type from a plurality of unit types; determine, based on the form for the plurality of storage units, a plurality of identifying techniques for the plurality of storage units; execute each identifying technique from the plurality of identifying techniques to define a set of potential unit types; assign, based on the set of potential unit types, a unit type identity to the plurality of storage units; calculate a storage unit count from a plurality of storage unit counts and for each unit type from the plurality of unit types from the plurality of storage units; and send a signal to output each storage unit count from the plurality of storage unit counts on a display of the user device.

In some such implementations, the plurality of identifying techniques includes at least one of a direct match, an optical character recognition (OCR) match, or a label match.

In some such implementations, the storage unit count is performed using at least one of an individual count, a push to back count, a gravity fed count, an optical character recognition (OCR) count, a measured fullness count, or a pull to front count.

In some such implementations, the form is at least one of a shape or configuration associated with the plurality of unit types.

In some such implementations, the set of potential unit types is displayed on the display of the user device.

In some such implementations, the unit type identity is assigned in response to a selection from a user of the user device.

In some such implementations, the image sensor is not fixed and is configured to capture the plurality of image frames in substantially real-time.

In some embodiments, a method, comprises: receiving, at a first time and from an image sensor operatively coupled to a processor of a user device, a first plurality of image frames of an inventory; identifying, at the first time, a first control point in the first plurality of image frames; locating, at the first time and using a light ranging sensor operatively coupled to the processor of the user device, a first plurality of storage units disposed in an area associated with the first control point in the inventory and not with a second control point in the inventory; storing a representation of the first plurality of storage units disposed in the area in a memory operatively coupled to the processor of the user device; receiving, at a second time after the first time and from the image sensor, a second plurality of image frames of the inventory; and locating, based on the representation and without identifying the first control point in the second plurality of image frames, a second plurality of storage units disposed in the area at the second time.

In some such implementations, the first control point is at least one of a barcode, a quick-response (QR) code, or an identifier.

In some such implementations, the locating the second plurality of storage units is based on a location of the user device being within a predetermined proximity of a location of the first control point at the second time.

In some such implementations, the method further comprises: calculating, based on the light ranging sensor at the user device, a storage unit count from the first plurality of storage units; calculating, based on the light ranging sensor at the user device, a storage unit count from the second plurality of storage units.

In some such implementations, the storing the representation of the first plurality of storage units includes, in response to locating the first plurality of storage units, calculating coordinates of the first plurality of storage units based on a position sensor of the user device and storing the coordinates.

In some such implementations, the method further comprises: identifying, before storing the representation, a unit type for each storage unit from the first plurality of storage units using a machine learning model.

It is to be noted that any one or more of the aspects and embodiments described herein can be conveniently implemented using one or more machines (e.g., one or more compute devices that are utilized as a user compute device for an electronic document, one or more server devices, such as a document server, etc.) programmed according to the teachings of the present specification. Aspects and implementations discussed above employing software and/or software modules can also include appropriate hardware for assisting in the implementation of the machine executable instructions of the software and/or software module.

Examples of a compute device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a compute device can include and/or be included in a kiosk.

All combinations of the foregoing concepts and additional concepts discussed herewithin (provided such concepts are not mutually inconsistent) are contemplated as being part of the subject matter disclosed herein. The terminology explicitly employed herein that also can appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments can be practiced. The advantages and features of the application are of a representative sample of embodiments only, and are not exhaustive and/or exclusive. Rather, they are presented to assist in understanding and teach the embodiments, and are not representative of all embodiments. Thus, it is to be understood that other embodiments can be utilized and functional, logical, operational, organizational, structural and/or topological modifications can be made without departing from the scope of the disclosure. As such, all examples and/or embodiments are deemed to be non-limiting throughout this disclosure.

It is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general-purpose processor, a central processing unit (CPU), a microprocessor, a digital signal processor (DSP), a controller, a microcontroller, a state machine and so forth. Under some circumstances, a "processor" can refer to an application specific integrated circuit (ASIC), a programmable logic device (PLD), a field programmable gate array (FPGA), etc. The term "processor" can refer to a combination of processing devices, e.g., a combination of a DSP and a microprocessor, multiple microprocessors, one or more microprocessors in conjunction with a DSP core or any other such configuration.

The term "memory" should be interpreted broadly to encompass any electronic component capable of storing electronic information. The term memory can refer to various types of processor-readable media such as random-access memory (RAM), read-only memory (ROM), non-volatile random-access memory (NVRAM), programmable read-only memory (PROM), erasable programmable read only memory (EPROM), electrically erasable PROM (EE-PROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" can refer to one or more programs, routines, sub-routines, functions, procedures, etc. "Instructions" and "code" can comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts can be embodied as one or more methods, of which at least one example has been provided. The acts performed as part of the method can be ordered in any suitable way. Accordingly, embodiments can be constructed in which acts are performed in an order different than illustrated, which can include performing some acts simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

Advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein can be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

As used herein, "substantially concurrently" can refer to events that take place at the same time when adjusted for processing-related delays (e.g., computation delay, transmission delay, etc.), or can refer to events that overlap in time.

As used herein, "substantially in real-time" can refer to an event that occurs immediately following a predicate event, adjusted for processing-related delays (e.g., computation delay, transmission delay, etc.).

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 1611.03.

What is claimed is:

1. A non-transitory processor-readable medium storing instructions that when executed by a processor, cause the processor to:

receive, from an image sensor operatively coupled to the processor of a user device, a plurality of image frames;

locate an object in the plurality of image frames to define a control point in a virtual space, the virtual space being representative of an inventory;

generate a mesh in the virtual space, the mesh including a first set of points defined by contours of at least one storage unit and a second set of points defined by contours of a shelf that supports the at least one storage unit;

detect a set of storage units on the shelf, based on the first set of points of the mesh and the second set of points of the mesh, the set of storage units including at least a first storage unit and a second storage unit, the first storage unit being disposed between the user device and the second storage unit;

identify in the virtual space a form for the first storage unit from the set of storage units;

determine, based on the form for the first storage unit from the set of storage units, a plurality of identifying techniques for the first storage unit from the set of storage units;

execute each identifying technique from the plurality of identifying techniques to define a set of potential unit types for the first storage unit from the set of storage units;

assign, based on the set of potential unit types, a unit type identity to (1) the first storage unit from the set of storage units and (2) the second storage unit from the set of storage units;

calculate a storage unit count for the set of storage units, based on the mesh and the unit type identity; and send a signal to output the storage unit count on a display of the user device.

2. The non-transitory processor-readable medium of claim 1, wherein the plurality of identifying techniques includes at least one of a direct match, an optical character recognition (OCR) match, or a label match.

3. The non-transitory processor-readable medium of claim 1, wherein the form is at least one of a shape or a size and is based on the first set of points.

4. The non-transitory processor-readable medium of claim 1, wherein the set of potential unit types is displayed on the display of the user device.

5. The non-transitory processor-readable medium of claim 1, wherein the unit type identity is assigned in response to a selection from a user of the user device.

6. The non-transitory processor-readable medium of claim 1, wherein the image sensor is not fixed and is configured to capture the plurality of image frames in substantially real-time.

7. The non-transitory processor-readable medium of claim 1, wherein the unit type identity includes (1) a first confidence value associated with the first storage unit from the set of storage units and (2) a second confidence value associated with the second storage unit from the set of storage units, the first confidence value being greater than or equal to the second confidence value.

8. The non-transitory processor-readable medium of claim 1, wherein the unit type identity is assigned to the second storage unit from the set of storage units in response to a selection from a user of the user device.

9. A non-transitory, processor-readable medium storing instructions that, when executed by a processor, cause the processor to:

receive, from an image sensor operatively coupled to the processor of a user device, a plurality of image frames;

locate an object in the plurality of image frames to define a control point in a virtual space, the virtual space being representative of an inventory;

generate a mesh in the virtual space, the mesh including a first set of points defined by contours of at least one storage unit and a second set of points defined by contours of a shelf that supports the at least one storage unit;

detect a set of storage units on the shelf, based on the first set of points of the mesh and the second set of points of the mesh, the set of storage units including at least a first storage unit and a second storage unit, the first storage unit being disposed between the user device and the second storage unit;

identify in the virtual space a form for the first storage unit from the set of storage units;

determine, based on the form for the first storage unit from the set of storage units, at least a first identifying technique and a second identifying technique;

execute the first identifying technique to define a first potential unit type with a first confidence value and the second identifying technique to define a second potential unit type with a second confidence value;

assign, based on at least one of the first potential unit type with the first confidence value or the second potential unit type with the second confidence value, a unit type identity to each storage unit from the set of storage units;

calculate a storage unit count for the set of storage units, based on the mesh and the unit type identity; and send a signal to output the storage unit count on a display of the user device.

10. The non-transitory, processor-readable medium of claim 9, wherein at least one of the first identifying technique or the second identifying technique includes at least one of a size classifier, a location classifier, or a shape classifier.

11. The non-transitory, processor-readable medium of claim 9, wherein:

the storage unit count is at least partially based on a configuration for the set of storage units.

12. The non-transitory, processor-readable medium of claim 9, wherein the form is at least one of a shape or a size and is based on the first set of points of the mesh.

13. The non-transitory, processor-readable medium of claim 9, wherein a difference in the first confidence value and the second confidence value satisfies a threshold value.

14. The non-transitory, processor-readable medium of claim 9, wherein the image sensor is not fixed and is configured to capture the plurality of image frames in substantially real-time.

15. The non-transitory, processor-readable medium of claim 9, wherein:

the first confidence value is a first weighted confidence value, the first weighted confidence value is weighted according to a first predefined weight associated with the first identifying technique, the second confidence value is a second weighted confidence value, and the second weighted confidence value is weighted according to a second predefined weight associated with the second identifying technique.

\* \* \* \* \*